US012645380B2

(12) United States Patent
Chanda et al.

(10) Patent No.: US 12,645,380 B2
(45) Date of Patent: *Jun. 2, 2026

(54) DATA TRANSFORM ACCELERATION

(71) Applicant: MaxLinear, Inc., Carlsbad, CA (US)

(72) Inventors: Pinaki Shankar Chanda, San Diego, CA (US); Sasidhar Paruchuri, San Diego, CA (US); Michael Ray Ham, San Jose, CA (US)

(73) Assignee: MaxLinear, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/348,267

(22) Filed: Jul. 6, 2023

(65) Prior Publication Data

US 2024/0192870 A1 Jun. 13, 2024

Related U.S. Application Data

(60) Provisional application No. 63/387,055, filed on Dec. 12, 2022.

(51) Int. Cl.
G06F 3/06 (2006.01)

(52) U.S. Cl.
CPC ............ G06F 3/0638 (2013.01); G06F 3/061 (2013.01); G06F 3/0679 (2013.01)

(58) Field of Classification Search
CPC ...... G06F 3/0638; G06F 3/061; G06F 3/0679; G06F 3/0658; G06F 3/0671; G06F 9/00
See application file for complete search history.

(56) References Cited

U.S. PATENT DOCUMENTS

| | | | | |
|---|---|---|---|---|
| 10,412,002 | B1 * | 9/2019 | Richardson | ............. H04L 45/74 |
| 11,055,808 | B2 | 7/2021 | Du et al. | |
| 11,055,809 | B2 | 7/2021 | Shah et al. | |
| 11,182,160 | B1 | 11/2021 | Brett et al. | |
| 11,526,460 | B1 | 12/2022 | Wang et al. | |
| 12,346,343 | B2 | 7/2025 | Chanda et al. | |
| 2014/0344569 | A1 * | 11/2014 | Li | ......................... G06F 21/128 |
| | | | | 726/26 |

(Continued)

FOREIGN PATENT DOCUMENTS

CN 113419845 A 9/2021

OTHER PUBLICATIONS

Office Action of German Patent Application No. 10 2023 120 402.5 mailed Apr. 9, 2025, 12 pages with translations.

(Continued)

*Primary Examiner* — Nanci N Wong
(74) *Attorney, Agent, or Firm* — Buchalter; Jason W. Croft

(57) ABSTRACT

A method includes determining an address associated with a data transform command in a container data structure which is in a host computing unit. The host computing unit is in communication with the data transform accelerator. In response to a determination that the address is in the container data structure, the method includes accessing the data transform command based on the address. The method also includes obtaining metadata based on information in the data transform command. The metadata is in the host computing unit. The metadata can be shared in its entirety or partially by multiple data transform commands grouped together. The method further includes configuring a data transform pipeline based on the metadata.

20 Claims, 25 Drawing Sheets

(56) References Cited

U.S. PATENT DOCUMENTS

| | | | |
|---|---|---|---|
| 2016/0210328 | A1 | 7/2016 | Bendel et al. |
| 2017/0242902 | A1 | 8/2017 | Crawford, Jr. et al. |
| 2017/0351758 | A1 | 12/2017 | Antic et al. |
| 2019/0050295 | A1* | 2/2019 | Ding .................... G06F 11/1441 |
| 2019/0123763 | A1 | 4/2019 | Bissessur et al. |
| 2019/0207624 | A1 | 7/2019 | Cassetti et al. |
| 2020/0026883 | A1* | 1/2020 | de Almeida .......... H04L 9/0637 |
| 2020/0050401 | A1 | 2/2020 | Gibb et al. |
| 2020/0125770 | A1 | 4/2020 | LeMay et al. |
| 2021/0105220 | A1 | 4/2021 | Lee et al. |
| 2021/0117360 | A1 | 4/2021 | Kutch et al. |
| 2021/0135685 | A1 | 5/2021 | Kumar et al. |
| 2021/0192287 | A1 | 6/2021 | Dwivedi et al. |
| 2021/0218417 | A1 | 7/2021 | Indeck et al. |
| 2021/0374607 | A1 | 12/2021 | Kazakov et al. |
| 2022/0114270 | A1 | 4/2022 | Wang et al. |
| 2022/0164237 | A1 | 5/2022 | King et al. |
| 2022/0206975 | A1* | 6/2022 | Gopal ...................... H03M 7/60 |
| 2023/0038749 | A1 | 2/2023 | Bahadur et al. |
| 2023/0096468 | A1 | 3/2023 | Ong et al. |
| 2023/0100586 | A1* | 3/2023 | Kakaiya .................. G06F 9/544 |
| | | | 717/102 |
| 2023/0224261 | A1 | 7/2023 | Pope et al. |
| 2024/0007420 | A1* | 1/2024 | Asai ................... H04L 49/9057 |
| 2024/0119022 | A1 | 4/2024 | Sitton et al. |
| 2024/0192982 | A1 | 6/2024 | Chanda et al. |
| 2024/0193178 | A1 | 6/2024 | Chanda et al. |
| 2025/0335460 | A1 | 10/2025 | Chanda et al. |

OTHER PUBLICATIONS

Nayak, "Containerising GPU workloads", https://medium.com/cloudnativeinfra/containerising-gpu-workloads-13085e6dOfa7, Retrieved from: https://web.archive.org on Apr. 12, 2019, 5 pages.
"Argo Workflows: The Basics and a Quick Tutorial", Codefresh, Retrieved from: https://web.archive.org on Nov. 27, 2022, 10 pages.
Non-Final Office Action for U.S. Appl. No. 18/348,281, dated Sep. 9, 2024, 12 pages.
Notice of Allowance for U.S. Appl. No. 18/348,281, dated Mar. 11, 2025, 13 pages.
Invitation to a Hearing at German Patent and Trademark Office for German Patent Application No. 10 2023 120 402.5 mailed Jan. 9, 2026, 8 pages with translations.
Non-Final Office Action for U.S. Appl. No. 18/348,278 mailed Mar. 12, 2026, 94 pages.
Minutes of the Hearing for German Patent Application No. 10 2023 120 402.5 dated Mar. 12, 2026, 5 pages.

* cited by examiner

200

GENERATING FIRST CONTAINER DATA STRUCTURE

202

GENERATING FIRST INPUT DATA IN FIRST INPUT BUFFER

204

GENERATING COMMAND METADATA IN SECOND INPUT BUFFER

206

GENERATING COMMAND PRE-DATA IN THIRD INPUT BUFFER

208

GENERATING ADDITIONAL COMMAND METADATA IN FOURTH INPUT BUFFER

210

RESERVING FIRST OUTPUT BUFFER FOR FIRST OUTPUT DATA

From FIG. 2A

200

GENERATING FIRST SOURCE DESCRIPTOR

214

GENERATING SECOND SOURCE DESCRIPTOR

216

GENERATING THIRD SOURCE DESCRIPTOR

218

GENERATING FOURTH SOURCE DESCRIPTOR

220

GENERATING FIRST DESTINATION DESCRIPTOR

222

UPDATING FIRST CONTAINER DATA STRUCTURE
WITH ADDRESS OF FIRST DATA TRANSFORM
COMMAND

224

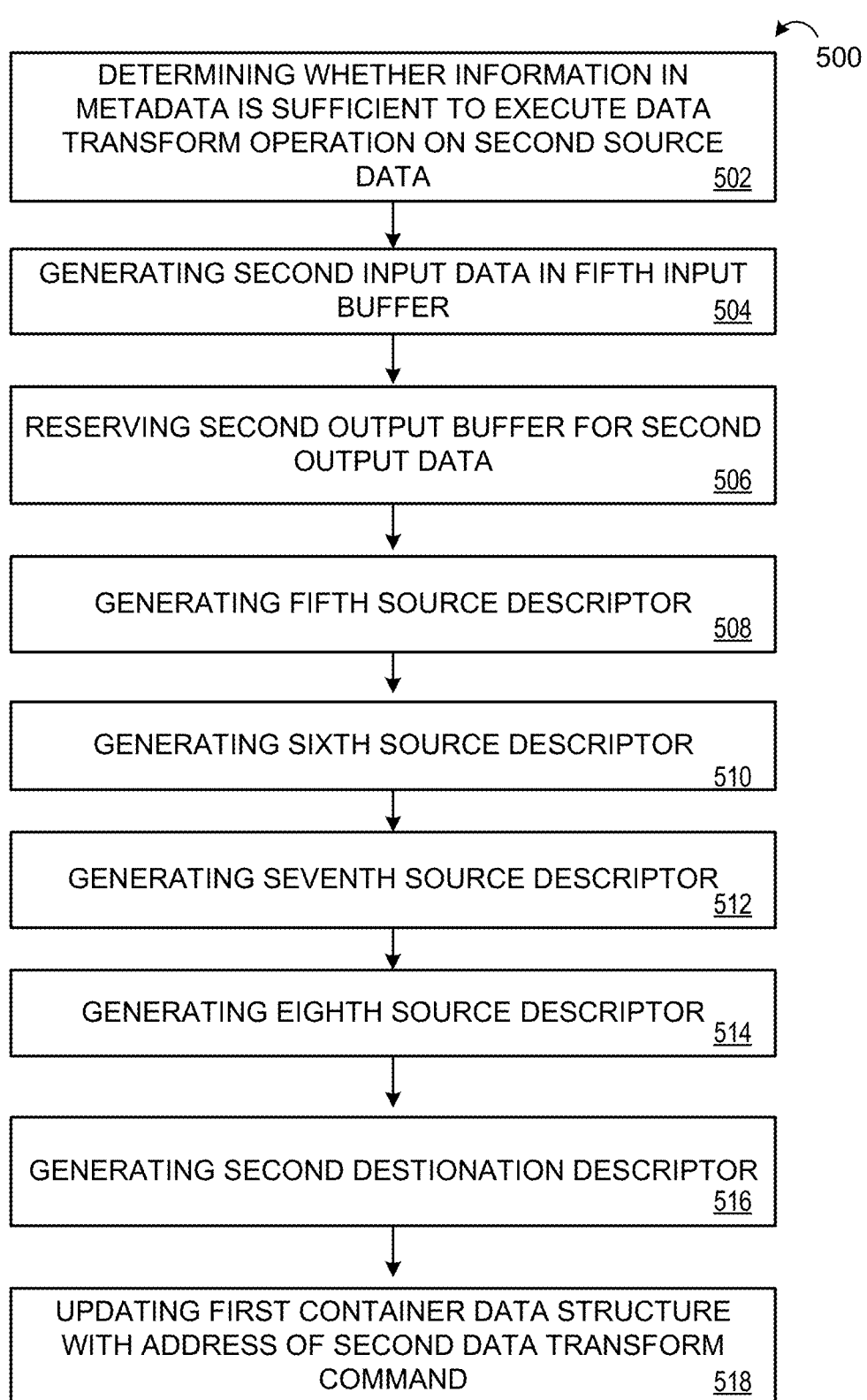

DETERMINING WHETHER INFORMATION IN
METADATA IS SUFFICIENT TO EXECUTE DATA
TRANSFORM OPERATION ON SECOND SOURCE
DATA                                    502

GENERATING SECOND INPUT DATA IN FIFTH INPUT
BUFFER                                  504

RESERVING SECOND OUTPUT BUFFER FOR SECOND
OUTPUT DATA                             506

GENERATING FIFTH SOURCE DESCRIPTOR      508

GENERATING SIXTH SOURCE DESCRIPTOR      510

GENERATING SEVENTH SOURCE DESCRIPTOR    512

GENERATING EIGHTH SOURCE DESCRIPTOR     514

GENERATING SECOND DESTIONATION DESCRIPTOR    516

UPDATING FIRST CONTAINER DATA STRUCTURE
WITH ADDRESS OF SECOND DATA TRANSFORM
COMMAND                                 518

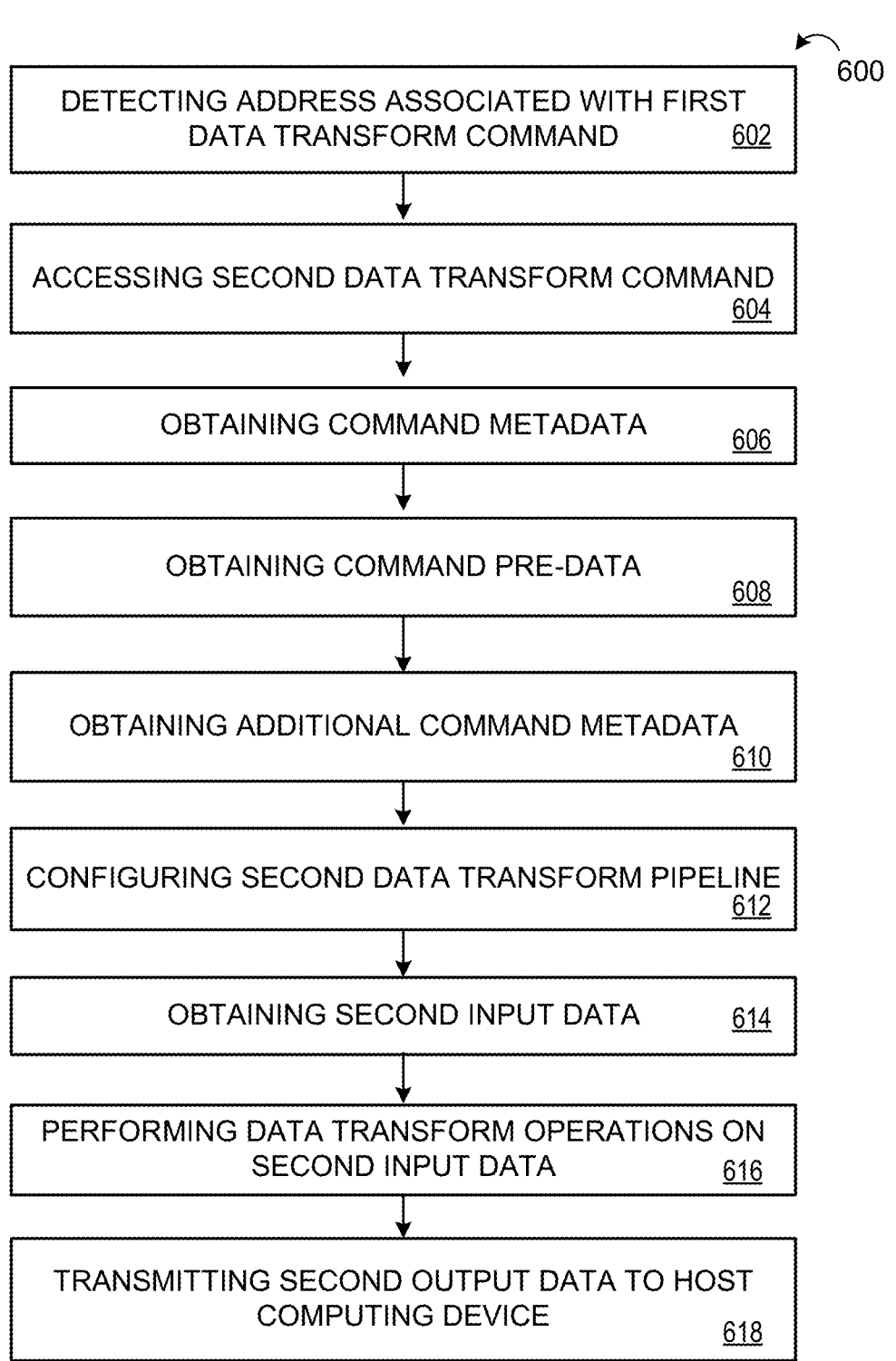

600

DETECTING ADDRESS ASSOCIATED WITH FIRST
DATA TRANSFORM COMMAND    602

ACCESSING SECOND DATA TRANSFORM COMMAND
604

OBTAINING COMMAND METADATA    606

OBTAINING COMMAND PRE-DATA
608

OBTAINING ADDITIONAL COMMAND METADATA
610

CONFIGURING SECOND DATA TRANSFORM PIPELINE
612

OBTAINING SECOND INPUT DATA    614

PERFORMING DATA TRANSFORM OPERATIONS ON
SECOND INPUT DATA    616

TRANSMITTING SECOND OUTPUT DATA TO HOST
COMPUTING DEVICE    618

FIG. 6

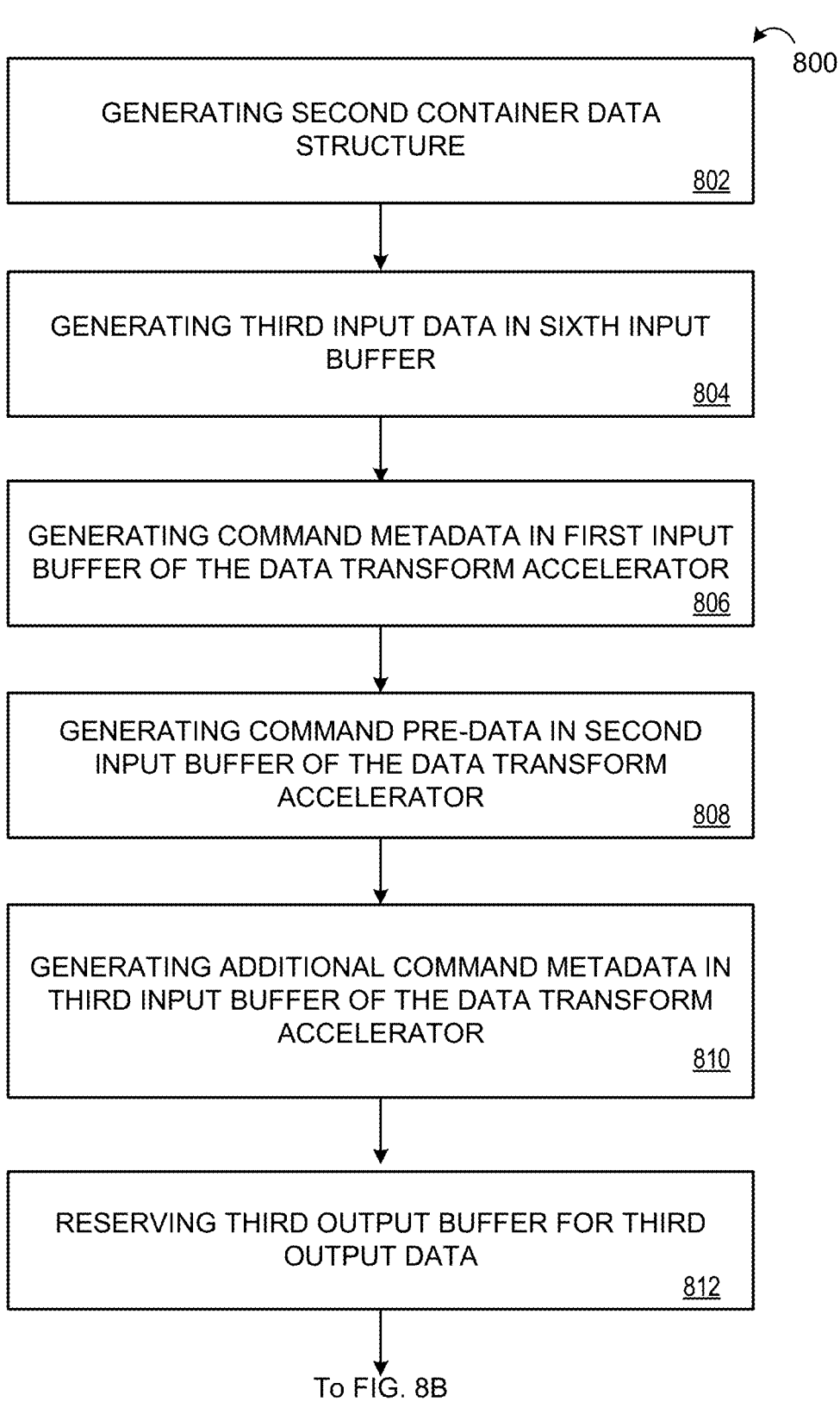

800

GENERATING SECOND CONTAINER DATA STRUCTURE

802

GENERATING THIRD INPUT DATA IN SIXTH INPUT BUFFER

804

GENERATING COMMAND METADATA IN FIRST INPUT BUFFER OF THE DATA TRANSFORM ACCELERATOR

806

GENERATING COMMAND PRE-DATA IN SECOND INPUT BUFFER OF THE DATA TRANSFORM ACCELERATOR

808

GENERATING ADDITIONAL COMMAND METADATA IN THIRD INPUT BUFFER OF THE DATA TRANSFORM ACCELERATOR

810

RESERVING THIRD OUTPUT BUFFER FOR THIRD OUTPUT DATA

From FIG. 8A

800

GENERATING 9TH SOURCE DESCRIPTOR

814

GENERATING 10TH SOURCE DESCRIPTOR

816

GENERATING 11TH SOURCE DESCRIPTOR

818

GENERATING 12TH SOURCE DESCRIPTOR

820

GENERATING THIRD DESTINATION DESCRIPTOR

822

UPDATING SECOND CONTAINER DATA STRUCTURE WITH ADDRESS OF THIRD DATA TRANSFORM COMMAND

824

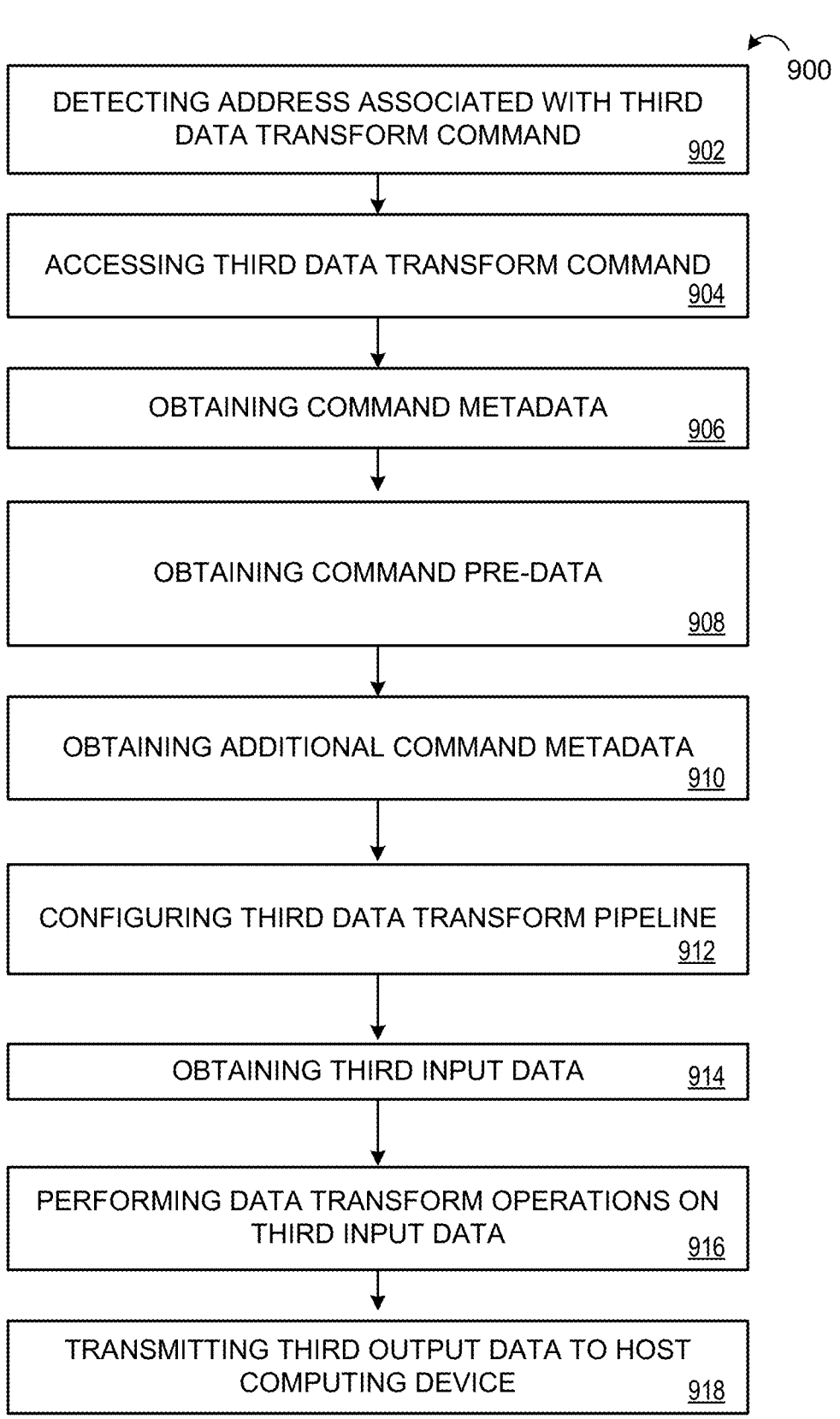

900

DETECTING ADDRESS ASSOCIATED WITH THIRD DATA TRANSFORM COMMAND
902

ACCESSING THIRD DATA TRANSFORM COMMAND
904

OBTAINING COMMAND METADATA
906

OBTAINING COMMAND PRE-DATA
908

OBTAINING ADDITIONAL COMMAND METADATA
910

CONFIGURING THIRD DATA TRANSFORM PIPELINE
912

OBTAINING THIRD INPUT DATA        914

PERFORMING DATA TRANSFORM OPERATIONS ON THIRD INPUT DATA
916

TRANSMITTING THIRD OUTPUT DATA TO HOST COMPUTING DEVICE
918

FIG. 9

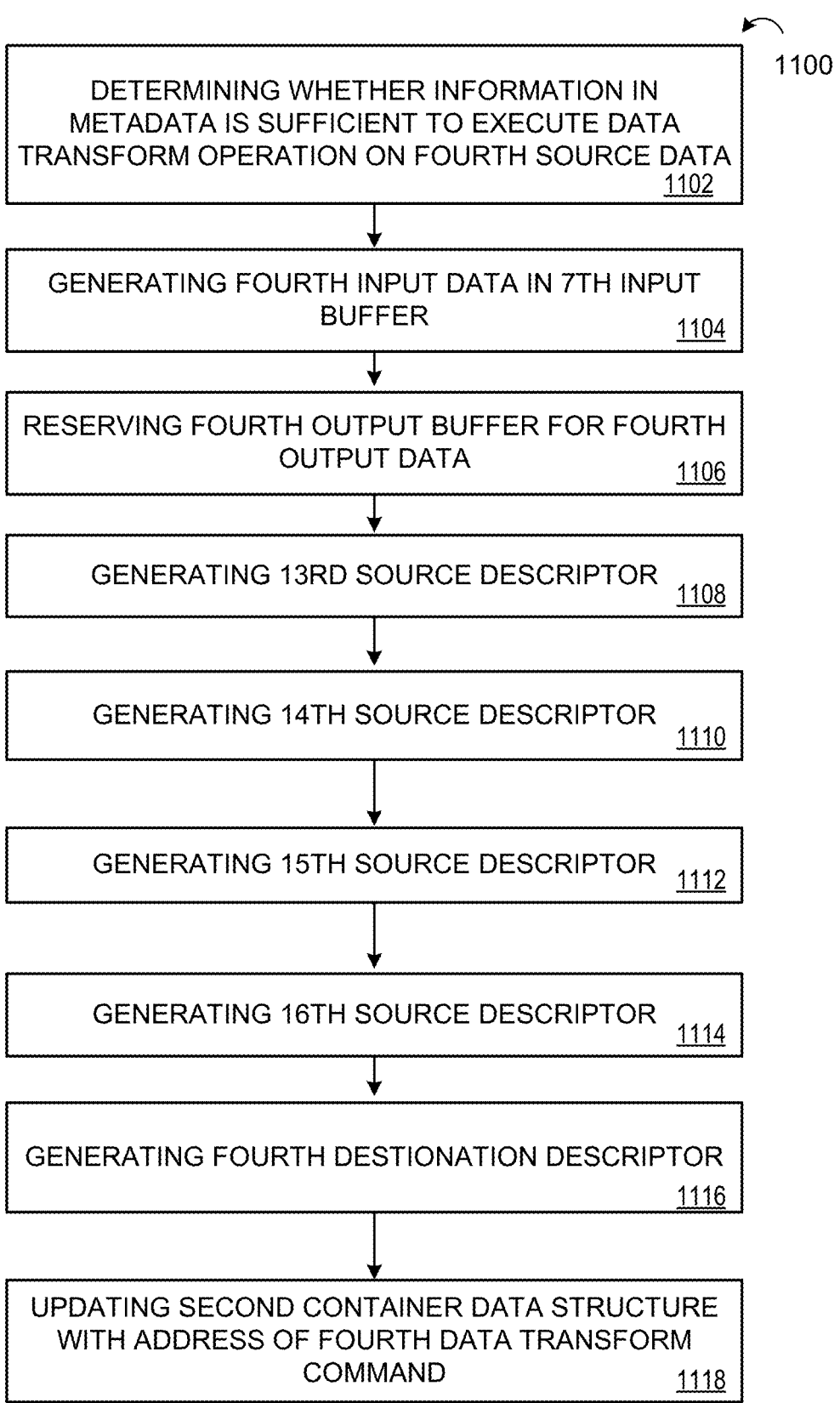

1100

DETERMINING WHETHER INFORMATION IN METADATA IS SUFFICIENT TO EXECUTE DATA TRANSFORM OPERATION ON FOURTH SOURCE DATA
1102

GENERATING FOURTH INPUT DATA IN 7TH INPUT BUFFER
1104

RESERVING FOURTH OUTPUT BUFFER FOR FOURTH OUTPUT DATA
1106

GENERATING 13RD SOURCE DESCRIPTOR
1108

GENERATING 14TH SOURCE DESCRIPTOR
1110

GENERATING 15TH SOURCE DESCRIPTOR
1112

GENERATING 16TH SOURCE DESCRIPTOR
1114

GENERATING FOURTH DESTIONATION DESCRIPTOR
1116

UPDATING SECOND CONTAINER DATA STRUCTURE WITH ADDRESS OF FOURTH DATA TRANSFORM COMMAND
1118

FIG. 11

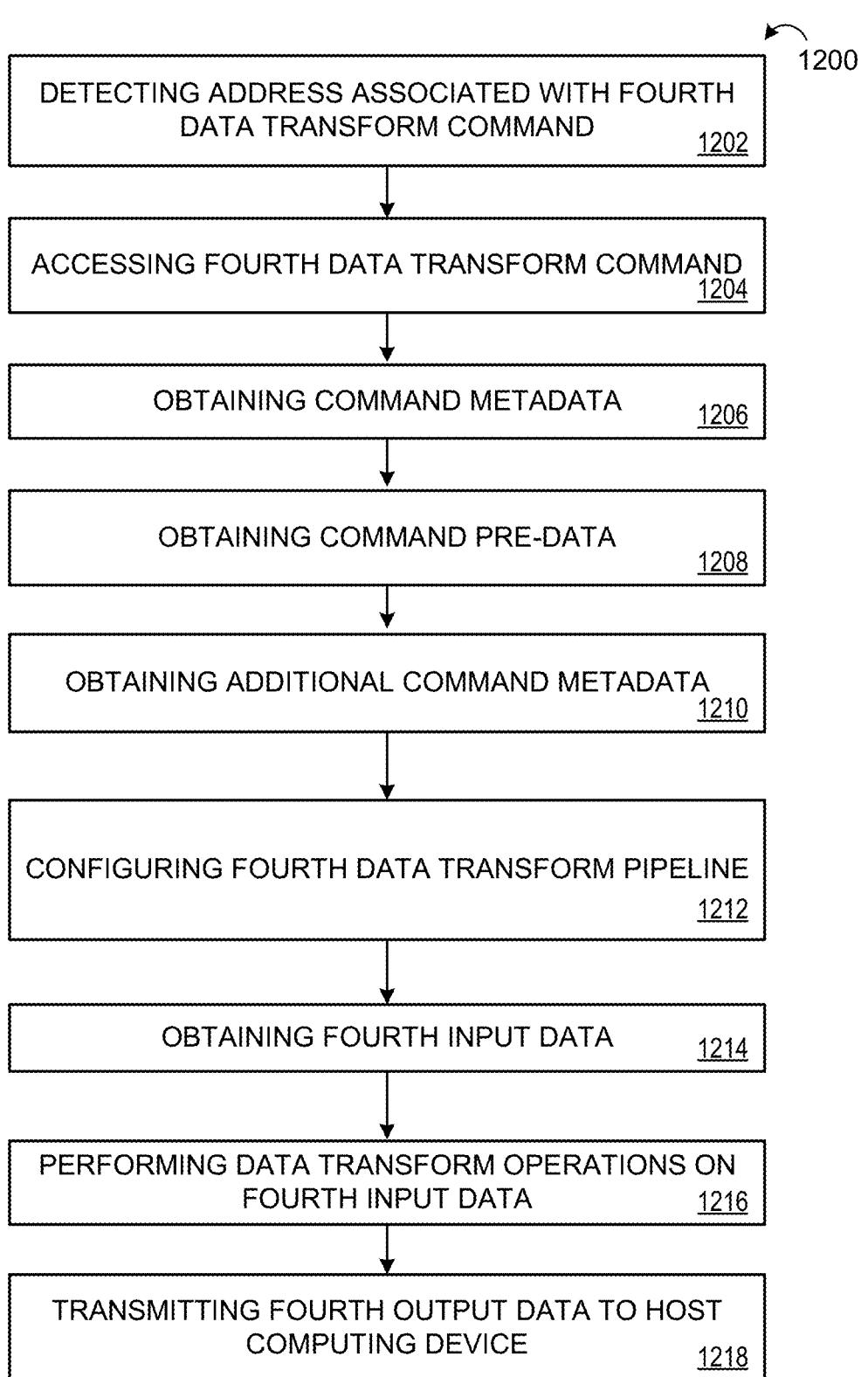

1200

DETECTING ADDRESS ASSOCIATED WITH FOURTH DATA TRANSFORM COMMAND      1202

ACCESSING FOURTH DATA TRANSFORM COMMAND      1204

OBTAINING COMMAND METADATA      1206

OBTAINING COMMAND PRE-DATA      1208

OBTAINING ADDITIONAL COMMAND METADATA      1210

CONFIGURING FOURTH DATA TRANSFORM PIPELINE      1212

OBTAINING FOURTH INPUT DATA      1214

PERFORMING DATA TRANSFORM OPERATIONS ON FOURTH INPUT DATA      1216

TRANSMITTING FOURTH OUTPUT DATA TO HOST COMPUTING DEVICE      1218

FIG. 12

From FIG. 14A

1400

GENERATING 17TH SOURCE DESCRIPTOR

1416

GENERATING 18TH SOURCE DESCRIPTOR

1418

GENERATING 19TH SOURCE DESCRIPTOR

1420

GENERATING 20TH SOURCE DESCRIPTOR

1422

GENERATING FIFTH DESTINATION DESCRIPTOR

1424

UPDATING THIRD CONTAINER DATA STRUCTURE
WITH ADDRESS OF FIFTH DATA TRANSFORM
COMMAND

1426

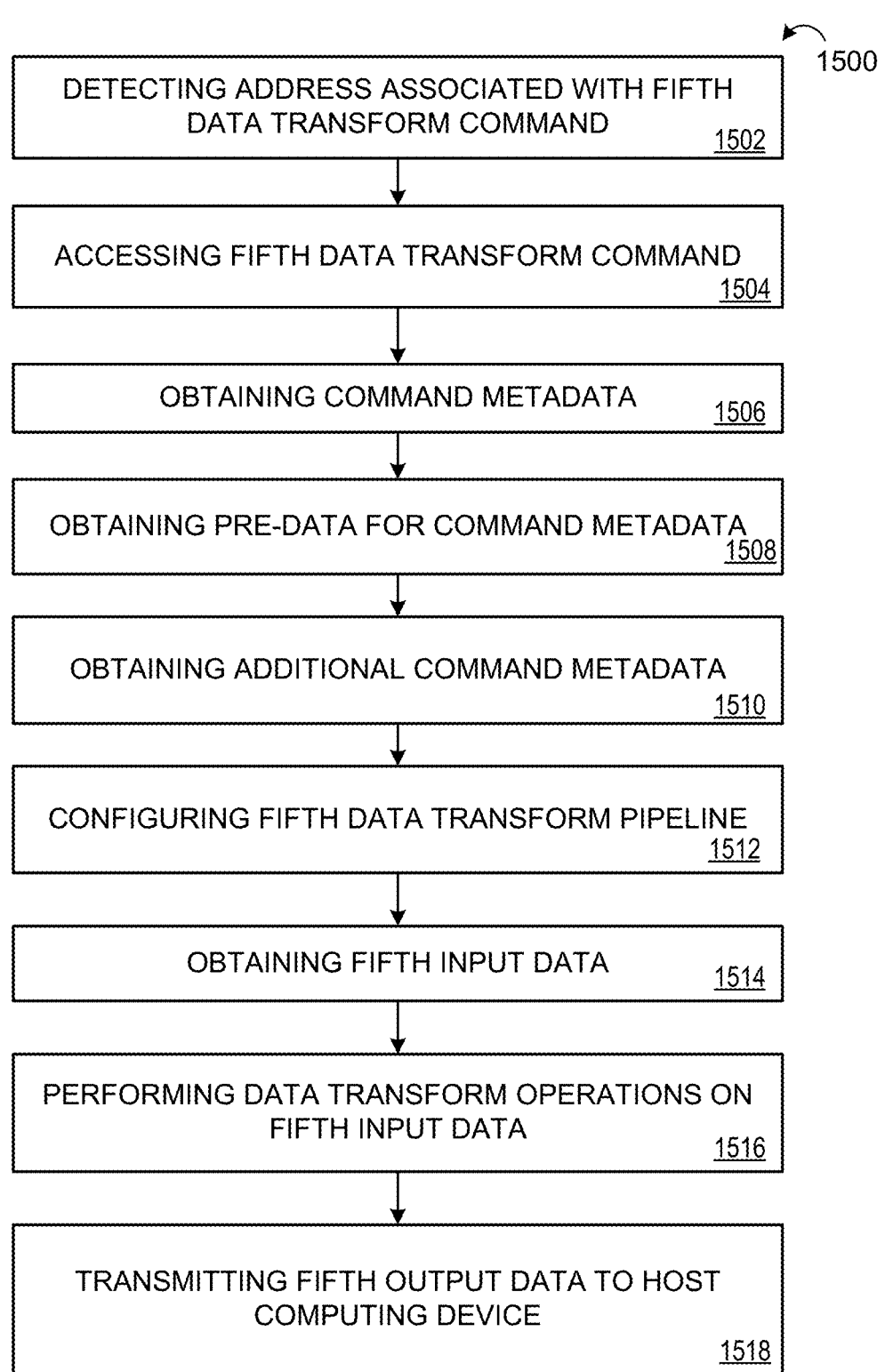

1500

DETECTING ADDRESS ASSOCIATED WITH FIFTH
DATA TRANSFORM COMMAND
1502

ACCESSING FIFTH DATA TRANSFORM COMMAND
1504

OBTAINING COMMAND METADATA          1506

OBTAINING PRE-DATA FOR COMMAND METADATA
1508

OBTAINING ADDITIONAL COMMAND METADATA
1510

CONFIGURING FIFTH DATA TRANSFORM PIPELINE
1512

OBTAINING FIFTH INPUT DATA          1514

PERFORMING DATA TRANSFORM OPERATIONS ON
FIFTH INPUT DATA
1516

TRANSMITTING FIFTH OUTPUT DATA TO HOST
COMPUTING DEVICE
1518

FIG. 15

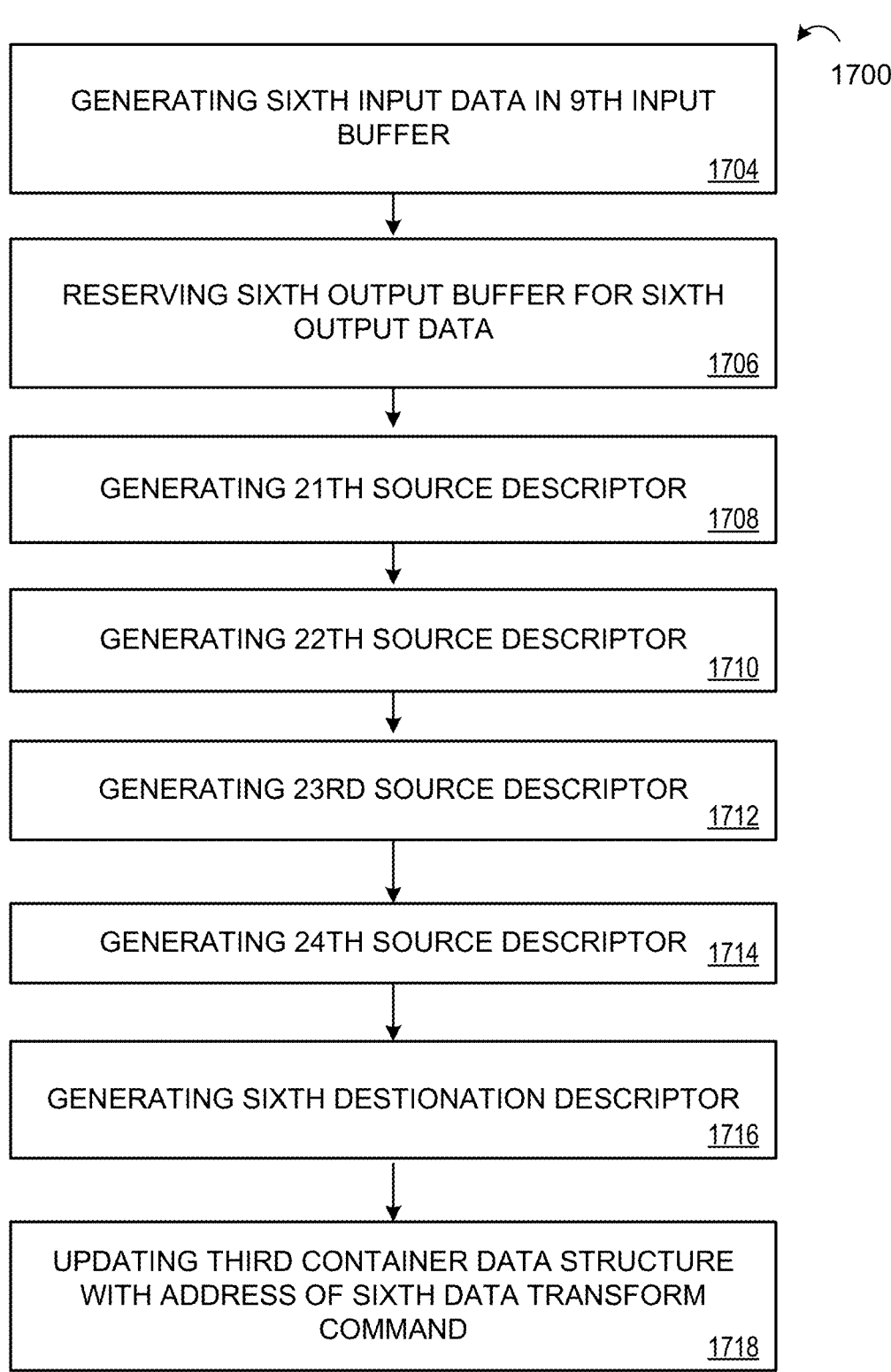

1700

GENERATING SIXTH INPUT DATA IN 9TH INPUT
BUFFER

1704

RESERVING SIXTH OUTPUT BUFFER FOR SIXTH
OUTPUT DATA

1706

GENERATING 21TH SOURCE DESCRIPTOR

1708

GENERATING 22TH SOURCE DESCRIPTOR

1710

GENERATING 23RD SOURCE DESCRIPTOR

1712

GENERATING 24TH SOURCE DESCRIPTOR  1714

GENERATING SIXTH DESTIONATION DESCRIPTOR

1716

UPDATING THIRD CONTAINER DATA STRUCTURE
WITH ADDRESS OF SIXTH DATA TRANSFORM
COMMAND

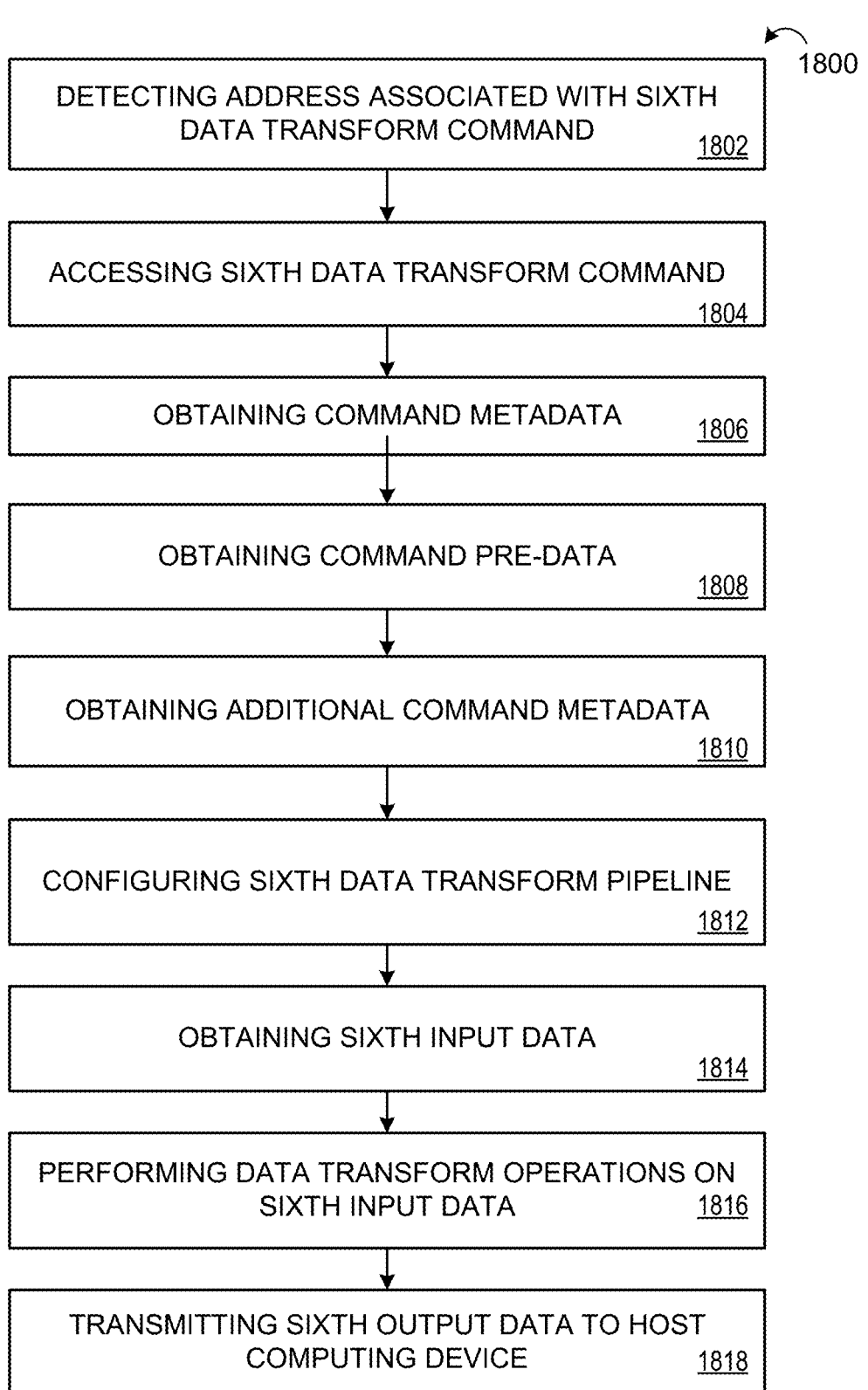

1800

DETECTING ADDRESS ASSOCIATED WITH SIXTH
DATA TRANSFORM COMMAND          1802

ACCESSING SIXTH DATA TRANSFORM COMMAND          1804

OBTAINING COMMAND METADATA          1806

OBTAINING COMMAND PRE-DATA          1808

OBTAINING ADDITIONAL COMMAND METADATA          1810

CONFIGURING SIXTH DATA TRANSFORM PIPELINE          1812

OBTAINING SIXTH INPUT DATA          1814

PERFORMING DATA TRANSFORM OPERATIONS ON
SIXTH INPUT DATA          1816

TRANSMITTING SIXTH OUTPUT DATA TO HOST
COMPUTING DEVICE          1818

FIG. 18

DATA TRANSFORM ACCELERATION

CROSS REFERENCE TO RELATED APPLICATIONS

This U.S. patent application claims priority to Provisional Patent Application 63/387,055 filed on Dec. 12, 2022. The disclosure of this prior application is considered part of the disclosure of this application and is hereby incorporated by reference in its entirety.

TECHNICAL FIELD

This disclosure generally relates to various data transform operations, such as data compression, data decompression, data encryption, data decryption, data authentication tag generation, data authentication, data deduplication, non-volatile memory express (NVMe) protection information generation, NVMe protection information verification, and data real-time verification, specifically through the utilization of one or more data transform accelerators (e.g., co-processors).

BACKGROUND

Unless otherwise indicated herein, the materials described herein are not prior art to the claims in the present application and are not admitted to be prior art by inclusion in this section.

Data transform accelerators are co-processor devices that are used to accelerate data transform operations for various applications such as data analytics applications, big data applications, storage applications, cryptographic applications, and networking applications. For example, a data transform accelerator can be configured as a storage and cryptographic accelerator.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

One aspect of the disclosure provides a method for configuring a data transform accelerator for transforming input data. The method includes determining, by a data transform accelerator, an address associated with a data transform command in a container data structure which is in a host computing unit. The host computing unit is in communication with the data transform accelerator. In response to a determination that the address is in the container data structure, the method includes accessing, by the data transform accelerator, the data transform command based on the address. The method also includes obtaining, by the data transform accelerator, metadata based on information in the data transform command. The metadata is in the host computing unit. The method also includes configuring, by the data transform accelerator, a data transform pipeline based on the metadata.

Another aspect of the disclosure provides a host. The host includes data processing hardware and memory hardware in communication with the data processing hardware. The memory hardware is storing instructions that when executed on the data processing hardware cause the data processing hardware to perform operations. The operations include generating a container data structure in the memory hardware. The method includes generating input data in the memory hardware or in the memory of the data transform accelerator. The operations include generating metadata in the memory hardware. The operations include reserving output buffer space in the memory hardware or in the memory of the data transform accelerator. The operations include generating a first data transform command associated with the input data and the metadata in the memory hardware and/or in the memory of the data transform accelerator. The operations include updating the container data structure with an address of the first data transform command. The address of the first data transform command is accessible by a data transform accelerator that is in data communication with the host. Accessing the address of the first data transform command by the data transform accelerator causes the data transform accelerator to obtain the input data, to perform one or more data transform operations on the input data based on the metadata, and to transmit output data to the output buffer. The output data is the input data after being transformed by the one or more data transform operations.

DESCRIPTION OF DRAWINGS

Example implementations will be described and explained with additional specificity and detail using the accompanying drawings in which:

FIG. 5 shows a flowchart of an example arrangement of operations for a method of generating the second data transform command for transforming the second source data in accordance with some implementations of this disclosure;

FIG. 6 shows a flowchart of an example arrangement of operations for a method of generating the second data transform pipeline and transforming the second source data using the second data transform pipeline in accordance with some implementations of this disclosure;

FIG. 8A and FIG. 8B show a flowchart of an example arrangement of operations for a method of generating the second container data structure and the third data transform command for transforming the third source data in accordance with some implementations of this disclosure;

FIG. 9 shows a flowchart of an example arrangement of operations for a method of generating the third data transform pipeline and transforming the third input data using the third data transform pipeline in accordance with some implementations of this disclosure;

FIG. 11 is a flowchart of an example arrangement of operations for a method of generating the fourth data transform command for transforming the fourth source data in accordance with some implementations of this disclosure;

FIG. 12 shows a flowchart of an example arrangement of operations for a method of generating the fourth data transform pipeline and transforming the fourth input data using the fourth data transform pipeline in accordance with some implementations of this disclosure;

FIG. 15 shows a flowchart of an example arrangement of operations for a method of generating the fifth data transform pipeline and transforming the fifth input data using the fifth data transform pipeline in accordance with some implementations of this disclosure;

FIG. 17 is a flowchart of an example arrangement of operations for a method of generating the sixth data transform command for transforming the sixth source data in accordance with some implementations of this disclosure;

FIG. 18 shows a flowchart of an example arrangement of operations for a method of generating the sixth data transform pipeline and transforming the sixth input data using the sixth data transform pipeline in accordance with some implementations of this disclosure;

Like reference symbols in the various drawings indicate like elements.

DETAILED DESCRIPTION

Figure 1:
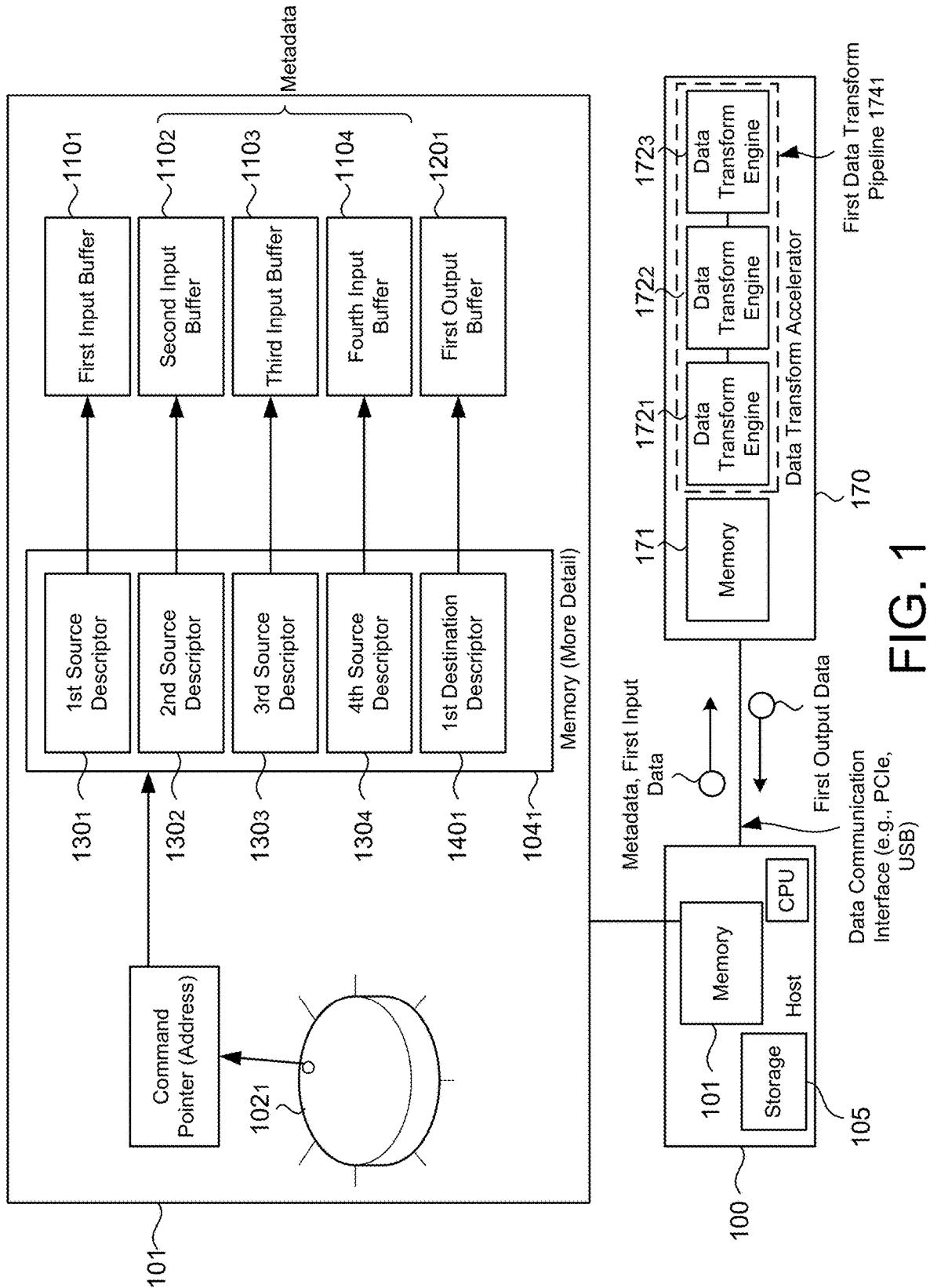
FIG. 1 illustrates a schematic view of an example first container data structure and an example first data transform command for transforming first source data in accordance with some implementation of this disclosure.

In some implementations, a host computing unit (e.g., host computer, host server) is in data communication (e.g., data communication using peripheral component interconnect express (PCIe) interface, data communication using universal serial bus (USB) interface) with a data transform accelerator (also referred to as co-processor) via a data communication interface, where the data transform accelerator may include one or more data transform engines (e.g., computing resources) and memory (e.g., on-chip memory).

In some implementations, the software (e.g., software driver) operating on the host computing unit generates a data transform command which is accessible by the data transform accelerator via the data communication interface. In some implementations, the data transform command includes one or more source descriptors and one or more destination descriptors. In some implementations, based on information (e.g., "data transform recipe" metadata (which may be placed in buffers dereferenced by one or more source descriptors)) obtained via the data transform command, the data transform accelerator obtains input data from the host computing unit (where input data may be placed in one or more input buffers dereferenced by source descriptors), transforms the input data, and transmits output data (e.g., transformed input data) to the host computing unit (e.g., one or more output buffers of the host computing unit dereferenced by one or more destination descriptors).

In some implementations, the software generates relevant data (e.g., input data, command metadata, command pre-data, additional command metadata) with respect to transforming source data associated with the data transform command at various locations (e.g., memory of the host computing unit, on-chip memory of the data transform accelerator).

In some implementations, the software generates the input data, the command metadata, the command pre-data, and the additional command metadata in a first input buffer of the host computing unit, a second input buffer of the host computing unit, a third input buffer of the host computing unit, and a fourth input buffer of the host computing unit, respectively. In this example, a first source descriptor of the data transform command is configured to point to the first input buffer including the input data (e.g., first source descriptor including a memory address of the first input buffer), a second source descriptor of the first data transform command is configured to point to the second input buffer including the command metadata (e.g., second source descriptor including a memory address of the second input buffer), a third source descriptor of the first data transform command is configured to point to the third input buffer including the command pre-data (e.g., third source descriptor including a memory address of the third input buffer), and the fourth source descriptor of the data transform command is configured to point to the fourth input buffer including the additional command metadata (e.g., fourth source descriptor including a memory address of the fourth input buffer). As a result, via the data communication interface, the data transform accelerator is able to access the input data from the host computing unit, the command metadata from the host computing unit, the command pre-data from the host computing unit, and the additional command metadata from the host computing unit by accessing the data transform command from the host computing unit.

In some implementations, the software generates the input data, the command metadata, the command pre-data, and the additional command metadata at the first input buffer of the host computing unit, a first location of the memory (e.g., on-chip memory) of the data transform accelerator, a second location of the memory (e.g., on-chip memory) of the data transform accelerator, and the third location of the memory (e.g., on-chip memory) of the data transform accelerator, respectively. In this example, the first source descriptor of the data transform command is configured to point to the first input buffer including the input data (e.g., first source descriptor including a memory address of the first input buffer), the second source descriptor of the data transform command is configured to point to the first location of the memory (e.g., first input buffer of on-chip memory) of the data transform accelerator including the command metadata (e.g., second source descriptor including an address of the first location of the memory of the transform accelerator), the third source descriptor of the data transform command is configured to point to the second location of the memory (e.g., second input buffer of on-chip memory) of the data transform accelerator including the command pre-data (e.g., third source descriptor including an address of the second location of the memory of the transform accelerator), and the fourth source descriptor is configured to point to the third location of the memory (e.g., third input buffer of on-chip memory) of the data transform accelerator including the additional command metadata (e.g., fourth source descriptor including an address of the third location of the memory of the transform accelerator). As a result, the data transform accelerator is able to access the first input data from the host computing unit via the data communication interface by accessing the data transform command from the host computing unit. In addition, the data transform accelerator is able to access the command metadata from own memory (e.g., on-chip memory), the command pre-data from own memory (e.g., on-chip memory), and the additional command metadata accelerator from own memory (e.g., on-chip memory). Alternatively, or additionally, any of the source descriptors (e.g., the first source descriptor, the second source descriptor, and so forth) may be configured to point to more than one input buffer for storing the input data included in the data transform command. Further, as described in various embodiments in the present disclosure, the input buffers (e.g., the first input buffer, the second input buffer, and so forth) may be located wholly in the memory of the host computing unit, wholly in the on-chip memory of the data transform accelerator, and/or a combination of the memory of the host computing unit and the on-chip memory of the data transform accelerator In some implementations, based on the command metadata, the command pre-data, and the additional command metadata (collectively or individually referred to as "metadata" in this disclosure), the data transform accelerator configures a data transform pipeline that performs a data transform operation or a combination of data transform operations (e.g., data compression, data decompression, data encryption, data decryption, data encoding, data decoding) on the input data. In some implementations, after carrying out the data transform operations on the input data, the data transform accelerator transmits or sends the output data (e.g., input data transformed by the data transform operations) to the host computing unit via the data communication interface.

In some implementations, as discussed above, the host computing unit is in data communication with the data transform accelerator via the data communication interface (e.g., PCIe interface, USB interface). In some implementations, as discussed above, the software stores or caches the metadata, such as the command metadata, the command pre-data, and the additional command metadata, at the memory (e.g., on-chip memory) of the data transform accelerator to reduce latency created from repeatedly obtaining the metadata via the data communication interface.

In some implementations, the data transform accelerator does not store or cache the metadata, such as the command metadata, the command pre-data, and the additional command metadata, at the memory (e.g., on-chip memory) of the data transform accelerator. In this example, the data transform accelerator obtains the metadata from the host computing via the data communication interface on demand via the data communication interface.

In some implementations, instead of generating the metadata for each data transform command, the metadata is shared with a plurality of data transform commands to reduce duplicate metadata in the memory (e.g., memory of host computing unit, on-chip memory of data transform accelerator). This may save memory (e.g., memory of host computing unit, on-chip memory of the data transform accelerator), CPU memory cycles for use by other components or operations, and when placed on the on-chip memory of the data transform accelerator, may improve latency and/or throughput of data transform operations.

In some implementations, as discussed above, the data transform command includes one or more destination descriptors. For example, the data transform command includes a destination descriptor pointing to an output buffer (of the host computing unit) that is reserved for the output data from the data transform accelerator (e.g., destination descriptor including a memory address of the output buffer). Alternatively, or additionally, any of the one or more destination descriptors may be configured to point to more than one output buffer for storing the output data from the data transform accelerator. Further, as described in various embodiments in the present disclosure, the one or more output buffers may be located wholly in the memory of the host computing unit, wholly in the on-chip memory of the data transform accelerator, and/or a combination of the memory of the host computing unit and the on-chip memory of the data transform accelerator. In some implementations, the data transform accelerator transmits or sends the output data to the output buffer after performing the data transform operations on the input data (e.g., source data in the memory of the host computing unit) via the data communication interface between the host computing unit and the data transform accelerator.

FIG. 1 illustrates a schematic view of an example first container data structure $102_1$ (also referred to as "command pointer ring") and an example first data transform command $104_1$ for transforming first source data, in accordance with some implementation of this disclosure.

In some implementations, a host computing unit 100 (e.g., computer, server) is in data communication with the data transform accelerator 170 (also referred to as co-processor) using a peripheral component interconnect express (PCIe) interface. In some implementations, the host computing unit 100 is in data communication with the data transform accelerator 170 using a universal serial bus (USB) interface.

In some implementations, the host computing unit 100 is in data communication with the data transform accelerator 170 using a suitable data transfer interface (e.g., industry standard interface, proprietary interface).

In some implementations, upon a request by a user to transform the first source data in a storage 105 associated with the host computing unit 100, software (e.g., software driver) operating on the host computing unit 100 generates relevant data (e.g., first input data, command metadata, command pre-data, additional command metadata) with respect to transforming the first source data in the memory 101 (e.g., random access memory) of the host computing unit 100. In some implementations, the software generates the first input data in the memory 101 of the host computing unit 100 based on the first source data from the storage 105 (e.g., copying or moving the first source data from the storage 105 to the memory 101 of the computing device 100).

In some implementations, the software generates the first input data, the command metadata, the command pre-data, and the additional command metadata in a first input buffer 110₁ (e.g., one or more memory blocks of the memory 101) of the host computing unit 100, a second input buffer 110₂ (e.g., one or more memory blocks of the memory 101) of the host computing unit 100, a third input buffer 110₃ (e.g., one or more memory blocks of the memory 101) of the host computing unit 100, and a fourth input buffer 110₄ (e.g., one or more memory blocks of the memory 101) of the host computing unit 100, respectively. In some implementations, the software reserves a first output buffer 120₁ (e.g., one or more memory blocks of the memory 101) for first output data (e.g., transformed first input data) from the data transform accelerator 170.

In some implementations, the software does not need to generate all of the command metadata, the command pre-data, and the additional command metadata depending on the data transform operations to be performed on the input data (first input data in this example). In some implementations, the command pre-data is optional. In some implementations, the additional command metadata is optional. In some implementations, the command pre-data and the additional command metadata are optional.

In some implementations, the command metadata specifies the data transform operations to be performed on the first input data by the data transform accelerator 170. In some implementations, the command metadata specifies a sequence or order of the data transform operations to be performed on the first input data. In some implementations, the command metadata specifies an algorithm for at least one data transform operation to be perform on the first input data. In some implementations, the command metadata specifies an algorithm for each of the data transform operations to be perform on the first input data.

In some implementations, the command pre-data is additional information that supports the data transform operations specified by the command metadata. In some implementations, the command pre-data includes initialization vector (IV) for data encryption/decryption operation. In some implementations, the command pre-data includes message authentication code (MAC) for data authentication operation. In some implementations, the command pre-data includes Galois counter mode (GCM) authentication tag for data authentication operation. In some implementations, the command pre-data includes additional authentication data (AAD) for data authentication operation.

In some implementations, the additional command metadata includes one or more "tokens" (e.g., source token, action token). In some implementations, the source token provides information that can be used to identify type of data present in the input buffers 110. In some implementations, the source token provides information with respect to the boundary between different types of data in the input buffers 110. For example, the source token provides information that the first "x" number of bytes of the command pre-data are associated with the initialization vector (IV) and "y" number of bytes, that are following the "x" number of bytes, are associated with the additional authentication data (AAD). In some implementations, the action token contains information about the data transform operations to be performed on the first input data, along with specific region (or section) of the first input data that corresponds to each of these operations. For example, the action token specifies that data encryption operation and data compression operation are performed on a first region of the first input data (e.g., first "x" number of bytes of the input data) and a second regions of the first input data, respectively.

In some implementations, to transform the first source data in the storage 105 associated with the host computing unit 100 by the data transform accelerator 170, the software generates the first data transform command 104₁ in the memory 101 of the host computing unit 100. In some implementations, the data transform accelerator 170 accesses the first data transform command 104₁ via the data communication interface to gain access to the first input data, the command metadata, the command pre-data, and the additional command metadata.

As shown, in some implementations, the first data transform command 104₁ includes one or more source descriptors 130 and one or more destination descriptors 140. In this example, the first container data structure 102₁ and the first data transform command 104₁ are in the memory 101 of the host computing unit 100.

As shown, in some implementations, the first data transform command 104₁ includes a first source descriptor 130₁, a second source descriptor 130₂, a third source descriptor 130₃, a fourth source descriptor 130₄, and a first destination descriptor 140₁. However, the present disclosure does not limit the number of the source descriptors 130 in the data transform command 104 since the data transform operations specified by the command metadata may be performed on multiple source data. Likewise, the present disclosure does not limit the number of the destination descriptors 140 in the data transform command 104 since the data transform operations specified by the command metadata may generate multiple output data.

Similarly, as illustrated, one source descriptor points to one input buffer (e.g., the first source descriptor 130₁ points to the first input buffer 110₁). In some implementations, one source descriptor may point to one or more input buffers and/or one or more source descriptors may point to one input buffer. In some implementations (and as described in various embodiments of the present disclosure), the source descriptors 130 may be disposed on the memory 101 of the host computing unit 100 and/or the memory 171 of the data transform accelerator 170. Similarly, in some implementations (and as described in various embodiments of the present disclosure), the input buffers 110 may be disposed on the memory 101 of the host computing unit 100 and/or the memory 171 of the data transform accelerator 170.

In some implementations, more than one output buffer 120 may be included in the present disclosure which may be used for writing output data obtained from data transform operations, as described herein. In some implementations, the first destination descriptor 140₁ may point to one or more output buffers. In some implementations (and as described in various embodiments of the present disclosure), the destination descriptors 140 may be disposed on the memory 101 of the host computing unit 100 and/or the memory 171 of the data transform accelerator 170. Similarly, in some implementations (and as described in various embodiments of the present disclosure), the output buffers 120 may be disposed on the memory 101 of the host computing unit 100 and/or the memory 171 of the data transform accelerator 170.

As shown, in some implementations, the software generates the first source descriptor $130_1$ that is pointing to the first input buffer $110_1$ which includes the first input data, the second source descriptor $130_2$ that is pointing to the second input buffer $110_2$ which includes the command metadata, the third source descriptor $130_3$ that is pointing to the third input buffer $110_3$ which includes the command pre-data, the fourth source descriptor $130_4$ that is pointing the fourth input buffer $110_4$ which includes the additional command metadata, and the first destination descriptor $140_1$ that is pointing to the first output buffer $120_1$ reserved for the first output data.

As shown, in some implementations, the software updates the first container data structure $102_1$ with an address (e.g., memory address) associated with the first data transform command $140_1$ (also referred to as "command pointer" to the first data transform command $140_1$). In some implementations, based on the address of the first data transform command $140_1$ in the first container data structure $102_1$, the data transform accelerator 170 accesses the first data transform command $140_1$. Then, the data transform accelerator 170 accesses the first source descriptor $130_1$ of the first data transform command $140_1$, the second source descriptor $130_2$ of the first data transform command $140_1$, the third source descriptor $130_3$ of the first data transform command $140_1$, and the fourth source descriptor $130_4$ of the first data transform command $140_1$. As a result, based on the first source descriptor $130_1$, the second source descriptor $130_2$, the third source descriptor $130_3$, and the fourth source descriptor $130_4$, the data transform accelerator 170 accesses the first input data, the command metadata, the command pre-data, and the additional command metadata, respectively via the data communication interface.

In some implementations, to receive or access a new data transform command 104 generated by the software, the data transform accelerator 170 is configured to monitor or detect an address of a new data transform command 104 in the container data structure 102. In this example, the data transform accelerator 170 detects the address of the first data transform command $104_1$ present in the first container data structure $102_1$. In response to a determination that the address of the first data transform command $104_1$ is present in the first container data structure $102_1$, the data transform accelerator 170 obtains or receives the first input data, the command metadata, the command pre-data, and the additional command metadata via the first source descriptor $130_1$, the second source descriptor $130_2$, the third source descriptor $130_3$, and the fourth source descriptor $130_4$, respectively, via the data communication interface between the host computing unit and the data transform accelerator 170.

In some implementations, the data transform accelerator 170 determines data transform operations to be performed on the first input data based on the command metadata. In some implementations, the data transform accelerator 170 determines an algorithm or algorithms for each of data transform operations based on the command metadata. In some implementations, the data transform accelerator 170 determines an algorithm or algorithms for at least one data transform operation based on the command metadata. In some implementations, the data transform accelerator 170 determines a sequence of the data transform operations (e.g., parallel, serial, any combination thereof) based on the command metadata.

In some implementations, the data transform accelerator 170 determines parameters (e.g., initialization vector (IV) for data encryption/decryption operation, message authentication code (MAC) for data authentication operation, Galois counter mode (GCM) authentication tag, additional authentication data (AAD) for data authentication operation) associated with the data transform operations based on the command pre-data and the source token. In some implementations, the data transform accelerator 170 determines or identifies regions (e.g. sections) within the first input data (or within a plurality of input data buffers) that correspond to various data transform operations based on the action token.

In some implementations, the data transform accelerator 170 configures a first data transform pipeline $174_1$ with one or more data transform engines 172 based on metadata (e.g., command metadata from the second input buffer $110_2$, command pre-data from the third input buffer $110_3$, additional command metadata from the fourth input buffer $110_4$). For example, the data transform accelerator 170 arranges the data transform engines 172 in the first data transform pipeline $174_1$ (e.g., linking or connecting the data transform engines 172) based on the metadata. In some implementations, the data transform accelerator 170 configures the data transform engines 172 based on the metadata.

Although the data transform pipeline 174 is illustrated in FIG. 1 and subsequent figures as being a single pipeline, in some implementations, the data transform accelerator 170 may configure more than one data transform pipeline 174, which may be based on the metadata as described herein. In such instances, any data transform pipeline 174 may be configured to perform data transform operations on the first input data. In some implementations, the data transform accelerator 170 may direct data transform operations to be performed based on an availability associated with the data transform pipelines 174. For example, in instances in which the data transform accelerator 170 includes a first data transform pipeline that is in use and a second data transform pipeline that is available, the data transform accelerator 170 may determine the second data transform pipeline be used to perform a subsequent data transform operations.

As a result, the data transform accelerator 170 transforms the first input data with the first data transform pipeline $174_1$ based on the metadata. In some implementations, after performing the data transform operations, the data transform accelerator 170 transmits the first output data (e.g., transformed first input output data from the data transform pipeline 174) to the host computing unit 100 (e.g., the first output buffer $120_1$ of the host computing unit 100 as indicated by the first destination descriptor $140_1$).

Modifications, additions, or omissions may be made to one or more components of FIG. 1 without departing from the scope of the present disclosure. For example, in some implementations, the input data that may include the metadata may be obtained from an alternate source (e.g., a source other than the memory 101 associated with the host device 100 and/or the memory 171 associated with the data transform accelerator 170). For example, the input data may be obtained via direct memory access to an alternate device, such as base address register (BAR) exposed memory on a network interface controller (NIC), controller memory buffer (CMB) memory on a solid state drive (SSD) or a redundant array of independent disks (RAID) controller, etc.

In general, the input data may be obtained from one or more sources and any reference herein to obtaining input data from a source may include one or more of the sources described herein.

In another example, the output data may be transmitted to any of the sources described herein, and/or to more than one source as described relative to the input data. In another example, one or more components of FIG. 1 may include any number of other components that may not be explicitly illustrated or described.

Figure 2A:
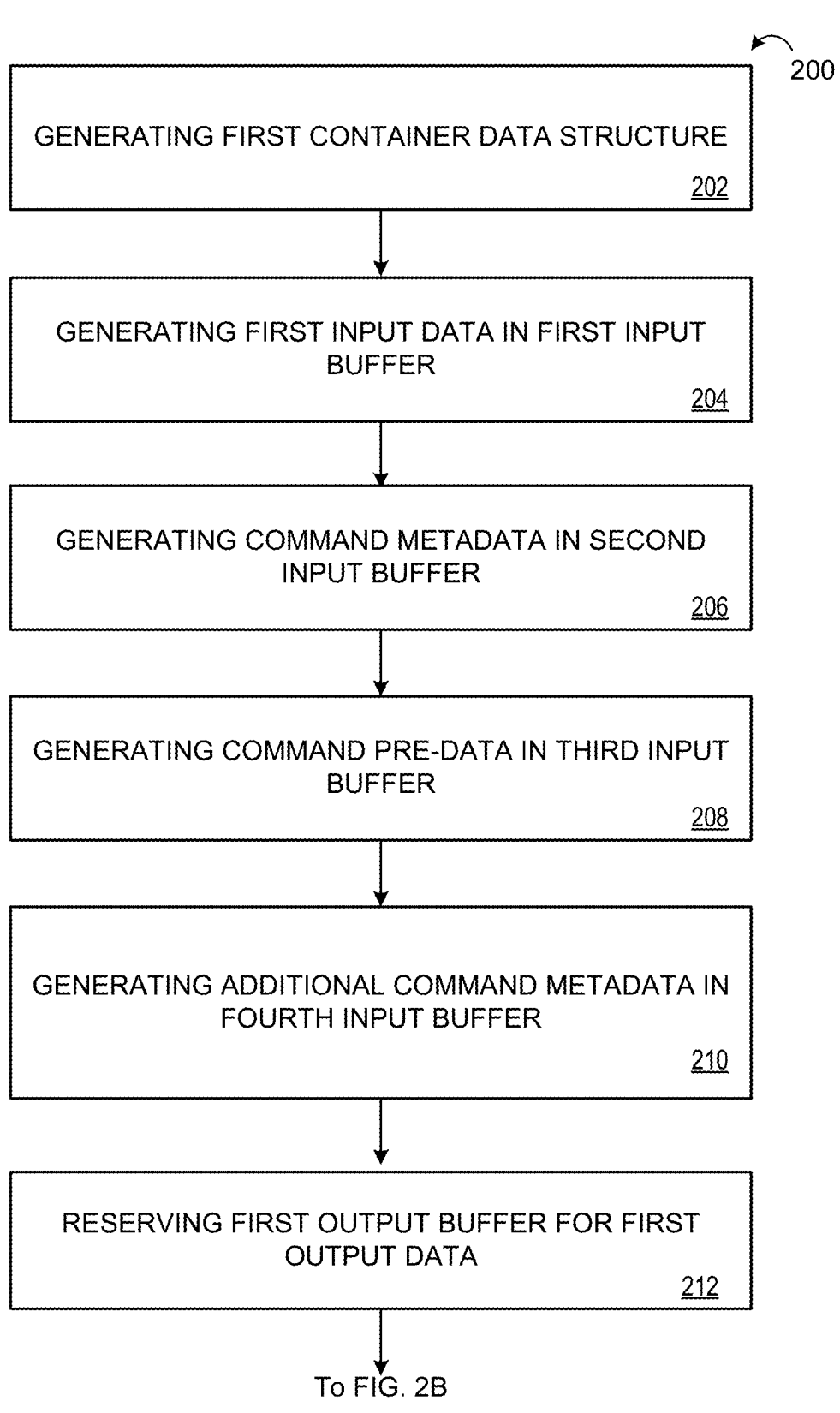
FIG. 2A and FIG. 2B show a flowchart of an example arrangement of operations for a method of generating the first container data structure and the first data transform command for transforming the first source data in accordance with some implementations of this disclosure.
Figure 2B:
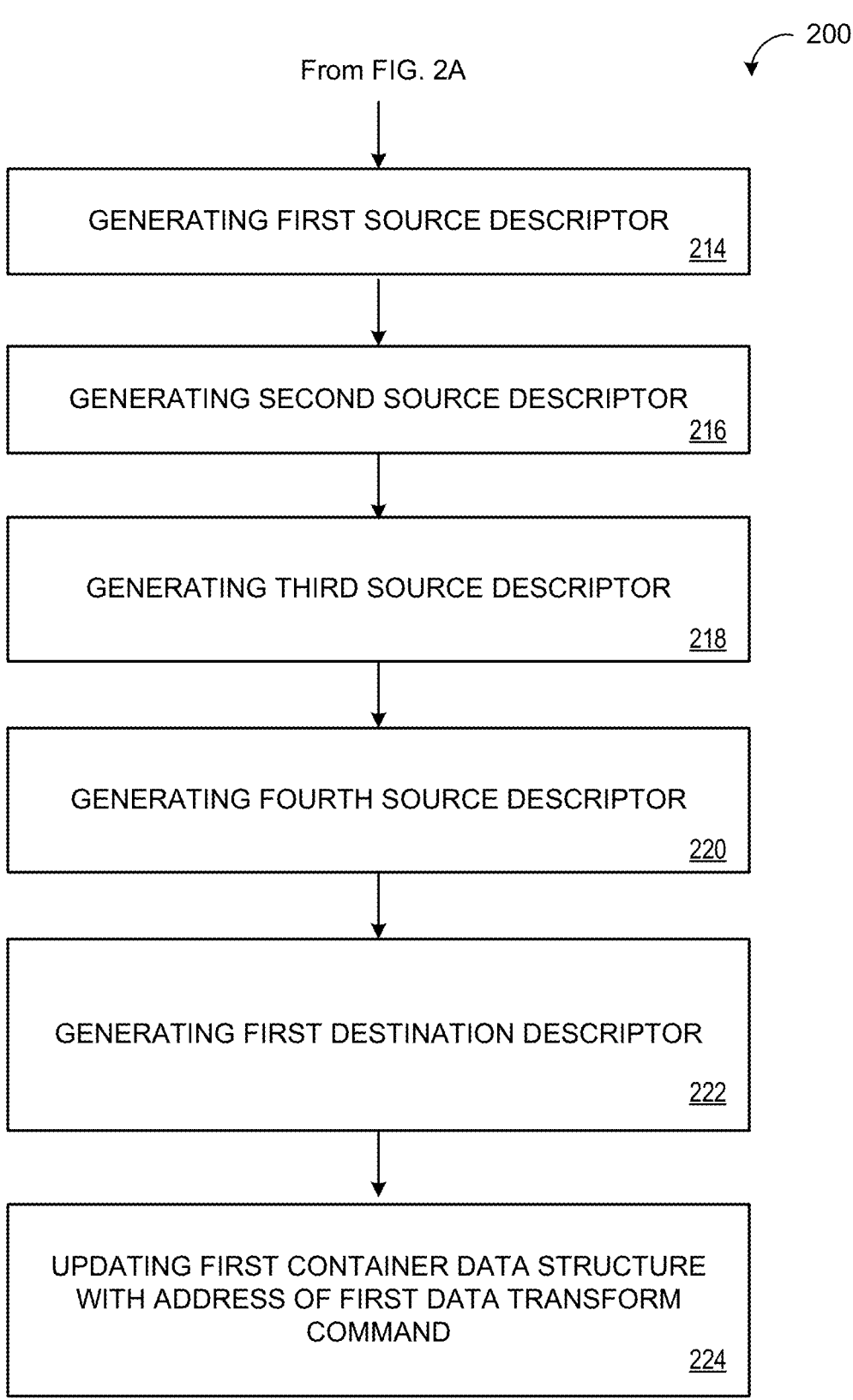

FIG. 2A and FIG. 2B show a flowchart of an example arrangement of operations for a method $200$ of generating the first container data structure $102_1$ and the first data transform command $104_1$ for transforming the first source data in accordance with some implementations of this disclosure. The method $200$ may be performed by processing logic that may include hardware (circuitry, dedicated logic, etc.), software (such as is run on a general purpose computer system or a dedicated machine), or a combination of both, which processing logic may be included in any computer system or device. In some implementations, the method $200$ is performed by processing logic that may include hardware (circuitry, dedicated logic, etc.), software (such as is run on a general purpose computer system or a dedicated machine), or a combination of both, which processing logic may be included in a host computing unit $100$ in communication with the data transform accelerator $170$.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, in some implementations, to transform the first source data in the storage $105$ associated with the host computing unit $100$, the software (e.g., software driver) generates the first input data, the command metadata, the command pre-data, and the additional command metadata in the first input buffer $110_1$ (e.g., one or more memory blocks of the memory $101$) of the host computing unit $100$, the second input buffer $110_2$ (e.g., one or more memory blocks of the memory $101$) of the host computing unit $100$, the third input buffer $110_3$ (e.g., one or more memory blocks of the memory $101$) of the host computing unit $100$, and the fourth input buffer $110_4$ (e.g., one or more memory blocks of the memory $101$) of the host computing unit $100$, respectively. In some implementations, the software reserves the first output buffer $120_1$ (e.g., one or more memory blocks of the memory $101$) for the first output data (e.g., first input data transformed by the data transform accelerator $170$).

As discussed, in some implementations, the software generates the first data transform command $104_1$ in the memory $101$ of the host computing device $100$. In some implementations, the first data transform command $104_1$ includes one or more source descriptors $130$ and one or more destination descriptors $140$. As shown, in some implementations, the first data transform command $104_1$ includes the first source descriptor $130_1$ pointing to the first input buffer $110_1$ which includes the first input data, the second source descriptor $130_2$ pointing to the second input buffer $110_2$ which includes the command metadata, the third source descriptor $130_3$ pointing to the third input buffer $110_3$ which includes the command pre-data, the fourth source descriptor $130_4$ pointing to the fourth input buffer $110_4$ which includes the additional command metadata, and the first destination descriptor $140_1$ pointing to the first output buffer $120_1$.

As discussed, in some implementations, the data transform accelerator $170$ accesses the first data transform command $104_1$ and obtains or receives the metadata (e.g., command metadata, command pre-data, additional command metadata) from the input buffers $110_{2-4}$ based on source descriptors $130_{2-4}$ of the first data transform command $104_1$. In some implementations, the data transform accelerator $170$ configures the first data transform pipeline $174_1$ with one or more data transform engines $172$ based on the metadata.

The method $200$, at operation $202$, includes generating, by the software operating on the host computing unit $100$, the first container data structure $102_1$ (also referred to as "command pointer ring") in the memory $101$ (e.g., random-access memory) of the host computing unit $100$. In some implementations, the software specifies or defines the size of the first container data structure $102_1$. In some implementations, the software specifies or defines the location of the first container data structure $102_1$. In some implementations, the software generates the first container data structure $102_1$ during the initialization step of the data transform accelerator $170$. In some implementations, the data transform accelerator $170$ is initialized when the status of the host computing unit $100$ changes from the OFF status to the ON status. In some implementations, the data transform accelerator $170$ is initialized when the software is executed on the host computing unit $100$.

The method $200$, at operation $204$, includes generating, by the software operating on the host computing unit $100$, the first input data in the first input buffer $110_1$.

The method $200$, at operation $206$, includes generating, by the software operating on the host computing unit $100$, the command metadata (also referred to as control words) in the second input buffer $110_2$.

The method $200$, at operation $208$, includes generating, by the software operating on the host computing unit $100$, the command pre-data in the third input buffer $110_3$.

The method $200$, at operation $210$, includes generating, by the software operating on the host computing unit $100$, the additional command metadata in the fourth input buffer $110_4$.

The method $200$, at operation $212$, includes reserving, by the software operating on the host computing unit $100$, the first output buffer $120_1$ for the first output data from the data transform accelerator $170$.

The method $200$, at operation $214$, includes generating, by the software operating on the host computing unit $100$, the first source descriptor $130_1$ (of the first data transform command $104_1$) which points to the first input buffer $110_1$ which includes the first input data.

The method $200$, at operation $216$, includes generating, by the software operating on the host computing unit $100$, the second source descriptor $130_2$ (of the first data transform command $104_1$) which points to the second input buffer $110_2$ which includes the command metadata.

The method 200, at operation 218, includes generating, by the software operating on the host computing unit 100, the third source descriptor $130_3$ (of the first data transform command $104_1$) which points to the third input buffer $110_3$ which includes the command pre-data.

The method 200, at operation 220, includes generating, by the software operating on the host computing unit 100, the fourth source descriptor $130_4$ (of the first data transform command $104_1$) which points to the fourth input buffer $110_4$ which includes the additional command metadata.

The method 200, at operation 222, includes generating, by the software operating on the host computing unit 100, the first destination descriptor $140_1$ (of the first data transform command $104_1$) which points to the first output buffer $120_1$ reserved for the output data from the data transform accelerator 170.

The method 200, at operation 224, includes updating, by the software operating on the host computing unit 100, the first container data structure $102_1$ with an address of the first data transform command $104_1$ including the first source descriptor $130_1$, the second source descriptor $130_2$, the third source descriptor $130_3$, the fourth source descriptor $130_4$, and the first destination descriptor $140_1$.

Figure 3:
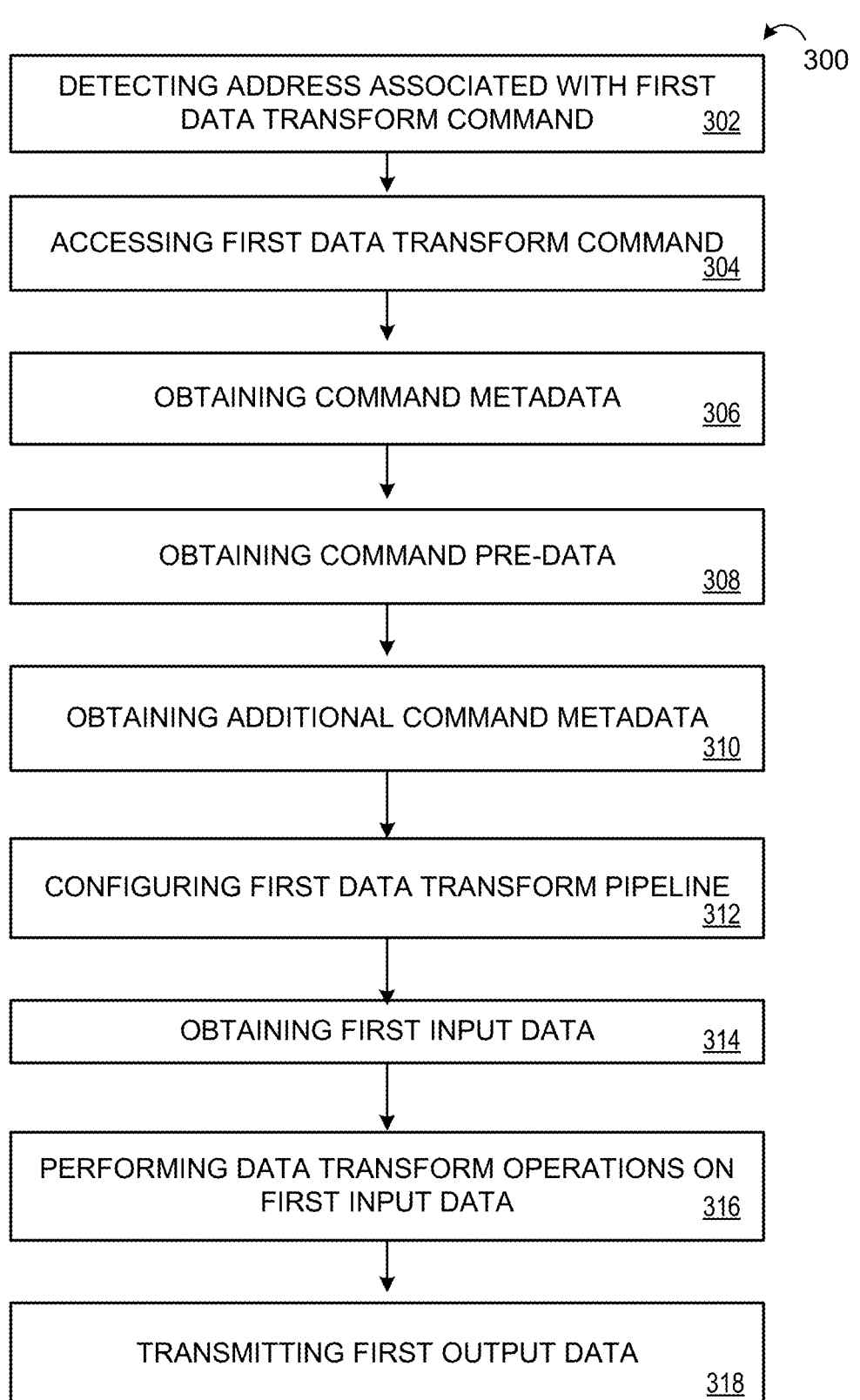
FIG. 3 shows a flowchart of an example arrangement of operations for a method of generating the first data transform pipeline and transforming the first input data using the first data transform pipeline in accordance with some implementations of this disclosure.

FIG. 3 shows a flowchart of an example arrangement of operations for a method 300 of generating a data transform pipeline, such as the first data transform pipeline $174_1$ of FIG. 1, and transforming the first input data using the first data transform pipeline $174_1$ in accordance with some implementations of this disclosure. The method 300 may be performed by processing logic that may include hardware (circuitry, dedicated logic, etc.), software (such as is run on a general purpose computer system or a dedicated machine), or a combination of both, which processing logic may be included in any computer system or device. In some implementations, the method 300 is performed by processing logic that may include hardware (circuitry, dedicated logic, etc.), software (such as is run on a general purpose computer system or a dedicated machine), or a combination of both, which processing logic may be included in a host computing unit 100 in communication with the data transform accelerator 170.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, in some implementations, to transform first source data in a storage 105 associated with the host computing unit 100, the software generates the first data transform command $104_1$ in the memory 101 of host computing device 100. In some implementations, the first data transform command $104_1$ includes one or more source descriptors 130 and one or more destination descriptors 140. For example, the first data transform command $104_1$ includes the first source descriptor $130_1$ pointing to the first input buffer $110_1$ which includes the first input data, the second source descriptor $130_2$ pointing to the second input buffer $110_2$ which includes the command metadata, the third source descriptor $130_3$ pointing to the third input buffer $110_3$ which includes the command pre-data, the fourth source descriptor $130_4$ pointing to the fourth input buffer $110_4$ which includes the additional command metadata, and the first destination descriptor pointing to the first output buffer $120_1$ reserved for the output data.

As discussed, in some implementations, the data transform accelerator 170 configures the first data transform pipeline $174_1$ with one or more data transform engines 172 based on the metadata (e.g., command metadata, command pre-data, additional command metadata) from the input buffers $110_{2-4}$.

The method 300, at operation 302, includes detecting, by the data transform accelerator 170, the address associated with the first data transform command $104_1$ (also referred to as command pointer) present in the first container data structure $102_1$. As discussed above, in some implementations, the software updates the first container data structure $102_1$ with an address of a new data transform command 104 after generating the new data transform command 104.

In response to detecting the address of the new data transform command 104 (first data transform command $104_1$ in this example) present in the first container data structure $102_1$, the method 300, at operation 304, includes accessing, by the data transform accelerator 170, the first data transform command $104_1$ based on the address obtained from the first container data structure $102_1$. By accessing the first data transform command $104_1$, the data transform accelerator 170 can access the first input data, the command metadata, the command pre-data, and the additional command metadata via the first source descriptor $130_1$, the second source descriptor $130_2$, the third source descriptor $130_3$, and the fourth source descriptor $130_4$. In some implementations, by accessing the first data transform command $104_1$, the data transform accelerator 170 can determine the first output buffer $1201_1$ based on the first destination descriptor $140_1$.

The method 300, at operation 306, includes obtaining or receiving, by the data transform accelerator 170, the command metadata via the second source descriptor $130_2$.

The method 300, at operation 308, includes obtaining or receiving, by the data transform accelerator 170, the command pre-data via the third source descriptor $130_3$.

The method 300, at operation 310, includes obtaining or receiving, by the data transform accelerator 170, the additional command metadata via the fourth source descriptor $130_4$.

The method 300, at operation 312, includes configuring, by the data transform accelerator 170, the first data transform pipeline $174_1$ with one or more data transform engines 172 based on the metadata (e.g., command metadata, command pre-data, additional command metadata). For example, the data transform accelerator 170 arranges the data transform engines 172 in the first data transform pipeline $174_1$ (e.g., linking or connecting the data transform engines 172) based on the metadata. In some implementations, the data transform accelerator 170 configures the data transform engines 172 based the metadata.

The method 300, at operation 314, includes obtaining, by the data transform accelerator 170, the first input data via the first source descriptor 130₁.

The method 300, at operation 316, includes performing, by the data transform accelerator 170, the data transform operations using the first data transform pipeline 174₁ on the first input data.

The method 300, at operation 318, includes transmitting, by the data transform accelerator 170, the first output data. In some implementations, the first output data is transmitted to the host computing unit 100 (e.g., the first output buffer 120₁ of the host computing unit 100).

Figure 4:
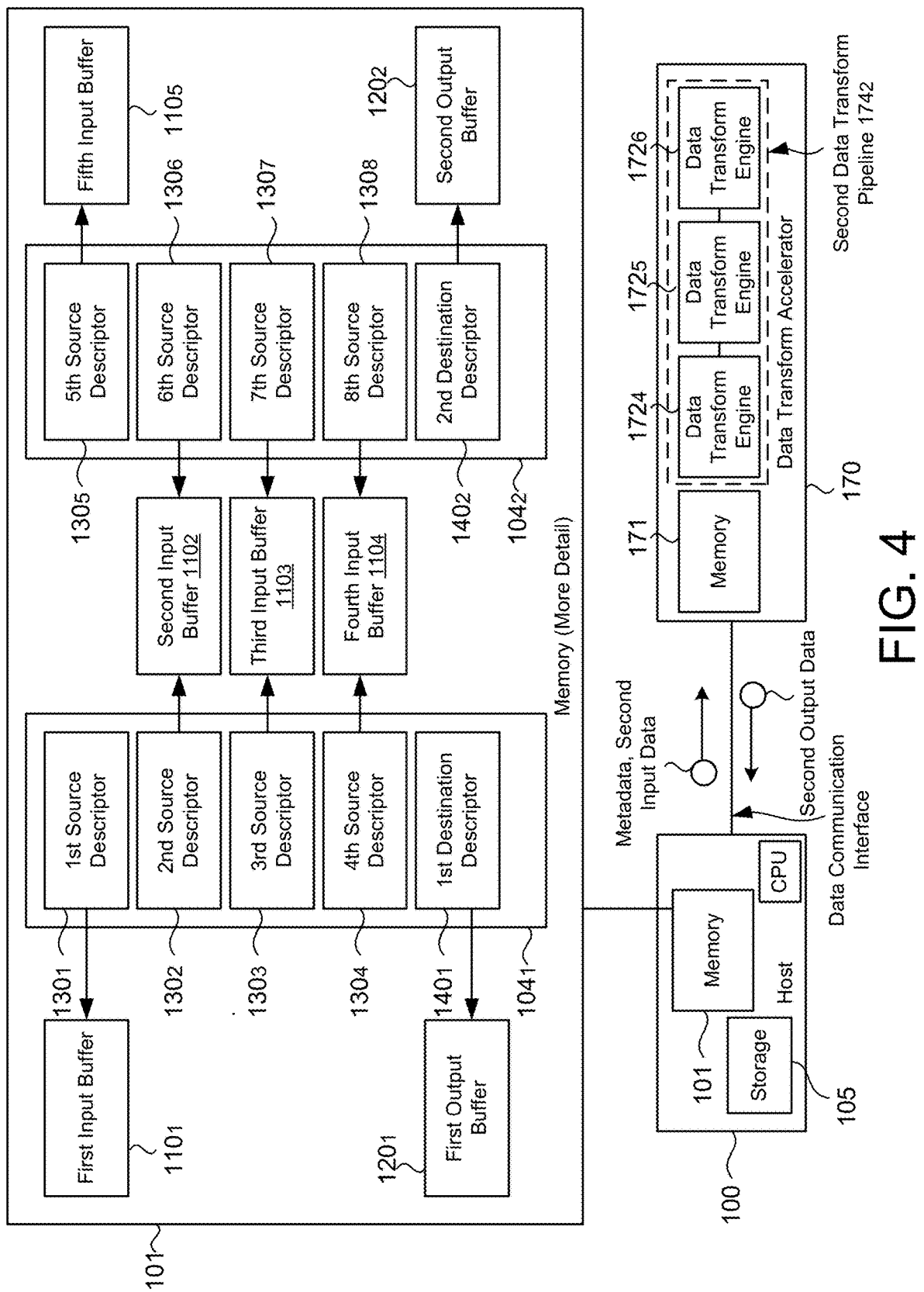
FIG. 4 illustrates a schematic view of the first data transform command for performing data transform operations on the first source data, and an example second data transform command for performing data transform operations on the second source data using the metadata associated with the first data transform command in accordance with some implementation of this disclosure.

FIG. 4 illustrates a schematic view of the first data transform command 104₁ for performing data transform operations on the first source data, and an example second data transform command 104₂ for performing data transform operations on the second source data using the metadata associated with the first data transform command 104₁ in accordance with some implementation of this disclosure.

As discussed, the software operating on the host computing unit 100 (e.g., computer, server) generates the metadata in the second input buffer 110₂, the command pre-data in the third input buffer 110₃, and the additional command metadata in the fourth input buffer 110₄ (that are associated with the first data transform command 104₁).

In some implementations, the metadata (e.g., command metadata, command pre-data, additional command metadata) associated with the first command 104₁ is also associated with other (subsequent) data transform commands 104 (second data transform command 104₂ in this example) when the software determines that information in the existing or current metadata (command metadata in the second input buffer 110₂, command pre-data in the third input buffer 110₃, additional command metadata in the fourth input buffer 110₄ in this example) is sufficient to execute the data transform operations on other source data (second source data in this example).

In some implementations, in response to determination that the information in the metadata is sufficient to execute the data transform operations on the second source data, the software uses the existing or current metadata instead of generating new metadata for the second data transform command 104₂.

As shown, in some implementations, to transform the second source data in the storage 105 associated with the host computing unit 100, the software generates the second input data in a fifth input buffer 110₅ (e.g., one or more memory blocks of the memory 101) of the host computing unit 100. In some implementations, the software generates the second input data in the fifth input buffer 110₅ based on the second source data from the storage 105 (e.g., copying or moving the second source data from the storage 105 to the memory 101 of the computing device 100). In some implementations, the software reserves a second output buffer 120₂ (e.g., one or more memory blocks of the memory 101) for second output data (e.g., transformed second input data by the data transform accelerator 170).

As shown, in some implementations, the software generates the second data transform command 104₂ including one or more source descriptors 130 and one or more destination descriptors 140.

As shown, in some implementations, the software generates a fifth source descriptor 130s that is pointing to the fifth input buffer 110₅ which includes the second input data, a sixth source descriptor 130₆ that is pointing to the second input buffer 110₂ which includes the command metadata, a seventh source descriptor 130₇ that is pointing to the third input buffer 110₃ which includes the command pre-data, an eighth source descriptor 130s that is pointing the fourth input buffer 110₄ which includes the additional command metadata, and a second destination descriptor 140₂ pointing to the second output buffer 120₂ reserved for the second output data.

As shown, in some implementations, the software updates the first container data structure 102₁ (shown in FIG. 1) with an address (e.g., memory address) associated with the second data transform command 140₂. In some implementations, based on the address in the first container data structure 102₁, the data transform accelerator 170 accesses the second data transform command 104₂. Then, the data transform accelerator 170 accesses the fifth source descriptor 130s of the second data transform command 104₂, the sixth source descriptor 130₆ of the second data transform command 104₂, the seventh source descriptor 130₇ of the second data transform command 104₂, and the eighth source descriptor 130s of the second data transform command 104₂. In some implementations, the data transform accelerator 170 accesses the second destination descriptor 140₂ pointing to the second output buffer 120₂ and determines the reserved location for the second output data (second output buffer 120₂ in this example).

In some implementations, based on the fifth source descriptor 130s pointing to the second input data, the sixth source descriptor 130₆ pointing to the command metadata (which is also associated with the first data transform command 104₁), the seventh source descriptor 130₇ pointing to the command pre-data (which is also associated with the first data transform command 104₁), and the eighth source descriptor 130s pointing to the additional command metadata (which is also associated with the first data transform command 104₁), the data transform accelerator 170 accesses the second input data, the command metadata, the command pre-data, and the additional command metadata via the data communication interface, respectively.

In some implementations, the data transform accelerator 170 configures a second data transform pipeline 174₂ with one or more data transform engines 172 based on metadata (e.g., command metadata from the second input buffer 110₂, command pre-data from the third input buffer 110₃, additional command metadata from the fourth input buffer 110₄). For example, the data transform accelerator 170 arranges the data transform engines 172 in the second data transform pipeline 174₂ (e.g., linking or connecting the data transform engines 172) based on the metadata. In some implementations, the data transform accelerator 170 configures the data transform engines 172 based on the metadata.

As a result, the data transform accelerator 170 transforms the second input data with the second data transform pipeline 174₂ based on the metadata. In some implementations, after performing the data transform operations, the data transform accelerator 170 transmits the second output data to the host computing unit 100 (e.g., the second output buffer 120₂ of the host computing unit 100 as indicated by the second destination descriptor 140₂).

In some implementations, the software moves or copy the "common" metadata (e.g., the command metadata at the second input buffer 110₂, command pre-data at the third input buffer 110₃, additional command metadata at the fourth input buffer 110₄) to a cache (e.g., hardware cache) of a central processing device of the host computing unit 100. In some implementations, after moving the "common" metadata, the software updates the second source descriptor 130₂, the third source descriptor 130₃, the fourth source descriptor 130₄, the sixth source descriptor 130₆, the seventh

US 12,645,380 B2

17 source descriptor $130_7$, and the eighth source descriptor $130_8$. As result, the second source descriptor $130_2$ and the sixth source descriptor $130_6$ are pointing to the command metadata in the cache memory of the central processing device of the host computing unit 100, the third source descriptor $130_3$ and the seventh source descriptor $130_7$ are pointing to the command pre-data in the cache memory of the central processing device of the host computing unit 100, the fourth source descriptor $130_4$ and the eighth source descriptor $130_8$ are pointing to the additional command metadata in the cache memory of the central processing device of the host computing unit 100.

FIG. 5 shows a flowchart of an example arrangement of operations for a method 500 of generating the second data transform command $104_2$ for transforming the second source data in accordance with some implementations of this disclosure. The method 500 may be performed by processing logic that may include hardware (circuitry, dedicated logic, etc.), software (such as is run on a general purpose computer system or a dedicated machine), or a combination of both, which processing logic may be included in any computer system or device. In some implementations, the method 500 is performed by processing logic that may include hardware (circuitry, dedicated logic, etc.), software (such as is run on a general purpose computer system or a dedicated machine), or a combination of both, which processing logic may be included in a host computing unit 100 in communication with the data transform accelerator 170.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, in some implementations, to transform the second source data in the storage 105 associated with the host computing unit 100, the software (e.g., software driver) generates the second input data in the fifth input buffer $110_5$ (e.g., one or more memory blocks of the memory 101) of the host computing unit 100. In some implementations, the software reserves the second output buffer $120_2$ (e.g., one or more memory blocks of the memory 101) for the second output data (e.g., transformed second input data) from the data transform accelerator 170. In some implementations, the software may not generate new metadata (e.g., command metadata, command pre-data, additional command metadata) when the software determines that information in the existing or current metadata (command metadata in the second input buffer $110_2$, command pre-data in the third input buffer $110_3$, additional command metadata in the fourth input buffer $110_4$ in this example) is sufficient to execute the data transform operations on the second input data.

As discussed, in some implementations, the software generates the second data transform command $104_2$. In some implementations, the second data transform command $104_2$ includes one or more source descriptors 130 and one or more destination descriptors 140. In some implementations, the second data transform command $104_2$ includes the fifth source descriptor $130_5$ pointing to the fifth input buffer $110_5$, the sixth source descriptor $130_6$ pointing to the second input buffer $110_2$, the seventh source descriptor $130_7$ pointing to the third input buffer $110_3$, the eighth source descriptor $130_4$ pointing to the fourth input buffer $110_4$, and the second destination descriptor $140_2$ pointing to the second output buffer $120_2$.

In some implementations, the data transform accelerator 170 configures the second data transform pipeline $174_2$ with one or more data transform engines 172 based on the existing metadata (e.g., command metadata, command pre-data, additional command metadata) from the input buffers $110_{2-4}$. In this example, the data transform accelerator 170 transforms the second input data based on the metadata and outputs the result (second output data in this example) to the second output buffer $120_2$ which is pointed by the second destination descriptor $140_2$ of the second data transform command $104_2$.

The method 500, at operation 502, includes determining whether information in the existing metadata (the command metadata in the second input buffer $110_2$, command pre-data in the third input buffer $110_3$, additional command metadata in the fourth input buffer $110_4$ in this example) associated with the first data transform command $104_1$ is sufficient to execute the data transform operations on the second source data from the storage 105 associated with the host computing unit 100. In other words, the software determines whether information in the "existing" metadata is sufficient to configure the second data transform pipeline $174_2$ to transform the second source data. For example, the existing metadata includes information to compress the first source data using data compression algorithm A in certain sequence and the software generates the second data transform command $104_2$ to compress the second source data using the data compression algorithm A in the same or similar sequence. In this case, if the software determines that the existing metadata includes sufficient information to compress the second source data as intended, the software may use the existing metadata. In response to a determination that the information in the existing metadata is sufficient to execute the data transform operations on the second source data, the software may not generate the new metadata.

The method 500, at operation 504, includes generating, by the software operating on the host computing unit 100, the second input data in the fifth input buffer $110_5$ (e.g., one or more memory blocks).

The method 500, at operation 506, includes reserving, by the software operating on the host computing unit 100, the second output buffer $120_2$ (e.g., one or more memory blocks) for the second output data from the data transform accelerator 170.

The method 500, at operation 508, includes generating, by the software operating on the host computing unit 100, the fifth source descriptor $130_5$ (of the second data transform command $104_2$) which points to the fifth input buffer $110_5$ which includes the second input data.

The method 500, at operation 510, includes generating, by the software operating on the host computing unit 100, the sixth source descriptor $130_6$ (of the second data transform command $104_2$) which points to the second input buffer $110_2$ which includes the command metadata.

The method $500$, at operation $512$, includes generating, by the software operating on the host computing unit $100$, the seventh source descriptor $130_7$ (of the second data transform command $104_2$) which points to the third input buffer $110_3$ which includes the command pre-data.

The method $500$, at operation $514$, includes generating, by the software operating on the host computing unit $100$, the eighth source descriptor $130_8$ (of the second data transform command $104_2$) which points to the fourth input buffer $110_4$ which includes the additional command metadata.

The method $500$, at operation $516$, includes generating, by the software operating on the host computing unit $100$, the second destination descriptor $140_2$ (of the second data transform command $104_2$) which points to the second output buffer $120_2$ reserved for the output data from the data transform accelerator $170$.

The method $500$, at operation $518$, includes updating, by the software operating on the host computing unit $100$, the first container data structure $102_1$ with the address of the second data transform command $104_2$ including the fifth source descriptor $130_5$, the sixth source descriptor $130_6$, the seventh source descriptor $130_7$, the eight source descriptor $130_8$, and the second destination descriptor $140_2$.

FIG. 6 shows a flowchart of an example arrangement of operations for a method $600$ of generating the second data transform pipeline $174_2$ and transforming the second source data using the second data transform pipeline $174_2$ in accordance with some implementations of this disclosure. The method $600$ may be performed by processing logic that may include hardware (circuitry, dedicated logic, etc.), software (such as is run on a general purpose computer system or a dedicated machine), or a combination of both, which processing logic may be included in any computer system or device. In some implementations, the method $600$ is performed by processing logic that may include hardware (circuitry, dedicated logic, etc.), software (such as is run on a general purpose computer system or a dedicated machine), or a combination of both, which processing logic may be included in a host computing unit $100$ in communication with the data transform accelerator $170$.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, in some implementations, the software (e.g., software driver) generates the second data transform command $104_2$. In some implementations, the second data transform command $104_2$ includes one or more source descriptors $130$ and one or more destination descriptors $140$. For example, the second data transform command $104_2$ includes the fifth source descriptor $130_5$ pointing to the fifth input buffer $110_5$ which includes the second input data, the sixth source descriptor $130_6$ pointing to the second input buffer $110_2$ which includes the command metadata, the seventh source descriptor $130_7$ pointing to the third input buffer $110_3$ which includes the command pre-data, the eighth source descriptor $130_8$ pointing to the fourth input buffer $110_4$ which includes the additional command metadata, and the second destination descriptor $140_2$ pointing to the second output buffer $120_2$ reserved for the output data.

As discussed, in some implementations, the data transform accelerator $170$ configures the second data transform pipeline $174_2$ with one or more data transform engines $172$ based on the metadata (e.g., command metadata, command pre-data, additional command metadata) from the input buffers $110_{2-4}$.

The method $600$, at operation $602$, includes detecting, by the data transform accelerator $170$, the address associated with the second data transform command $104_2$ (also referred to as command pointer) present in the first container data structure $102_1$. As discussed above, in some implementations, the software updates the first container data structure $102_1$ with an address of a new data transform command $104$ after generating the new data transform command $104$.

In response to detecting the address of the second data transform command $104_2$ present in the first container data structure $102$, the method $600$, at operation $604$, includes accessing, by the data transform accelerator $170$, the second data transform command $104_2$ based on the address obtained from the first container data structure $102_1$. By accessing the second data transform command $104_2$, the data transform accelerator $170$ can access the second input data, the command metadata, the command pre-data, and the additional command metadata via the fifth source descriptor $130_5$, the sixth source descriptor $130_6$, the seventh source descriptor $130_7$, and the eighth source descriptor $130_8$. In some implementations, by accessing the second data transform command $104_2$, the data transform accelerator $170$ can determine the second output buffer $120_2$ based on the second destination descriptor $140_2$. In this example, the software re-utilizes the metadata (e.g., command metadata, command pre-data, additional command metadata) that was used to transform the first source data.

The method $600$, at operation $606$, includes obtaining or receiving, by the data transform accelerator $170$, the command metadata via the sixth source descriptor $130_6$.

The method $600$, at operation $608$, includes obtaining or receiving, by the data transform accelerator $170$, the command pre-data via the seventh source descriptor $130_7$.

The method $600$, at operation $610$, includes obtaining or receiving, by the data transform accelerator $170$, the additional command metadata via the eighth source descriptor $130_8$.

The method $600$, at operation $612$, includes configuring, by the data transform accelerator $170$, the second data transform pipeline $174_2$ with one or more data transform engines $172$ based on the metadata (e.g., command metadata, command pre-data, additional command metadata). For example, the data transform accelerator $170$ arranges the data transform engines $172$ in the second data transform pipeline $174_2$ (e.g., linking or connecting the data transform engines $172$) based on the metadata. In some implementations, the data transform accelerator $170$ configures the data transform engines $172$ based the metadata.

The method $600$, at operation $614$, includes obtaining, by the data transform accelerator $170$, the second input data via the fifth source descriptor $130_5$.

The method 600, at operation 616, includes performing, by the data transform accelerator 170, the data transform operations using the second data transform pipeline 174₂ on the second input data.

The method 600, at operation 618, includes transmitting, by the data transform accelerator 170, the second output data to the host computing unit 100 (e.g., the second output buffer 120₂ of the host computing unit 100).

Figure 7:
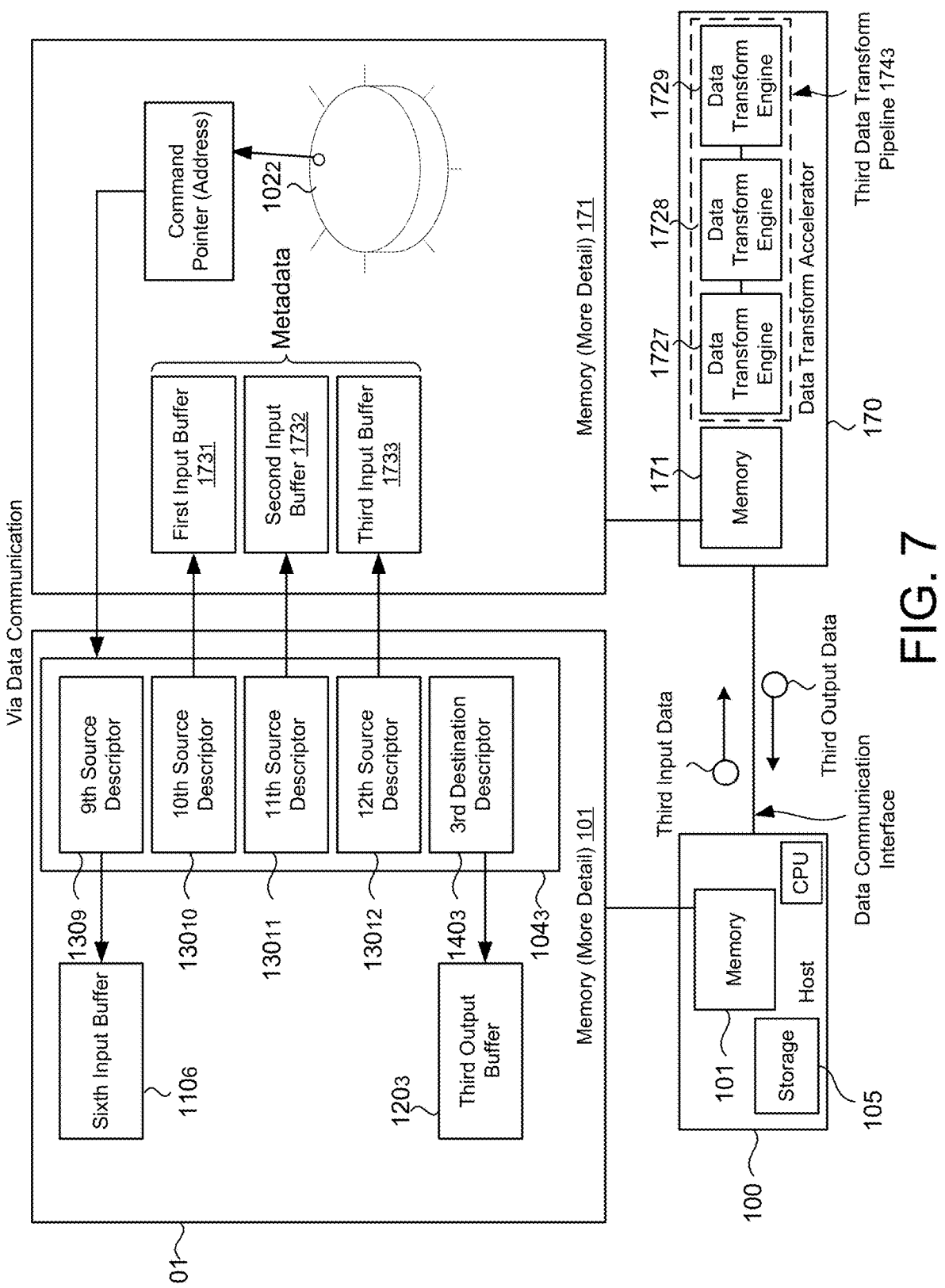
FIG. 7 illustrates a schematic view of an example second container data structure and an example third data transform command for performing data transform operations on third source data in accordance with some implementation of this disclosure.

FIG. 7 illustrates a schematic view of an example second container data structure 102₂ (also referred to as "command pointer ring") and an example third data transform command 104₃ for performing data transform operations on third source data in accordance with some implementation of this disclosure.

In some implementations, the software stores or caches the metadata (e.g., command metadata, command pre-data, the additional command metadata) in the memory 171 (e.g., on-chip memory) of the data transform accelerator 170 to reduce latency created from repeatedly obtaining the metadata via the data communication interface between the host computing unit 100 and the data transform accelerator 170.

As shown, in some implementations, to transform third source data in a storage 105 associated with the host computing unit 100, software (e.g., software driver) operating on the host computing unit 100 (e.g., computer, server) generates relevant data (e.g., third input data, command metadata, command pre-data, additional command metadata) with respect to transforming the third source data associated with the third data transform command 104₃ at various locations. In some implementations, the software generates the third input data, the command metadata, the command pre-data, and the additional command metadata in a sixth input buffer 110₆ (e.g., one or more memory blocks of the memory 101) of the host computing unit 100, a first input buffer 173₁ of the memory 171 (e.g., on-chip memory) of the data transform accelerator 170, a second input buffer 173₂ of the memory 171 (e.g., on-chip memory) of the data transform accelerator 170, a third input buffer 173₃ of the memory 171 (e.g., on-chip memory) of the data transform accelerator 170, respectively. In some implementations, the software reserves a third output buffer 120₃ (e.g., one or more memory blocks of the memory 101) of the host computing unit 100 for the third output data from the data transform accelerator 170. In some implementations, the software generates the third input data in the memory 101 of the host computing unit 100 based on the third source data from the storage 105 (e.g., copying or moving the third source data from the storage 105 to the memory 101 of the computing device 100).

In some implementations, the software generates the third data transform command 104₃ in the memory 101. As shown, in some implementations, the third data transform command 104₃ includes one or more source descriptors 130 and one or more destination descriptors 140. As shown, in some implementations, the second container data structure 102₂ is provided in the memory 171 (e.g., on-chip memory) of the data transform accelerator 170 and the third data transform command 104₃ is provided in the memory 101 of the host computing unit 100.

As shown, in some implementations, the third data transform command 104₃ includes a ninth source descriptor 130₉, a tenth source descriptor 130₁₀, an eleventh source descriptor 130₁, a twelfth source descriptor 130₁₂, and a third destination descriptor 140₃. However, as discussed above, the present disclosure does not limit the number of the source descriptors 130 in the data transform command 104. Likewise, as discussed above, the present disclosure does not limit the number of the destination descriptors 140 in the data transform command 104.

As shown, in some implementations, the software generates the ninth source descriptor 130₉ that is pointing to the sixth input buffer 110₆ which includes the third input data, the tenth source descriptor 130₁₀ that is pointing to the first input buffer 173₁ (of the memory 171 of the data transform accelerator 170) which includes the command metadata, the eleventh source descriptor 130₁ that is pointing to the second input buffer 173₂ (of the memory 171 of the data transform accelerator 170) which includes the command pre-data, the twelfth source descriptor 130₁₂ that is pointing the third input buffer 173₃ (of the memory 171 of the data transform accelerator 170) which includes the additional command metadata, and the third destination descriptor 140₃ pointing to the third output buffer 120₃ reserved for the third output data.

As shown, in some implementations, the software updates the second container data structure 102₂ with an address (e.g., memory address) associated with the third data transform command 104₃. In some implementations, based on the address in the second container data structure 102₂, the data transform accelerator 170 accesses the third data transform command 140₃ in the host computing unit 100. Then, the data transform accelerator 170 accesses the ninth source descriptor 130₉ of the third data transform command 104₃, the tenth source descriptor 130₁₀ of the third data transform command 104₃, the eleventh source descriptor 130₁ of the third data transform command 104₃, and the twelfth source descriptor 130₁₂ of the third data transform command 104₃. Based on the ninth source descriptor 130₉, the tenth source descriptor 130₁₀, the eleventh source descriptor 130₁₁, and the twelfth source descriptor 130₁₂, the data transform accelerator 170 accesses the third input data, the command metadata, the command pre-data, and the additional command metadata, respectively.

In some implementations, the data transform accelerator 170 is configured to monitor the second container data structure 102₂. For example, the data transform accelerator 170 is configured to detect an address of new data transform command 104 present in the second container data structure 102₂. In this example, in response to determining that the address of the third data transform command 104₃ is present in the second container data structure 102₂, the data transform accelerator 170 obtains or receives the third input data, the command metadata, the command pre-data, and the additional command metadata via the ninth source descriptor 130₉, the tenth source descriptor 130₁₀, the eleventh source descriptor 130₁, and the twelfth source descriptor 130₁₂, respectively. In this example, the data transform accelerator 170 obtains the third input data from the host computing unit 100 using the interface between the host computing unit 100 and the data transform accelerator 170 (e.g., PCIe, USB). As shown, in this example, the data transform accelerator 170 obtains the command metadata, the command pre-data, and the additional command metadata from the memory 171 (e.g., on-chip memory) of the data transform accelerator 170.

In some implementations, the data transform accelerator 170 determines data transform operations to be performed on the third input data based on the command metadata. In some implementations, the data transform accelerator 170 determines an algorithm or algorithms for each of data transform operations based on the command metadata. In some implementations, the data transform accelerator 170 determines an algorithm or algorithms for at least one data transform operation based on the command metadata. In some implementations, the data transform accelerator 170 determines a sequence of the data transform operations (e.g., parallel, serial, any combination thereof) based on the command metadata.

In some implementations, the data transform accelerator 170 determines parameters (e.g., initialization vector (IV) for data encryption/decryption operation, message authentication code (MAC) for data authentication operation, Galois counter mode (GCM) authentication tag, additional authentication data (AAD) for data authentication operation) associated with the data transform operations based on the command pre-data and the source token. In some implementations, the data transform accelerator 170 determines or identifies regions (e.g. sections) within the third input data that correspond to various data transform operations based on the action token.

In some implementations, the data transform accelerator 170 configures a third data transform pipeline 174₃ with one or more data transform engines 172 based on metadata (e.g., command metadata from the first input buffer 173₁ of the memory 171 (e.g., on-chip memory) of the data transform accelerator 170, the command pre-data from the second input buffer 173₂ of the memory 171 (e.g., on-chip memory) of the data transform accelerator 170, the third input buffer 173₃ of the memory 171 (e.g., on-chip memory) of the data transform accelerator 170). For example, the data transform accelerator 170 arranges the data transform engines 172 in the third data transform pipeline 174₃ (e.g., linking or connecting the data transform engines 172) based on the metadata. In some implementations, the data transform accelerator 170 configures the data transform engines 172 based on the metadata.

As a result, the data transform accelerator 170 transforms the third input data with the third data transform pipeline 174₃ based on the metadata. In some implementations, after performing the data transform operations, the data transform accelerator 170 transmits the third output data (e.g., transformed third input data) to the host computing unit 100 (e.g., the third output buffer 120₃ of the host computing unit 100 as indicated by the third destination descriptor 140₃).

Figure 8B:
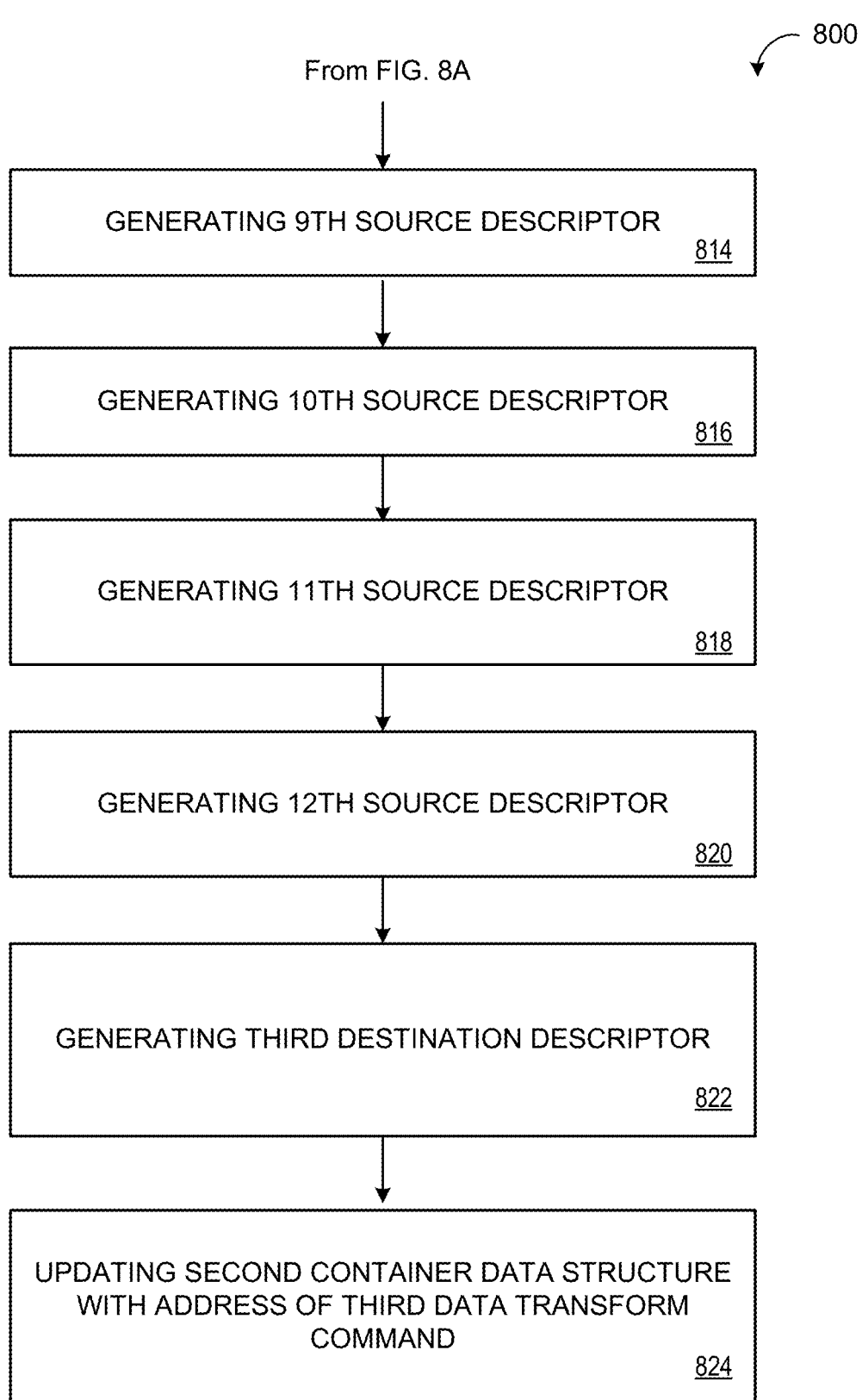

FIG. 8A and FIG. 8B show a flowchart of an example arrangement of operations for a method 800 of generating the second container data structure 102₂ and the third data transform command 104₃ for transforming the third source data in accordance with some implementations of this disclosure. The method 800 may be performed by processing logic that may include hardware (circuitry, dedicated logic, etc.), software (such as is run on a general purpose computer system or a dedicated machine), or a combination of both, which processing logic may be included in any computer system or device. In some implementations, the method 800 is performed by processing logic that may include hardware (circuitry, dedicated logic, etc.), software (such as is run on a general purpose computer system or a dedicated machine), or a combination of both, which processing logic may be included in a host computing unit 100 in communication with the data transform accelerator 170.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods dis-closed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, in some implementations, the software (e.g., software driver) generates the third input data, the command metadata, the command pre-data, and the additional command metadata in the sixth input buffer 110₆ (e.g., one or more memory blocks of the memory 101) of the host computing unit 100, the first input buffer 173₁ of the memory 171 (e.g., on-chip memory) of the data transform accelerator 170, the second input buffer 173₂ of the memory 171 (e.g., on-chip memory) of the data transform accelerator 170, and the third input buffer 173₃ of the memory 171 (e.g., on-chip memory) of the data transform accelerator 170, respectively. In some implementations, the software reserves a third output buffer 120₃ (e.g., one or more memory blocks of the memory 101) of the host computing unit 100 for the third output data from the data transform accelerator 170.

As discussed, in some implementations, the software generates the third data transform command 104₃. In some implementations, the third data transform command 104₃ includes one or more source descriptors 130 and one or more destination descriptors 140. As shown, in some implementations, the third data transform command 104₃ includes the ninth source descriptor 130₉ pointing to the sixth input buffer 110₆, the tenth source descriptor 130₁₀ pointing to the first input buffer 173₁ of the memory 171 (e.g., on-chip memory) of the data transform accelerator 170, the eleventh source descriptor 130₁₁ pointing to the second input buffer 173₂ of the memory 171 (e.g., on-chip memory) of the data transform accelerator 170, the twelfth source descriptor 130₁₂ pointing to the third input buffer 173₂ of the memory 171 (e.g., on-chip memory) of the data transform accelerator 170, and third destination descriptor 140₃ pointing to the third output buffer 120₃. In some implementations, the data transform accelerator 170 configures the third data transform pipeline 174₃ with one or more data transform engines 172 based on the metadata (e.g., command metadata, command pre-data, additional command metadata) from the memory 171 (e.g., on-chip memory) of the data transform accelerator 170.

The method 800, at operation 802, includes generating, by the software operating on the host computing unit 100, the second container data structure 102₂ (also referred to as command pointer ring) in the memory 171 (e.g., on-chip memory) of the data transform accelerator 170. In some implementations, the software generates the second container data structure 102₂ during the initialization step of the data transform accelerator 170. In some implementations, the data transform accelerator 170 is initialized when the status of the host computing unit 100 changes from the OFF status to the ON status. In some implementations, the data transform accelerator 170 is initialized when the software is executed on the host computing unit 100.

The method 800, at operation 804, includes generating, by the software operating on the host computing unit 100, the third input data in the sixth input buffer 110₆ (e.g., one or more memory blocks) of the host computing unit 100.

The method 800, at operation 806, includes generating, by the software operating on the host computing unit 100, the command metadata (also referred to as control words) in the first input buffer 173₁ of the memory 171 (e.g., on-chip memory) of the data transform accelerator 170.

The method 800, at operation 808, includes generating, by the software operating on the host computing unit 100, the command pre-data in the second input buffer 173₂ of the memory 171 (e.g., on-chip memory) of the data transform accelerator 170.

The method 800, at operation 810, includes generating, by the software operating on the host computing unit 100, the additional command metadata in the third input buffer 173₃ of the memory 171 (e.g., on-chip memory) of the data transform accelerator 170.

The method 800, at operation 812, includes reserving, by the software operating on the host computing unit 100, the third output buffer 120₃ (e.g., one or more memory blocks of the memory 101) of the host computing unit 100 for the third output data from the data transform accelerator 170.

The method 800, at operation 814, includes generating, by the software operating on the host computing unit 100, the ninth source descriptor 130₉ (of the third data transform command 104₃) which points to the sixth input buffer 110₆ which includes the third input data.

The method 800, at operation 816, includes generating, by the software operating on the host computing unit 100, the tenth source descriptor 130₁₀ (of the third data transform command 104₃) which points to the first input buffer 173₁ of the memory 171 (e.g., on-chip memory) of the data transform accelerator 170 which includes the command metadata.

The method 800, at operation 818, includes generating, by the software operating on the host computing unit 100, the eleventh source descriptor 130₁₁ (of the third data transform command 104₃) which points to the second input buffer 173₂ of the memory 171 (e.g., on-chip memory) of the data transform accelerator 170 which includes the command pre-data.

The method 800, at operation 820, includes generating, by the software operating on the host computing unit 100, the twelfth source descriptor 130₁₂ (of the third data transform command 104₃) which points to the third input buffer 173₃ of the memory 171 (e.g., on-chip memory) of the data transform accelerator 170 which includes the additional command metadata.

The method 800, at operation 822, includes generating, by the software operating on the host computing unit 100, the third destination descriptor 140₃ (of the third data transform command 104₃) which points to the third output buffer 120₃ reserved for the third output data from the data transform accelerator 170.

The method 800, at operation 824, includes updating, by the software operating on the host computing unit 100, the second container data structure 102₂ with the address of the third data transform command 104₃ including the ninth source descriptor 130₉, the tenth source descriptor 130₁₀, the eleventh source descriptor 130₁₁, the twelfth source descriptor 130₁₂, and a third destination descriptor 140₃.

FIG. 9 shows a flowchart of an example arrangement of operations for a method 900 of generating the third data transform pipeline 174₃ and transforming the third input data using the third data transform pipeline 174₃ in accordance with some implementations of this disclosure. The method 900 may be performed by processing logic that may include hardware (circuitry, dedicated logic, etc.), software (such as is run on a general purpose computer system or a dedicated machine), or a combination of both, which processing logic may be included in any computer system or device. In some implementations, the method 900 is performed by processing logic that may include hardware (circuitry, dedicated logic, etc.), software (such as is run on a general purpose computer system or a dedicated machine), or a combination of both, which processing logic may be included in a host computing unit 100 in communication with the data transform accelerator 170.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, the software (e.g., software driver) generates the third data transform command 104₃ in the memory 101 of the host computing unit 100. In some implementations, the third data transform command 104₃ includes one or more source descriptors 130 and one or more destination descriptors 140. For example, the third data transform command 104₃ includes the ninth source descriptor 130₉ pointing to the sixth input buffer 110₆ including the third input data, the tenth source descriptor 130₁₀ pointing to the first input buffer 173₁ of the memory 171 (of the data transform accelerator 170) including the command metadata, the eleventh source descriptor 130₁₁ pointing to the second input buffer 173₂ of the memory 171 (of the data transform accelerator 170) including the command pre-data, the twelfth source descriptor 130₁₂ including the additional command metadata, and the third destination descriptor 140₃ pointing to the third output buffer 120₃ reserved for the third output data.

As discussed, in some implementations, the data transform accelerator 170 configures the third data transform pipeline 174₃ with one or more data transform engines 172 based on the metadata (e.g., command metadata, command pre-data, additional command metadata) from the input buffers 173₁₋₃ of the memory 171 of the data transform accelerator 170.

The method 900, at operation 902, includes detecting, by the data transform accelerator 170, the address associated with the third data transform command 104₃ (also referred to as command pointer) present in the second container data structure 102₂. As discussed above, in some implementations, the software updates the second container data structure 102₂ with the address of the third data transform command 104₃ after generating the third data transform command 104₃.

In response to detecting the address of the third data transform command 104₃ present in the second container data structure 102₂, the method 900, at operation 904, includes accessing, by the data transform accelerator 170, the third data transform command $104_3$ based on the address obtained from the second container data structure $102_2$. By accessing the third data transform command $104_3$, the data transform accelerator 170 can access the third input data, the command metadata, the command pre-data, and the additional command metadata via the ninth source descriptor $130_9$, the tenth source descriptor $130_{10}$, the eleventh source descriptor $130_{11}$, and the twelfth source descriptor $130_{12}$. In some implementations, by accessing the third data transform command $104_3$, the data transform accelerator 170 can determine the third output buffer $120_3$ based on the third destination descriptor $140_3$.

The method 900, at operation 906, includes obtaining or receiving, by the data transform accelerator 170, the command metadata via the tenth source descriptor $130_{10}$.

The method 900, at operation 908, includes obtaining or receiving, by the data transform accelerator 170, the command pre-data via the eleventh source descriptor $130_{11}$.

The method 900, at operation 910, includes obtaining or receiving, by the data transform accelerator 170, the additional command metadata via the twelfth source descriptor $130_{12}$.

The method 900, at operation 912, includes configuring, by the data transform accelerator 170, the third data transform pipeline $174_3$ with one or more data transform engines 172 based on the metadata (e.g., command metadata, command pre-data, additional command metadata). For example, the data transform accelerator 170 arranges the data transform engines 172 in the third data transform pipeline $174_3$ (e.g., linking or connecting the data transform engines 172) based on the metadata. In some implementations, the data transform accelerator 170 configures the data transform engines 172 based the metadata.

The method 900, at operation 914, includes obtaining, by the data transform accelerator 170, the third input data via the ninth source descriptor $130_9$.

The method 900, at operation 916, includes performing, by the data transform accelerator 170, the data transform operations using the third data transform pipeline $174_3$ on the third input data.

The method 900, at operation 918, includes transmitting, by the data transform accelerator 170, the third output data to the host computing unit 100 (e.g., the third output buffer $120_3$ of the host computing unit 100).

Figure 10:
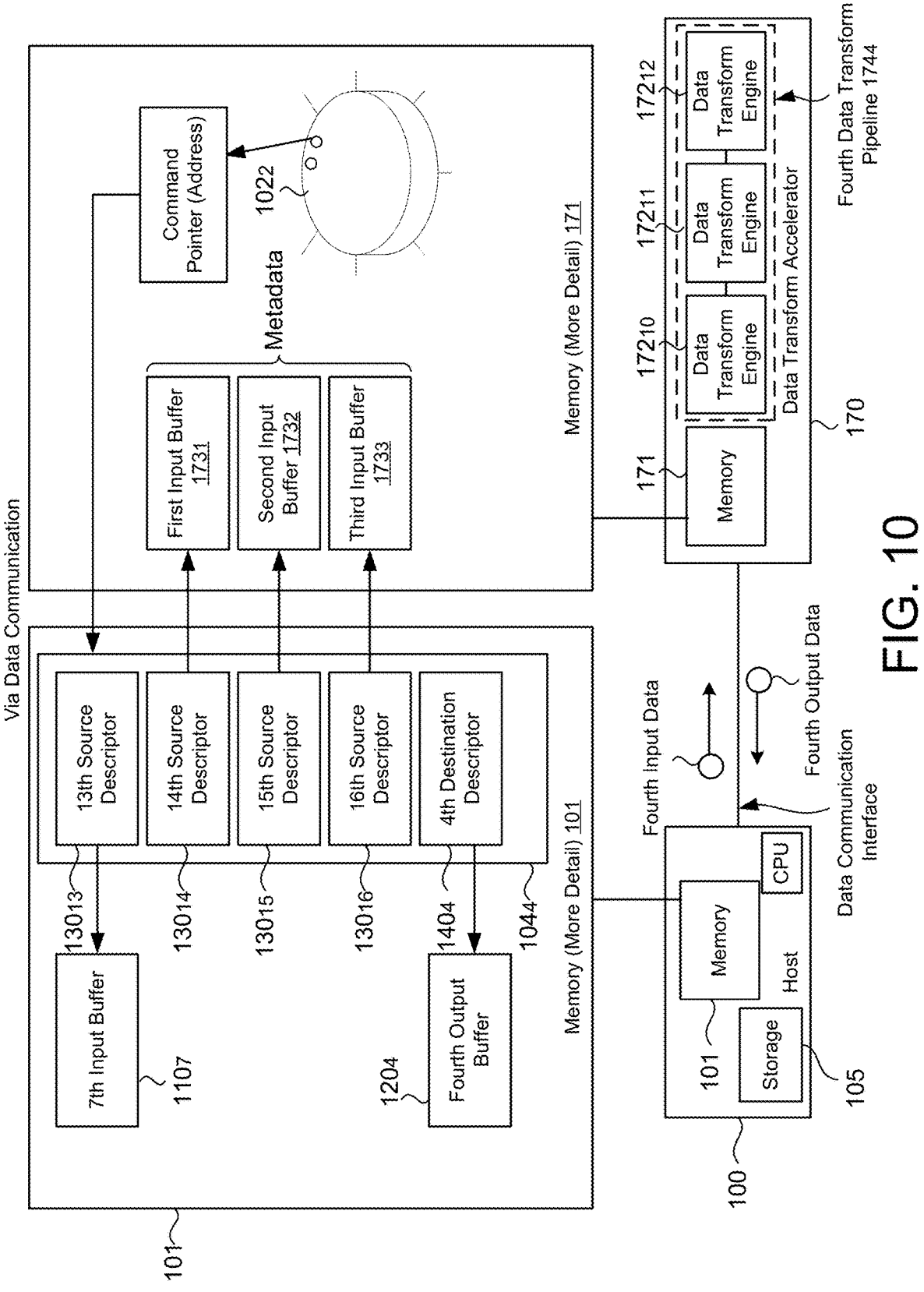
FIG. 10 illustrates a schematic view of the example second container data structure, the third data transform command for performing data transform operations on the third source data (shown in FIG. 7), and an example fourth data transform command for performing data transform operations on fourth source data using the metadata associated with the third data transform command in accordance with some implementation of this disclosure.

FIG. 10 illustrates a schematic view of the example second container data structure $102_2$ (also referred to as "command pointer ring"), the third data transform command $104_3$ for performing data transform operations on the third source data (shown in FIG. 7), and an example fourth data transform command $104_4$ for performing data transform operations on fourth source data using the metadata associated with the third data transform command $104_3$ in accordance with some implementation of this disclosure.

As discussed, to transform the third source data, the software operating on the host computing unit 100 (e.g., computer, server) generates the metadata in the first input buffer $173_1$ of the memory 171 (e.g., on-chip memory) of the data transform accelerator 170, the second input buffer $173_2$ of the memory 171 (e.g., on-chip memory) of the data transform accelerator 170, a third input buffer $173_3$ of the memory 171 (e.g., on-chip memory) of the data transform accelerator 170.

In some implementations, the metadata (e.g., command metadata, command pre-data, additional command metadata) associated with the third command $104_3$ is also associated with the fourth data transform command $104_4$ when the software determines that information in the existing or current metadata (command metadata in the first input buffer $173_1$, command pre-data in the second input buffer $110_2$, additional command metadata in the third input buffer $173_3$ in this example) is sufficient to execute the data transform operations on the fourth source data.

In some implementations, in response to determination that the information in the metadata is sufficient to execute the data transform operations on the fourth source data, the software uses the existing or current metadata instead of generating new metadata for the fourth data transform command $104_4$.

As shown, in some implementations, the software generates the fourth input data in a seventh input buffer $110_7$ (e.g., one or more memory blocks of the memory 101) of the host computing unit 100. In some implementations, the software reserves a fourth output buffer $120_4$ (e.g., one or more memory blocks of the memory 101) for fourth output data (i.e., transformed fourth input data) from the data transform accelerator 170. In some implementations, the software generates the fourth input data in the memory 101 of the host computing unit 100 based on the fourth source data from the storage 105 (e.g., copying or moving the fourth source data from the storage 105 to the memory 101 of the computing device 100).

As shown, in some implementations, the software generates the fourth data transform command $104_4$ including one or more source descriptors 130 and one or more destination descriptors 140. As shown, in some implementations, the software generates a thirteenth source descriptor $130_{13}$ that is pointing to the seventh input buffer $110_7$ which includes the fourth input data, a fourteenth source descriptor $130_{14}$ that is pointing to the first input buffer $173_1$ of the memory 171 (of the data transform accelerator 170) which includes the command metadata, a fifteenth source descriptor $130_{15}$ that is point to the second input buffer $173_2$ of the memory 171 (of the data transform accelerator 170) which includes the command pre-data, a sixteen source descriptor $130_{16}$ that is point to the third input buffer $173_3$ of the memory 171 (of the data transform accelerator 170) which includes the additional command metadata, and a fourth destination descriptor $140_4$ which points to the fourth output buffer $120_4$ reserved for the fourth output data.

As shown, in some implementations, the software updates the second container data structure $102_2$ with an address (e.g., memory address) associated with the fourth data transform command $140_4$. In some implementations, based on the address in the second container data structure $102_2$, the data transform accelerator 170 accesses the fourth data transform command $140_4$. Then, the data transform accelerator 170 accesses the thirteenth source descriptor $130_{13}$ of the fourth data transform command $104_4$, the fourteenth source descriptor $130_{14}$ of the fourth data transform command $104_4$, the fifteenth source descriptor $130_{15}$ of the fourth data transform command $104_4$, and the sixteenth source descriptor $130_{16}$ of the fourth data transform command $104_4$. In some implementations, the data transform accelerator 170 accesses the fourth destination descriptor $140_4$ pointing to the fourth output buffer $120_4$ and determines the reserved location for the fourth output data (fourth output buffer $120_4$ in this example).

In some implementations, based on the thirteenth source descriptor $130_{13}$ pointing to the fourth input data, the data transform accelerator 170 accesses the fourth input data via the data communication interface. In some implementations, based on the fourteen source descriptor $130_{14}$ pointing to the command metadata (which is also associated with the third data transform command $104_3$), the fifteenth source descriptor $130_{15}$ pointing to the command pre-data (which is also associated with the third data transform command $104_3$), and the sixteenth source descriptor $130_{16}$ pointing to the additional command metadata (which is also associated with the third data transform command $104_3$), the data transform accelerator 170 accesses the command metadata, the command pre-data, and the additional command metadata via the data communication interface, respectively.

In some implementations, the data transform accelerator 170 configures a fourth data transform pipeline $174_4$ with one or more data transform engines 172 based on metadata (e.g., command metadata from the first input buffer $173_1$ of the memory 171 of the data transform accelerator 170, command pre-data from the second input buffer $173_2$ of the memory 171 of the data transform accelerator 170, additional command metadata from the fourth input buffer $110_4$). For example, the data transform accelerator 170 arranges the data transform engines 172 in the fourth data transform pipeline $174_4$ (e.g., linking or connecting the data transform engines 172) based on the metadata. In some implementations, the data transform accelerator 170 configures the data transform engines 172 based on the metadata.

As a result, the data transform accelerator 170 transforms the fourth input data with the fourth data transform pipeline $174_4$ based on the metadata. In some implementations, after performing the data transform operations, the data transform accelerator 170 transmits the fourth output data (e.g., transformed fourth input data) to the host computing unit 100 (e.g., the fourth output buffer $120_4$ of the host computing unit 100 as indicated by the fourth destination descriptor $140_4$).

FIG. 11 is a flowchart of an example arrangement of operations for a method 1100 of generating the fourth data transform command $104_4$ for transforming the fourth source data in accordance with some implementations of this disclosure. The method 1100 may be performed by processing logic that may include hardware (circuitry, dedicated logic, etc.), software (such as is run on a general purpose computer system or a dedicated machine), or a combination of both, which processing logic may be included in any computer system or device. In some implementations, the method 1100 is performed by processing logic that may include hardware (circuitry, dedicated logic, etc.), software (such as is run on a general purpose computer system or a dedicated machine), or a combination of both, which processing logic may be included in a host computing unit 100 in communication with the data transform accelerator 170.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, in some implementations, the software (e.g., software driver) generates the fourth input data in the seventh input buffer $110_7$ (e.g., one or more memory blocks of the memory 101) of the host computing unit 100. In some implementations, the software reserves the fourth output buffer $120_4$ (e.g., one or more memory blocks of the memory 101) for the fourth output data (i.e., transformed fourth input data) from the data transform accelerator 170. In some implementations, the software may not generate new metadata (e.g., command metadata, command pre-data, additional command metadata) when the software determines that information in the existing or current metadata (command metadata at the first input buffer $173_1$ of the memory 171, command pre-data at the second input buffer $173_2$ of the memory 171, additional command metadata at the third input buffer $173_3$ of the memory 171 in this example) is sufficient to execute the data transform operations on the fourth source data.

As discussed, in some implementations, the software (e.g., software driver) generates the fourth data transform command $104_4$. In some implementations, the fourth data transform command $104_4$ includes one or more source descriptors 130 and one or more destination descriptors 140. As shown, in some implementations, the fourth data transform command $104_4$ includes the thirteenth source descriptor $130_{13}$ that is pointing to the seventh input buffer $110_7$ which includes the fourth input data, the fourteenth source descriptor $130_{14}$ that is pointing to the first input buffer $173_1$ of the memory 171 (of the data transform accelerator 170) which includes the command metadata, the fifteenth source descriptor $130_{15}$ that is point to the second input buffer $173_2$ of the memory 171 (of the data transform accelerator 170) which includes the command pre-data, the sixteen source descriptor $130_{16}$ that is point to the third input buffer $173_3$ of the memory 171 (of the data transform accelerator 170) which includes the additional command metadata, and the fourth destination descriptor $140_4$ is pointing to the fourth output buffer $120_4$ reserved for the fourth output data.

In some implementations, the data transform accelerator 170 configures the fourth data transform pipeline $174_4$ with one or more data transform engines 172 based on the existing metadata (e.g., command metadata, command pre-data, additional command metadata) from the memory 171 (on-chip memory) of the data transform accelerator 170. In this example, the data transform accelerator 170 transforms the fourth input data based on the metadata and outputs the result (fourth output data in this example) to the fourth output buffer $120_4$ which is pointed by the fourth destination descriptor $140_4$ of the fourth data transform command $104_4$ generated based on the fourth command.

The method 1100, at operation 1102, includes determining whether information in the existing metadata (command metadata at the first input buffer $173_1$ of the memory 171 of the data transform accelerator 170, command pre-data at the second input buffer $173_2$ of the memory 171 of the data transform accelerator 170, additional command metadata at the third input buffer $173_3$ of the memory 171 of the data transform accelerator 170) associated with the third data transform command $104_3$ is sufficient to execute the data transform operations on the fourth source data. In other words, the software determines whether information in the "existing" metadata is sufficient to configure the fourth data transform pipeline $174_4$ to transform the fourth source data. For example, the existing metadata includes information to compress the third source data using data compression algorithm A in certain sequence and the software generates the fourth data transform command $104_4$ to compress the fourth source data using the data compression algorithm A in the same or similar sequence. In this case, if the software determines that the existing metadata includes sufficient information to compress the fourth source data as intended, the software may use the existing metadata. In response to a determination that the information in the existing metadata is sufficient to execute the data transform operations on the fourth source data, the software may not generate the new metadata.

The method 1100, at operation 1104, includes generating, by the software operating on the host computing unit 100, the fourth input data in the seventh input buffer 110₇ (e.g., one or more memory blocks).

The method 1100, at operation 1106, includes reserving, by the software operating on the host computing unit 100, the fourth output buffer 120₄ (e.g., one or more memory blocks) for the output data from the data transform accelerator 170.

The method 1100, at operation 1108, includes generating, by the software operating on the host computing unit 100, the thirteenth source descriptor 130₁₃ (of the fourth data transform command 104₄) which points to the seventh input buffer 110₇ including the fourth input data.

The method 1100, at operation 1110, includes generating, by the software operating on the host computing unit 100, the fourteenth source descriptor 130₁₄ (of the fourth data transform command 104₄) which points to the first input buffer 173₁ of the memory 171 (of the data transform accelerator 170) including the command metadata.

The method 1100, at operation 1112, includes generating, by the software operating on the host computing unit 100, the fifteenth source descriptor 130₁₅ (of the fourth data transform command 104₄) which points to the second input buffer 173₂ of the memory 171 (of the data transform accelerator 170) including the command pre-data.

The method 1100, at operation 1114, includes generating, by the software operating on the host computing unit 100, the sixteenth source descriptor 130₁₆ (of the fourth data transform command 104₄) which points to the third input buffer 173₃ of the memory 171 (of the data transform accelerator 170) including the additional command metadata.

The method 1100, at operation 1116, includes generating, by the software operating on the host computing unit 100, the fourth destination descriptor 140₄ (of the fourth data transform command 104₄) which points to the fourth output buffer 120₄ reserved for the output data from the data transform accelerator 170.

The method 1100, at operation 1118, includes updating, by the software operating on the host computing unit 100, the second container data structure 102₂ with an address of the fourth data transform command 104₄ including the thirteenth source descriptor 130₁₃, the fourteenth source descriptor 130₁₄, the fifteenth source descriptor 130₁₅, the sixteenth source descriptor 130₁₆, and the fourth destination descriptor 140₄.

FIG. 12 shows a flowchart of an example arrangement of operations for a method 1200 of generating the fourth data transform pipeline 174₄ and transforming the fourth input data using the fourth data transform pipeline 174₄ in accordance with some implementations of this disclosure. The method 1200 may be performed by processing logic that may include hardware (circuitry, dedicated logic, etc.), software (such as is run on a general purpose computer system or a dedicated machine), or a combination of both, which processing logic may be included in any computer system or device. In some implementations, the method 1200 is performed by processing logic that may include hardware (circuitry, dedicated logic, etc.), software (such as is run on a general purpose computer system or a dedicated machine), or a combination of both, which processing logic may be included in a host computing unit 100 in communication with the data transform accelerator 170.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, in some implementations, the software (e.g., software driver) generates the fourth data transform command 104₄. In some implementations, the fourth data transform command 104₄ includes one or more source descriptors 130 and one or more destination descriptors 140. For example, the fourth data transform command 104₄ includes the thirteenth source descriptor 130₁₃ that is pointing to the seventh input buffer 110₇ which includes the fourth input data, the fourteenth source descriptor 130₁₄ that is pointing to the first input buffer 173₁ of the memory 171 (of the data transform accelerator 170) which includes the command metadata, the fifteenth source descriptor 130₁₅ that is point to the second input buffer 173₂ of the memory 171 (of the data transform accelerator 170) which includes the command pre-data, the sixteen source descriptor 130₁₆ that is point to the third input buffer 173₃ of the memory 171 (of the data transform accelerator 170) which includes the additional command metadata, and the fourth destination descriptor 140₄ is pointing to the fourth output buffer 120₄ reserved for the fourth output data.

As discussed, in some implementations, the data transform accelerator 170 configures the fourth data transform pipeline 174₄ with one or more data transform engines 172 based on the metadata (e.g., command metadata, command pre-data, additional command metadata) from the memory 171 of the data transform accelerator 170.

The method 1200, at operation 1202, includes detecting, by the data transform accelerator 170, the address associated with the fourth data transform command 104₄ (also referred to as command pointer) present in the second container data structure 102₂. As discussed above, in some implementations, the software updates the second container data structure 102₂ with the address of the fourth data transform command 104₄ after generating the fourth data transform command 104₄.

In response to detecting the address of the fourth data transform command 104₄ present in the second container data structure 102₂, the method 1200, at operation 1204, includes accessing, by the data transform accelerator 170, the fourth data transform command 104₄ based on the address obtained from the second container data structure $102_2$. By accessing the fourth data transform command $104_4$, the data transform accelerator 170 can access the fourth input data, the command metadata, the command pre-data, and the additional command metadata via the thirteenth source descriptor $130_{13}$, the fourteenth source descriptor $130_{14}$, the fifteenth source descriptor $130_{15}$, and the sixteenth source descriptor $130_{16}$. In some implementations, by accessing the fourth data transform command $104_4$, the data transform accelerator 170 can determine the fourth output buffer $120_4$ based on the fourth destination descriptor $140_4$. In this example, the software generated the metadata (e.g., command metadata, command pre-data, additional command metadata) to transform the third source data.

The method 1200, at operation 1206, includes obtaining or receiving, by the data transform accelerator 170, the command metadata via the fourteen source descriptor $130_{14}$.

The method 1200, at operation 1208, includes obtaining or receiving, by the data transform accelerator 170, the command pre-data via the fifteenth source descriptor $130_{15}$.

The method 1200, at operation 1210, includes obtaining or receiving, by the data transform accelerator 170, the additional command metadata via the sixteenth source descriptor $130_{16}$.

The method 1200, at operation 1212, includes configuring, by the data transform accelerator 170, the fourth data transform pipeline $174_4$ with one or more data transform engines 172 based on the metadata (e.g., command metadata, command pre-data, additional command metadata). For example, the data transform accelerator 170 arranges the data transform engines 172 in the fourth data transform pipeline $174_4$ (e.g., linking or connecting the data transform engines 172) based on the metadata. In some implementations, the data transform accelerator 170 configures the data transform engines 172 based the metadata.

The method 1200, at operation 1214, includes obtaining, by the data transform accelerator 170, the fourth input data via the thirteenth source descriptor $130_{13}$.

The method 1200, at operation 1216, includes performing, by the data transform accelerator 170, the data transform operations using the fourth data transform pipeline $174_4$ on the fourth input data.

The method 1200, at operation 1218, includes transmitting, by the data transform accelerator 170, the fourth output data to the host computing unit 100 (e.g., the fourth output buffer $120_4$ of the host computing unit 100).

Figure 13:
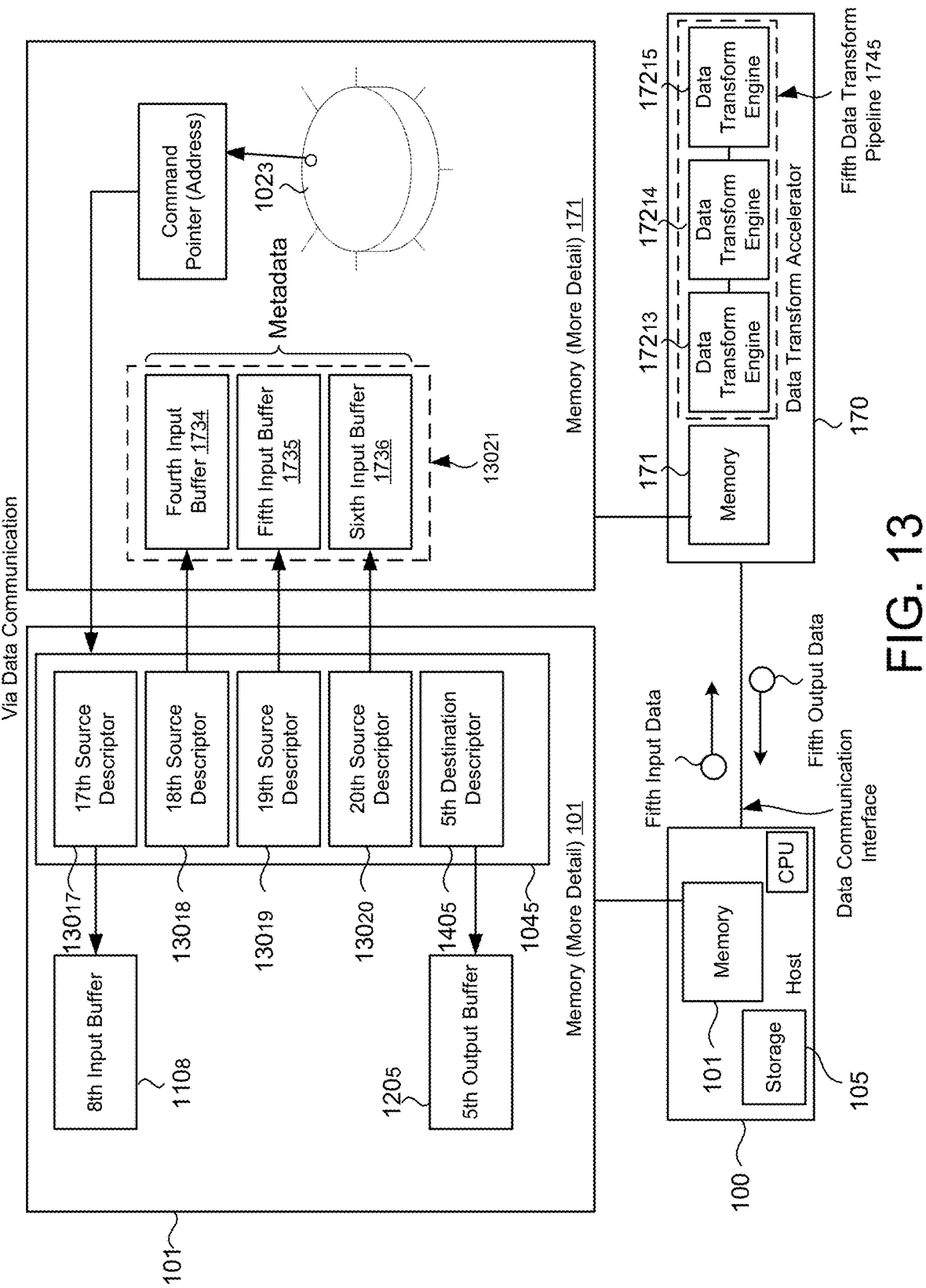
FIG. 13 illustrates a schematic view of an example third container data structure and an example fifth data transform command for performing data transform operations on fifth source data in accordance with some implementation of this disclosure.

FIG. 13 illustrates a schematic view of an example third container data structure $102_3$ (also referred to as "command pointer ring") and an example fifth data transform command $104_5$ for performing data transform operations on fifth source data in accordance with some implementation of this disclosure. In this example, the fifth data transform command $104_5$ belongs to or is associated with a first session $1302_1$.

In some implementations, upon a request by the user, the software creates or generates one or more sessions 1302 in the memory 171 (e.g., on-chip memory) of data transform accelerator 170. An example illustration of more than one session in the memory 171 may been seen in FIG. 19. In some implementations, each of the sessions 1302 defines or specifies a space (e.g., location of the space, size of the space) in the memory 171 (e.g., on-chip memory) of the data transform accelerator 170 for storing or caching "common" or "shared" metadata (e.g., command metadata, command pre-data, additional command metadata). For example, the first session $1302_1$ includes a fourth input buffer $173_4$, a fifth input buffer $173_5$, and a sixth input buffer $173_6$ for storing or caching the "shared" metadata (e.g., command metadata, command pre-data, additional command metadata) associated with a plurality of data transform commands 104 that belongs to the first session $1302_1$.

As shown, in some implementations, the software creates or generates the first session $1302_1$ (data compression session in this example) in the memory 171 (e.g., on-chip memory) of data transform accelerator 170. In some implementations, when the software creates or generates the first session $1302_1$, the software provides complete or partial metadata related to the first session $1302_1$ (metadata related to the data compression in this example) to the first session $1302_1$. For example, the software provides complete or partial command metadata (command metadata associated with data compression in this example) to the fourth input buffer $173_4$ of the memory 171 (e.g., on-chip memory). For example, the software provides complete or partial command pre-data (command pre-data associated with data compression in this example) to a fifth input buffer $173_5$ of the memory 171 (e.g., on-chip memory). For example, the software provides complete or partial command metadata for command metadata (additional command metadata associated with data compression in this example) to a sixth input buffer $173_6$ of the memory 171 (e.g., on-chip memory).

In some implementations, the software may not provide metadata to the first session $1302_1$. For example, the software may not provide the command metadata (command metadata associated with data compression in this example) to the fourth input buffer $173_4$ of the memory 171 (e.g., on-chip memory). For example, the software may not provide the command pre-data (command pre-data associated with data compression in this example) to a fifth input buffer $173_5$ of the memory 171 (e.g., on-chip memory). For example, the software may not provide additional command metadata for command metadata (additional command metadata associated with data compression in this example) to a sixth input buffer $173_6$ of the memory 171 (e.g., on-chip memory). For example, the software may not provide all the metadata to the first session $1302_1$.

In some implementations, the software provides additional metadata to the first session $1302_1$ to complete the metadata (partial metadata related to data compression in this example) in the first session $1302_1$ when the software creates or generates the fifth data transform command $104_5$ which belongs to or associated with the first session $1302_1$ (e.g., "first" data transform command 104 belongs to the session 1302). In some implementations, the software provides complete metadata to the first session $1302_1$ to the first session $1302_1$ that is "empty" of the metadata when the software creates or generates the fifth data transform command $104_5$ which belongs to the first session $1302_1$.

As shown, in some implementations, to transform the fifth source data in the storage 105 associated with the host computing unit 100 (compress the fifth source data in this example), the software (e.g., software driver) operating on the host computing unit 100 (e.g., computer, server) generates fifth input data in an eighth input buffer $110_8$ (e.g., one or more memory blocks of the memory 101) of the host computing unit 100. In some implementations, the software reserves a fifth output buffer $120_5$ (e.g., one or more memory blocks of the memory 101) of the host computing unit 100 for fifth output data from the data transform accelerator 170. In some implementations, the software generates the fifth input data in the memory 101 of the host computing unit 100 based on the fifth source data from the storage 105 associated with the host computing unit 100 (e.g., copying or moving the fifth source data from the storage 105 to the memory 101 of the computing device 100).

In some implementations, to transform the fifth source data in the storage 105 associated with the host computing unit 100 (compress the fifth source data in this example), the software (e.g., software driver) generates the fifth data transform command 104₅ which belongs to the first session 1302₁. As shown, in some implementations, the fifth data transform command 104₅ includes one or more source descriptors 130 and one or more destination descriptors 140. As shown, in some implementations, the third container data structure 102₃ is provided in the memory 171 (e.g., on-chip memory) of the data transform accelerator 170, and the fifth data transform command 104₅ is provided in the memory 101 of the host computing unit 100.

As shown, in some implementations, the fifth data transform command 104₅ includes a seventeenth source descriptor 130₁₇, an eighteenth source descriptor 130₁₈, a nineteenth source descriptor 130₁₉, a twentieth source descriptor 130₂₀, and a fifth destination descriptor 140₅. However, the present disclosure does not limit the number of the source descriptors 130 in the data transform command 104. Likewise, the present disclosure does not limit the number of the destination descriptors 140 in the data transform command 104.

As shown, in some implementations, the software generates the seventeenth source descriptor 130₁₇ that is pointing to the eight input buffer 110₈ including the fifth input data, the eighteenth source descriptor 130₁₈ that is pointing to the fourth input buffer 173₄ (of the memory 171 of the data transform accelerator 170) including the command metadata, the nineteenth source descriptor 130₁₉ that is pointing to the fifth input buffer 173₅ (of the memory 171 of the data transform accelerator 170) including the command pre-data, the twentieth source descriptor 130₂₀ that is pointing the sixth input buffer 173₆ (of the memory 171 of the data transform accelerator 170) including the additional command metadata, and the fifth destination descriptor 140₅ is pointing to the fifth output buffer 120₅ reserved for the fifth output data.

In some implementations, as discussed above, in conjunction with generating the fifth data transform command 104₅, the software provides the additional metadata to the first session 1302₁ (e.g., fourth input buffer 173₄, fifth input buffer 173₄, sixth input buffer 173₅). For example, the software provides additional or complete command metadata to the fourth input buffer 173₄ of the memory 171 of the data transform accelerator 170. For another example, the software provides additional or complete command pre-data to the fifth input buffer 173₅ of the memory 171 of the data transform accelerator 170. For another example, the software provides additional or complete additional command metadata to the sixth input buffer 173₆ of the memory 171 of the data transform accelerator 170. As a result, the first session 1302₁ includes complete metadata (complete metadata for data compression in this example).

As shown, in some implementations, the software updates the third container data structure 102₃ with an address (e.g., memory address) associated with the fifth data transform command 104₅. In some implementations, based on the address in the third container data structure 102₃, the data transform accelerator 170 accesses the fifth data transform command 140₅. Then, the data transform accelerator 170 accesses the seventeenth source descriptor 130₁₇ of the fifth data transform command 104₅, the eighteenth source descriptor 130₁₈ of the fifth data transform command 104₅, the nineteenth source descriptor 130₁₉ of the fifth data transform command 104₅, and the twentieth source descriptor 130₂₀ of the fifth data transform command 140₅. Based on the seventeenth source descriptor 130₁₇, the eighteenth source descriptor 130₁₈, the nineteenth source descriptor 130₁₉, and the twentieth source descriptor 130₂₀, the data transform accelerator 170 accesses the fifth input data, the command metadata, the command pre-data, and the additional command metadata, respectively.

In some implementations, the data transform accelerator 170 is configured to monitor the third container data structure 102₃. For example, the data transform accelerator 170 is configured to detect an address of new data transform command 104 present in the third container data structure 102₃. In this example, in response to determining that the address of the fifth data transform command 104₅ is present in the third container data structure 102₃, the data transform accelerator 170 obtains or receives the fifth input data, the command metadata, the command pre-data, and the additional command metadata via the seventeenth source descriptor 130₁₇, the eighteenth source descriptor 130₁₈, the nineteenth source descriptor 130₁₉, and the twentieth source descriptor 130₁₂, respectively. In this example, the data transform accelerator 170 obtains the fifth input data from the host computing unit 100 using the data communication interface between the host computing unit 100 and the data transform accelerator 170 (e.g., PCIe, USB). As shown, in this example, the data transform accelerator 170 obtains the command metadata, the command pre-data, and the additional command metadata from the memory 171 (e.g., on-chip memory) of the data transform accelerator 170.

In some implementations, the data transform accelerator 170 determines data transform operations to be performed on the fifth input data based on the command metadata. In some implementations, the data transform accelerator 170 determines an algorithm or algorithms for each of data transform operations based on the command metadata. In some implementations, the data transform accelerator 170 determines an algorithm or algorithms for at least one data transform operation based on the command metadata. In some implementations, the data transform accelerator 170 determines a sequence of the data transform operations (e.g., parallel, serial, any combination thereof) based on the command metadata.

In some implementations, the data transform accelerator 170 determines parameters (e.g., initialization vector (IV) for data encryption/decryption operation, message authentication code (MAC) for data authentication operation, Galois counter mode (GCM) authentication tag, additional authentication data (AAD) for data authentication operation) associated with the data transform operations based on the command pre-data and the source token. In some implementations, the data transform accelerator 170 determines or identifies regions (e.g. sections) within the fifth input data that correspond to various data transform operations based on the action token.

In some implementations, the data transform accelerator 170 configures a fifth data transform pipeline 174₅ with one or more data transform engines 172 based on metadata (e.g., command metadata from the fourth input buffer 173₄ of the memory 171 of the data transform accelerator 170, the command pre-data from the fifth input buffer 173₅ of the memory 171 (e.g., on-chip memory) of the data transform accelerator 170, the sixth input buffer 173₆ of the memory 171 (e.g., on-chip memory) of the data transform accelerator 170). For example, the data transform accelerator 170 arranges the data transform engines 172 in the fifth data transform pipeline 174₅ (e.g., linking or connecting the data transform engines 172) based on the metadata. In some implementations, the data transform accelerator 170 config-
ures the data transform engines 172 based on the metadata.

As a result, the data transform accelerator 170 transforms
the fifth input data with the fifth data transform pipeline 174$_5$
based on the metadata. In some implementations, after
performing the data transform operations, the data transform
accelerator 170 transmits the fifth output data (e.g., trans-
formed fifth input data) to the host computing unit 100 (e.g.,
the fifth output buffer 120$_5$ of the host computing unit 100
as indicated by the fifth destination descriptor 140$_5$).

In some implementations, the metadata (e.g., command
metadata, command pre-data, additional command meta-
data) associated with the fifth data transform command 104$_5$
is also associated with a subsequent data transform com-
mand 104 (sixth data transform command 104$_6$ to transform
sixth source data in this example) when the subsequent data
transform command 104 (sixth data transform command
104$_6$ in this example) is also belongs to the first session
1302$_1$.

As shown, in some implementations, the software creates
or generates the first session 1302$_1$ in the memory 171 (e.g.,
on-chip memory) of the data transform accelerator 170. In
some implementations, the software creates or generates the
first session 1302$_1$ in the memory 101 of the host computing
unit 100.

Figure 14A:
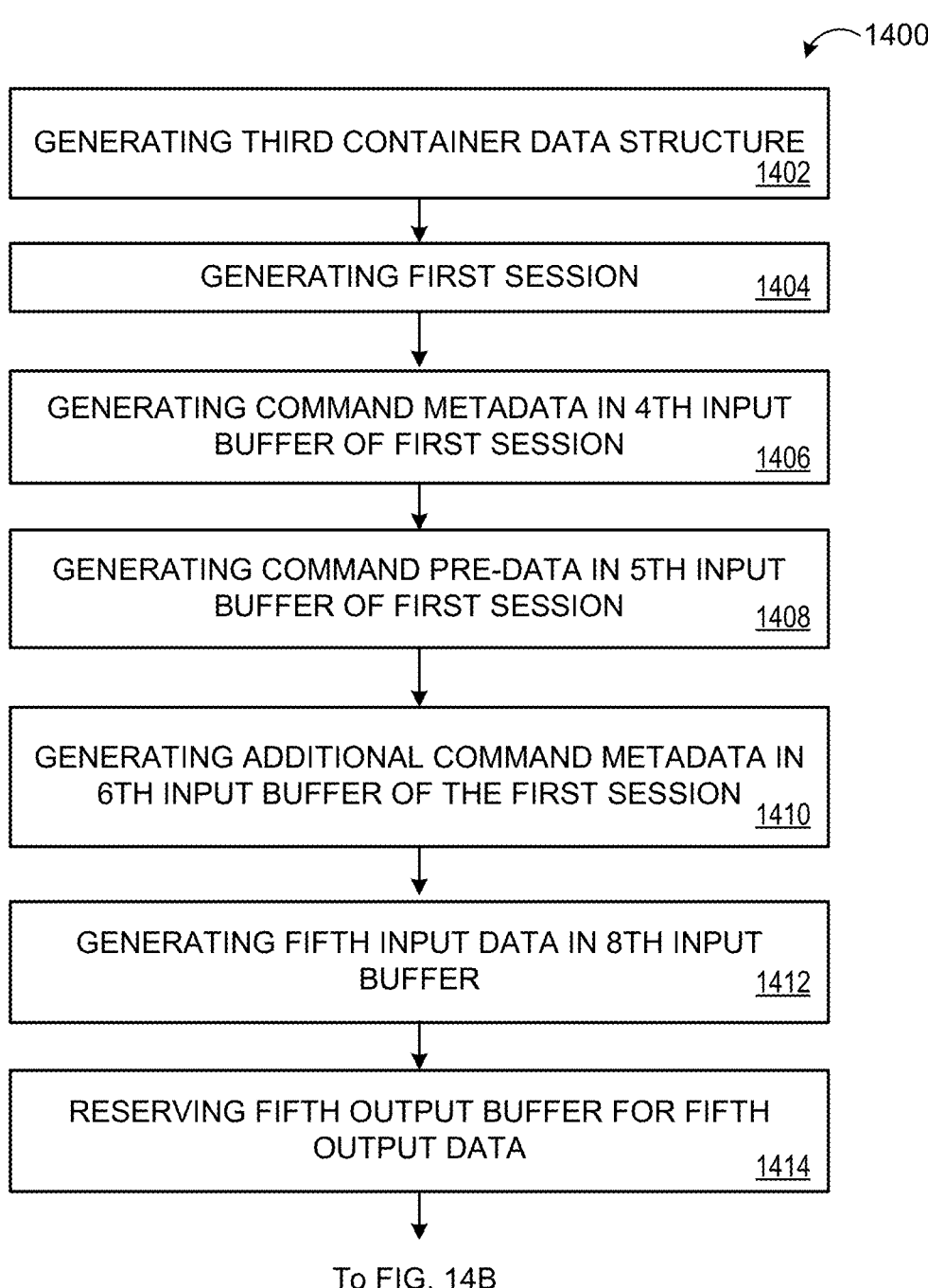
FIG. 14A and FIG. 14B show a flowchart of an example arrangement of operations for a method of generating the third container data structure and the fifth data transform command for transforming the fifth source data in accordance with some implementations of this disclosure.
Figure 14B:
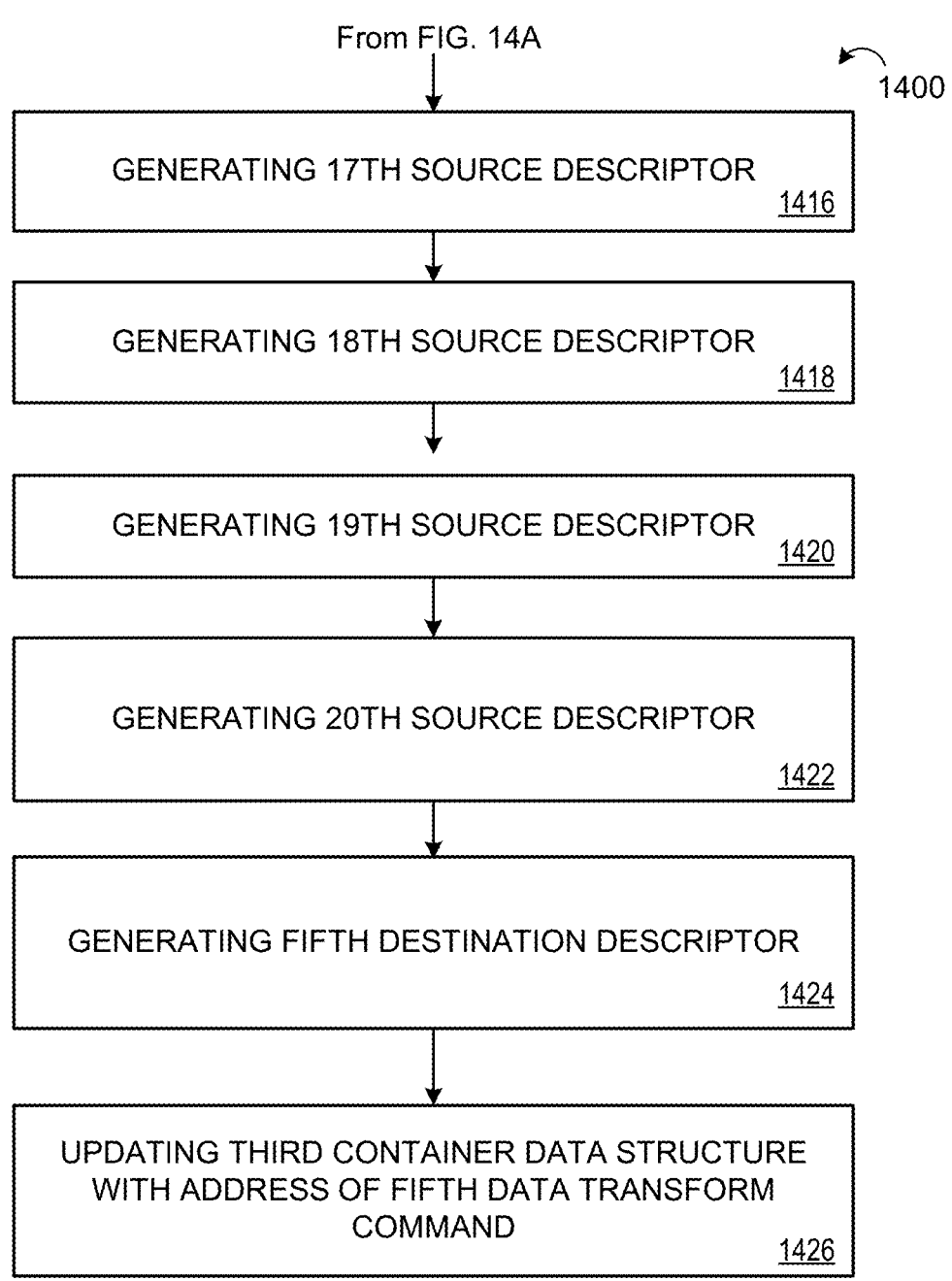

FIG. 14A and FIG. 14B show a flowchart of an example
arrangement of operations for a method 1400 of generating
the third container data structure 102$_3$ and the fifth data
transform command 104$_5$ for transforming the fifth source
data in accordance with some implementations of this dis-
closure. The method 800 may be performed by processing
logic that may include hardware (circuitry, dedicated logic,
etc.), software (such as is run on a general purpose computer
system or a dedicated machine), or a combination of both,
which processing logic may be included in any computer
system or device. In some implementations, the method
1400 is performed by processing logic that may include
hardware (circuitry, dedicated logic, etc.), software (such as
is run on a general purpose computer system or a dedicated
machine), or a combination of both, which processing logic
may be included in a host computing unit 100 in commu-
nication with the data transform accelerator 170.

For simplicity of explanation, methods described herein
are depicted and described as a series of acts. However, acts
in accordance with this disclosure may occur in various
orders and/or concurrently, and with other acts not presented
and described herein. Further, not all illustrated acts may be
used to implement the methods in accordance with the
disclosed subject matter. In addition, those skilled in the art
will understand and appreciate that the methods may alter-
natively be represented as a series of interrelated states via
a state diagram or events. Additionally, the methods dis-
closed in this specification are capable of being stored on an
article of manufacture, such as a non-transitory computer-
readable medium, to facilitate transporting and transferring
such methods to computing devices. The term article of
manufacture, as used herein, is intended to encompass a
computer program accessible from any computer-readable
device or storage media. Although illustrated as discrete
blocks, various blocks may be divided into additional
blocks, combined into fewer blocks, or eliminated, depend-
ing on the desired implementation.

As discussed, in some implementations, the software
creates or generates one or more sessions 1302 in the
memory 171 (e.g., on-chip memory) of the data transform
accelerator 170. In some implementations, each of the
sessions 1302 defines or specifies a space (e.g., location of the space, size of the space) in the memory 171 (e.g., on-chip
memory) of the data transform accelerator 170 for storing or
caching "common" or "shared" metadata (e.g., command
metadata, command pre-data, additional command meta-
data). For example, the first session 1302$_1$ includes a fourth
input buffer 173$_4$, a fifth input buffer 173$_5$, and a sixth input
buffer 173$_6$ for storing or caching the metadata (e.g., com-
mand metadata, command pre-data, additional command
metadata) that can be associated with a plurality of data
transform commands 104 (data transform commands 104
related to data compression in this example) that belongs to
the first session 1302$_1$.

The method 1400, at operation 1402, includes generating,
by the software operating on the host computing unit 100,
the third container data structure 102$_3$ (also referred to as
command pointer ring) in the memory 171 (e.g., on-chip
memory) of the data transform accelerator 170. In some
implementations, the software generates the third container
data structure 102$_3$ during the initialization step of the data
transform accelerator 170. In some implementations, the
data transform accelerator 170 is initialized when the status
of the host computing unit 100 changes from the OFF status
to the ON status. In some implementations, the data trans-
form accelerator 170 is initialized when the software is
executed on the host computing unit 100.

The method 1400, at operation 1404, includes creating or
generating, by the software operating on the host computing
unit 100, the first session 1302$_1$ in the memory 171 (e.g.,
on-chip memory) of data transform accelerator 170. As
discussed, in some implementations, the first session 1302$_1$
may not include any metadata. In some implementations, the
first session 1302$_1$ includes the partial metadata (partial
metadata associated with data compression in this example).
In some implementations, the first session 1302$_1$ includes
the complete metadata (complete metadata associated with
data compression in this example).

The method 1400, at operation 1406, includes generating,
by the software operating on the host computing unit 100,
the command metadata (also referred to as control words) in
the fourth input buffer 173$_4$ of the memory 171 (e.g., on-chip
memory) of the data transform accelerator 170.

The method 1400, at operation 1408, includes generating,
by the software operating on the host computing unit 100,
the command pre-data in the fifth input buffer 173$_5$ of the
memory 171 (e.g., on-chip memory) of the data transform
accelerator 170.

The method 1400, at operation 1410, includes generating,
by the software operating on the host computing unit 100,
the additional command metadata in the sixth input buffer
173$_6$ of the memory 171 (e.g., on-chip memory) of the data
transform accelerator 170.

As discussed, in some implementations, the software
operating on the host computing unit 100 creates or gener-
ates the metadata (e.g., command metadata, command pre-
data, additional command metadata) in the memory 171 of
the data transform accelerator 170 in conjunction with
creating or generating the first session 1302$_1$. In some
implementations, the software operating on the host com-
puting unit 100 creates or generates the metadata (e.g.,
command metadata, command pre-data, additional com-
mand metadata) in the memory 171 of the data transform
accelerator 170 in conjunction or associated with creating or
generating the fifth data transform command 104$_5$ (e.g.,
generating the fifth input data in the eighth input buffer 110$_8$,
generating the command metadata in the fourth input buffer
173$_4$, generating the command pre-data in the fifth input
buffer 173$_5$, generating the additional command metadata in the sixth input buffer $173_6$, reserving the fifth output buffer $120_5$ for the fifth output data).

The method 1400, at operation 1412, includes generating, by the software operating on the host computing unit 100, the fifth input data in the eighth input buffer $110_8$ (e.g., one or more memory blocks) of the host computing unit 100.

The method 1400, at operation 1414, includes reserving, by the software operating on the host computing unit 100, the fifth output buffer $120_5$ (e.g., one or more memory blocks of the memory 101) of the host computing unit 100 for the fifth output data from the data transform accelerator 170.

The method 1400, at operation 1416, includes generating, by the software operating on the host computing unit 100, the seventeen source descriptor $130_{17}$ (of the fifth data transform command $104_5$) which points to the eighth input buffer $110_8$ which includes the fifth input data.

The method 1400, at operation 1418, includes generating, by the software operating on the host computing unit 100, the eighteenth source descriptor $130_{18}$ (of the fifth data transform command $104_5$) which points to the fourth input buffer $173_4$ of the memory 171 (e.g., on-chip memory) of the data transform accelerator 170 which includes the command metadata.

The method 1400, at operation 1420, includes generating, by the software operating on the host computing unit 100, the nineteenth source descriptor $130_{19}$ (of the fifth data transform command $104_5$) which points to the fifth input buffer $173_5$ of the memory 171 (e.g., on-chip memory) of the data transform accelerator 170 which includes the command pre-data.

The method 1400, at operation 1422, includes generating, by the software operating on the host computing unit 100, the twentieth source descriptor $130_{20}$ (of the fifth data transform command $104_5$) which points to the sixth input buffer $173_6$ of the memory 171 (e.g., on-chip memory) of the data transform accelerator 170 which includes the additional command metadata.

The method 1400, at operation 1424, includes generating, by the software operating on the host computing unit 100, the fifth destination descriptor $140_5$ (of the fifth data transform command $104_5$) which points to the fifth output buffer $120_5$ reserved for the fifth output data from the data transform accelerator 170.

The method 1400, at operation 1426, includes updating, by the software operating on the host computing unit 100, the third container data structure $102_3$ with an address of the fifth data transform command $104_5$ including the seventeenth source descriptor $130_{17}$, the eighteenth source descriptor $130_{18}$, the nineteenth source descriptor $130_{19}$, the twentieth source descriptor $130_{20}$, and a fifth destination descriptor $140_5$.

FIG. 15 shows a flowchart of an example arrangement of operations for a method 1500 of generating the fifth data transform pipeline $174_5$ and transforming the fifth input data using the fifth data transform pipeline $174_5$ in accordance with some implementations of this disclosure. The method 1500 may be performed by processing logic that may include hardware (circuitry, dedicated logic, etc.), software (such as is run on a general purpose computer system or a dedicated machine), or a combination of both, which processing logic may be included in any computer system or device. In some implementations, the method 1500 is performed by processing logic that may include hardware (circuitry, dedicated logic, etc.), software (such as is run on a general purpose computer system or a dedicated machine), or a combination of both, which processing logic may be included in a host computing unit 100 in communication with the data transform accelerator 170.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, the software (e.g., software driver) generates the fifth data transform command $104_5$ in the memory 101 of the host computing unit 100. In some implementations, the fifth data transform command $104_3$ includes one or more source descriptors 130 and one or more destination descriptors 140. For example, the fifth data transform command $104_5$ includes the seventeenth source descriptor $130_{17}$ pointing to the eighth input buffer $110_8$ including the fifth input data, the eighteenth source descriptor $130_{18}$ pointing to the fourth input buffer $173_4$ of the memory 171 (of the data transform accelerator 170) including the command metadata, the nineteenth source descriptor $130_{19}$ pointing to the fifth input buffer $173_5$ of the memory 171 (of the data transform accelerator 170) including the command pre-data, the twentieth source descriptor $130_{20}$ including the additional command metadata, and the fifth destination descriptor $140_5$ pointing to the fifth output buffer $120_5$ reserved for the fifth output data.

As discussed, in some implementations, the data transform accelerator 170 configures the fifth data transform pipeline $174_5$ with one or more data transform engines 172 based on the metadata (e.g., command metadata, command pre-data, additional command metadata) from the input buffers $173_{4-6}$ of the memory 171 of the data transform accelerator 170.

The method 1500, at operation 1502, includes detecting, by the data transform accelerator 170, the address associated with the fifth data transform command $104_5$ (also referred to as command pointer) present in the third container data structure $102_3$. As discussed above, in some implementations, the software updates the third container data structure $102_3$ with the address of the fifth data transform command $104_5$ after generating the fifth data transform command $104_5$.

In response to detecting the address of the fifth data transform command $104_5$ present in the third container data structure $102_3$, the method 1500, at operation 1504, includes accessing, by the data transform accelerator 170, the fifth data transform command $104_5$ based on the address obtained from the third container data structure $102_3$. By accessing the fifth data transform command $104_5$, the data transform accelerator 170 can access the fifth input data, the command metadata, the command pre-data, and the additional command metadata via the seventeenth source descriptor $130_{17}$, the eighteenth source descriptor $130_{18}$, the nineteenth source descriptor $130_{19}$, and the twentieth source descriptor $130_{20}$. In some implementations, by accessing the fifth data transform command $104_5$, the data transform accelerator 170 can determine the fifth output buffer $120_5$ based on the fifth destination descriptor $140_5$.

The method 1500, at operation 1506, includes obtaining or receiving, by the data transform accelerator 170, the command metadata in the first session $1302_1$ via the eighteenth source descriptor $130_{18}$.

The method 1500, at operation 1508, includes obtaining or receiving, by the data transform accelerator 170, the command pre-data in the first session $1302_1$ via the nineteenth source descriptor $130_{19}$.

The method 1500, at operation 1510, includes obtaining or receiving, by the data transform accelerator 170, the additional command metadata in the first session $1302_1$ via the twelfth source descriptor $130_{20}$.

The method 1500, at operation 1512, includes configuring, by the data transform accelerator 170, the fifth data transform pipeline $174_5$ with one or more data transform engines 172 based on the metadata (e.g., command metadata, command pre-data, additional command metadata). For example, the data transform accelerator 170 arranges the data transform engines 172 in the fifth data transform pipeline $174_5$ (e.g., linking or connecting the data transform engines 172) based on the metadata. In some implementations, the data transform accelerator 170 configures the data transform engines 172 based the metadata.

The method 1500, at operation 1514, includes obtaining, by the data transform accelerator 170, the fifth input data via the seventeenth source descriptor $130_{17}$.

The method 1500, at operation 1516, includes performing, by the data transform accelerator 170, the data transform operations using the fifth data transform pipeline $174_5$ on the fifth input data.

The method 1500, at operation 1518, includes transmitting, by the data transform accelerator 170, the fifth output data to the host computing unit 100 (e.g., the fifth output buffer $120_5$ of the host computing unit 100).

Figure 16:
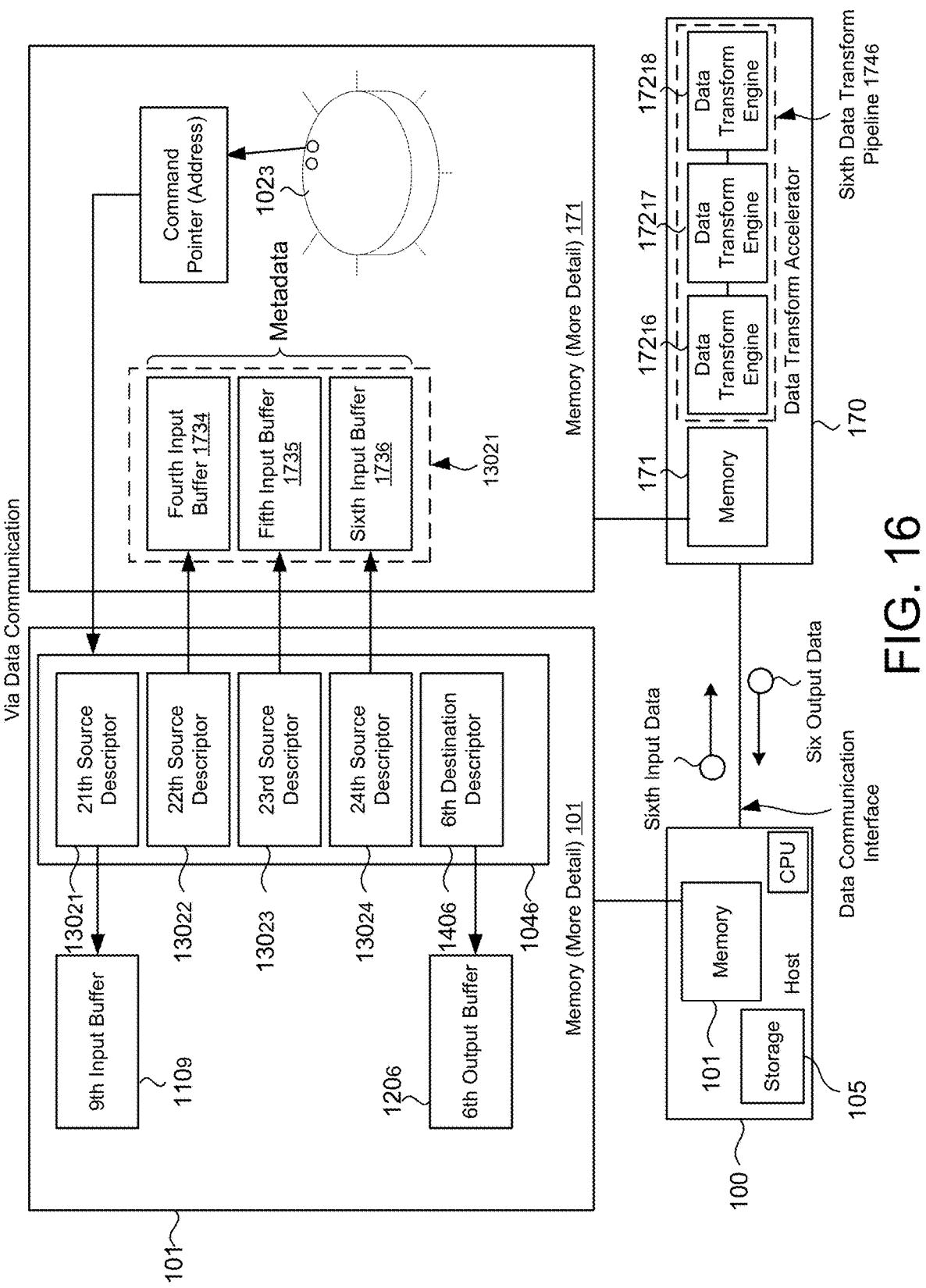
FIG. 16 illustrates a schematic view of the example third container data structure, the fifth data transform command for performing data transform operations on the fifth source data (shown in FIG. 13), and an example sixth data transform command for performing data transform operations on sixth source data using the metadata in the first session in accordance with some implementation of this disclosure.

FIG. 16 illustrates a schematic view of the example third container data structure $102_3$ (also referred to as "command pointer ring"), the fifth data transform command $104_5$ for performing data transform operations on the fifth source data (shown in FIG. 13), and an example sixth data transform command $104_6$ for performing data transform operations on sixth source data using the metadata in the first session $1302_1$ in accordance with some implementation of this disclosure.

As discussed, to transform the fifth source data, the software operating on the host computing unit 100 (e.g., computer, server) generates the metadata (e.g., command metadata, command pre-data, additional command metadata) in the first session $1302_1$.

In some implementations, when the software generates or creates one or more subsequent data transform commands 104 that belong to or associated with the first session $1302_1$, the software generates or creates the subsequent data transform commands 104 (e.g., source descriptors 130) pointing to the first session $1032_1$ in the memory 171 (e.g., on-chip memory) of the data transform accelerator 170.

As shown, in some implementations, the software generates the sixth input data in a ninth input buffer $110_9$ (e.g., one or more memory blocks of the memory 101) of the host computing unit 100. In some implementations, the software reserves a sixth output buffer $120_6$ (e.g., one or more memory blocks of the memory 101) for sixth output data (i.e., transformed sixth input data) from the data transform accelerator 170. In some implementations, the software generates the sixth input data in the memory 101 of the host computing unit 100 based on the sixth source data from the storage 105 (e.g., copying or moving the sixth source data from the storage 105 to the memory 101 of the computing device 100).

As shown, in some implementations, the software generates the sixth data transform command $104_6$ including one or more source descriptors 130 and one or more destination descriptors 140. As shown, in some implementations, the software generates a 21th source descriptor $130_{21}$ that is pointing to the ninth input buffer $110_9$ which includes the sixth input data, a 22th source descriptor $130_{22}$ that is pointing to the fourth input buffer $173_4$ of the memory 171 (of the data transform accelerator 170) which includes the command metadata, a 23rd source descriptor $130_{23}$ that is point to the fifth input buffer $173_5$ of the memory 171 (of the data transform accelerator 170) which includes the command pre-data, a 24th source descriptor $130_{24}$ that is point to the sixth input buffer $173_6$ of the memory 171 (of the data transform accelerator 170) which includes the additional command metadata, and a sixth destination descriptor $140_6$ which points to the sixth output buffer $120_6$ reserved for the sixth output data. As shown, source descriptors $130_{22-24}$ of the sixth data transform command $104_6$ are configured to point to input buffers 1734-6 of the first session $1302_1$.

As shown, in some implementations, the software updates the third container data structure $102_3$ with an address (e.g., memory address) associated with the sixth data transform command $140_6$. In some implementations, based on the address in the third container data structure $102_3$, the data transform accelerator 170 accesses the sixth data transform command $140_6$. Then, the data transform accelerator 170 accesses the 21th source descriptor $130_{21}$ of the sixth data transform command $104_6$, the 22th source descriptor $130_{22}$ of the sixth data transform command $104_6$, the 23rd source descriptor $130_{23}$ of the sixth data transform command $104_6$, and the 24th source descriptor $130_{24}$ of the sixth data transform command $104_6$. In some implementations, the data transform accelerator 170 accesses the sixth destination descriptor $140_6$ pointing to the fourth output buffer $120_4$ and determines the reserved location for the fourth output data (fourth output buffer $120_4$ in this example).

In some implementations, based on the thirteenth source descriptor $130_{13}$ pointing to the fourth input data, the data transform accelerator 170 accesses the fourth input data via the data communication interface. In some implementations, based on the fourteen source descriptor $130_{14}$ pointing to the command metadata (which is also associated with the third data transform command $104_3$), the fifteenth source descriptor $130_{15}$ pointing to the command pre-data (which is also associated with the third data transform command $104_3$), and the sixteenth source descriptor $130_{16}$ pointing to the additional command metadata (which is also associated with the third data transform command $104_3$), the data transform accelerator 170 accesses the command metadata, the command pre-data, and the additional command metadata via the data communication interface, respectively.

In some implementations, the data transform accelerator 170 configures a fourth data transform pipeline $174_4$ with one or more data transform engines 172 based on metadata (e.g., command metadata from the first input buffer $173_1$ of the memory 171 of the data transform accelerator 170, command pre-data from the second input buffer $173_2$ of the memory 171 of the data transform accelerator 170, additional command metadata from the fourth input buffer $110_4$). For example, the data transform accelerator 170 arranges the data transform engines 172 in the fourth data transform pipeline 174₄ (e.g., linking or connecting the data transform engines 172) based on the metadata. In some implementations, the data transform accelerator 170 configures the data transform engines 172 based on the metadata.

As a result, the data transform accelerator 170 transforms the fourth input data with the fourth data transform pipeline 174₄ based on the metadata. In some implementations, after performing the data transform operations, the data transform accelerator 170 transmits the fourth output data (e.g., transformed fourth input data) to the host computing unit 100 (e.g., the fourth output buffer 120₄ of the host computing unit 100 as indicated by the fourth destination descriptor 140₄).

FIG. 17 is a flowchart of an example arrangement of operations for a method 1700 of generating the sixth data transform command 104₆ for transforming the sixth source data in accordance with some implementations of this disclosure. The method 1700 may be performed by processing logic that may include hardware (circuitry, dedicated logic, etc.), software (such as is run on a general purpose computer system or a dedicated machine), or a combination of both, which processing logic may be included in any computer system or device. In some implementations, the method 1700 is performed by processing logic that may include hardware (circuitry, dedicated logic, etc.), software (such as is run on a general purpose computer system or a dedicated machine), or a combination of both, which processing logic may be included in a host computing unit 100 in communication with the data transform accelerator 170.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, in some implementations, when the software generates or creates one or more subsequent data transform commands 104 that belong to or associated with the first session 1302₁ including metadata (e.g., metadata sufficient to carry out data transform operations of the subsequent data transform command 104), the software generates or creates the subsequent data transform commands 104 (e.g., source descriptors 130) pointing to the first session 1032₁ in the memory 171 (e.g., on-chip memory) of the data transform accelerator 170 instead of creating or generating new metadata.

The method 1700, at operation 1704, includes generating, by the software operating on the host computing unit 100, the sixth input data at the ninth input buffer 110₉ (e.g., one or more memory blocks).

The method 1700, at operation 1706, includes reserving, by the software operating on the host computing unit 100, the sixth output buffer 120₆ (e.g., one or more memory blocks) for the sixth output data from the data transform accelerator 170.

The method 1700, at operation 1708, includes generating, by the software operating on the host computing unit 100, the 21th source descriptor 130₂₁ (of the sixth data transform command 104₆) which points to the ninth input buffer 110₉ including the sixth input data.

The method 1700, at operation 1710, includes generating, by the software operating on the host computing unit 100, the 22th source descriptor 130₂₂ (of the sixth data transform command 104₆) which points to the fourth input buffer 173₄ of the memory 171 (of the data transform accelerator 170) including the command metadata.

The method 1700, at operation 1712, includes generating, by the software operating on the host computing unit 100, the 23rd source descriptor 130₂₃ (of the sixth data transform command 104₆) which points to the fifth input buffer 173₅ of the memory 171 (of the data transform accelerator 170) including the command pre-data.

The method 1700, at operation 1714, includes generating, by the software operating on the host computing unit 100, the 24th source descriptor 130₂₄ (of the sixth data transform command 104₆) which points to the sixth input buffer 173₆ of the memory 171 (of the data transform accelerator 170) including the additional command metadata.

The method 1700, at operation 1716, includes generating, by the software operating on the host computing unit 100, the sixth destination descriptor 140₆ (of the sixth data transform command 104₆) which points to the sixth output buffer 120₆ reserved for the sixth output data from the data transform accelerator 170.

The method 1700, at operation 1718, includes updating, by the software operating on the host computing unit 100, the third container data structure 102₃ with an address of the sixth data transform command 104₆ including the 21th source descriptor 130₂₁, the 22th source descriptor 130₂₂, the 23rd source descriptor 130₂₃, the 24th source descriptor 130₂₄, and the sixth destination descriptor 140₆.

FIG. 18 shows a flowchart of an example arrangement of operations for a method 1800 of generating the sixth data transform pipeline 174₆ and transforming the sixth input data using the sixth data transform pipeline 174₆ in accordance with some implementations of this disclosure. The method 1800 may be performed by processing logic that may include hardware (circuitry, dedicated logic, etc.), software (such as is run on a general purpose computer system or a dedicated machine), or a combination of both, which processing logic may be included in any computer system or device. In some implementations, the method 1800 is performed by processing logic that may include hardware (circuitry, dedicated logic, etc.), software (such as is run on a general purpose computer system or a dedicated machine), or a combination of both, which processing logic may be included in a host computing unit 100 in communication with the data transform accelerator 170.

For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

As discussed, in some implementations, the software generates the sixth data transform command $104_6$. In some implementations, the sixth data transform command $104_6$ includes one or more source descriptors 130 and one or more destination descriptors 140. For example, the sixth data transform command $104_6$ includes the 21th source descriptor $130_{21}$ that is pointing to the ninth input buffer $110_9$ which includes the six input data, the 22th source descriptor $130_{21}$ that is pointing to the fourth input buffer $173_4$ of the memory 171 (of the data transform accelerator 170) which includes the command metadata, the 23rd source descriptor $130_{23}$ that is point to the fifth input buffer $173_5$ of the memory 171 (of the data transform accelerator 170) which includes the command pre-data, the 24th source descriptor $130_{24}$ that is point to the sixth input buffer $173_6$ of the memory 171 (of the data transform accelerator 170) which includes the additional command metadata, and the sixth destination descriptor $140_6$ is pointing to the sixth output buffer $120_6$ reserved for the sixth output data.

The method 1800, at operation 1802, includes detecting, by the data transform accelerator 170, the address associated with the sixth data transform command $104_6$ (also referred to as command pointer) present in the third container data structure $102_3$. As discussed above, in some implementations, the software updates the third container data structure $102_3$ with the address of the sixth data transform command $104_6$ after generating the sixth data transform command $104_6$.

In response to detecting the address of the sixth data transform command $104_6$ present in the third container data structure $102_3$, the method 1800, at operation 1804, includes accessing, by the data transform accelerator 170, the sixth data transform command $104_6$ based on the address obtained from the third container data structure $102_3$. By accessing the sixth data transform command $104_6$, the data transform accelerator 170 can access the sixth input data, the command metadata, the command pre-data, and the additional command metadata via the 21th source descriptor $130_{21}$, the 22th source descriptor $130_{22}$, the 23rd source descriptor $130_{23}$, and the 24th source descriptor $130_{24}$. In some implementations, by accessing the sixth data transform command $104_6$, the data transform accelerator 170 can determine the sixth output buffer $120_6$ based on the sixth destination descriptor $140_6$. In this example, the software generated the metadata (e.g., command metadata, command pre-data, additional command metadata) to transform the sixth source data.

The method 1800, at operation 1806, includes obtaining or receiving, by the data transform accelerator 170, the command metadata via the 22th source descriptor $130_{22}$.

The method 1800, at operation 1808, includes obtaining or receiving, by the data transform accelerator 170, the command pre-data via the 23rd source descriptor $130_{23}$.

The method 1800, at operation 1810, includes obtaining or receiving, by the data transform accelerator 170, the additional command metadata via the 24th source descriptor $130_{24}$.

The method 1800, at operation 1812, includes configuring, by the data transform accelerator 170, the sixth data transform pipeline $174_6$ with one or more data transform engines 172 based on the metadata (e.g., command metadata, command pre-data, additional command metadata). For example, the data transform accelerator 170 arranges the data transform engines 172 in the fourth data transform pipeline $174_4$ (e.g., linking or connecting the data transform engines 172) based on the metadata. In some implementations, the data transform accelerator 170 configures the data transform engines 172 based the metadata.

The method 1800, at operation 1814, includes obtaining, by the data transform accelerator 170, the sixth input data via the 21th source descriptor $130_{21}$.

The method 1800, at operation 1816, includes performing, by the data transform accelerator 170, the data transform operations using the sixth data transform pipeline $174_6$ on the fourth input data.

The method 1800, at operation 1818, includes transmitting, by the data transform accelerator 170, the sixth output data to the host computing unit 100 (e.g., the sixth output buffer $120_6$ of the host computing unit 100).

Figure 19:
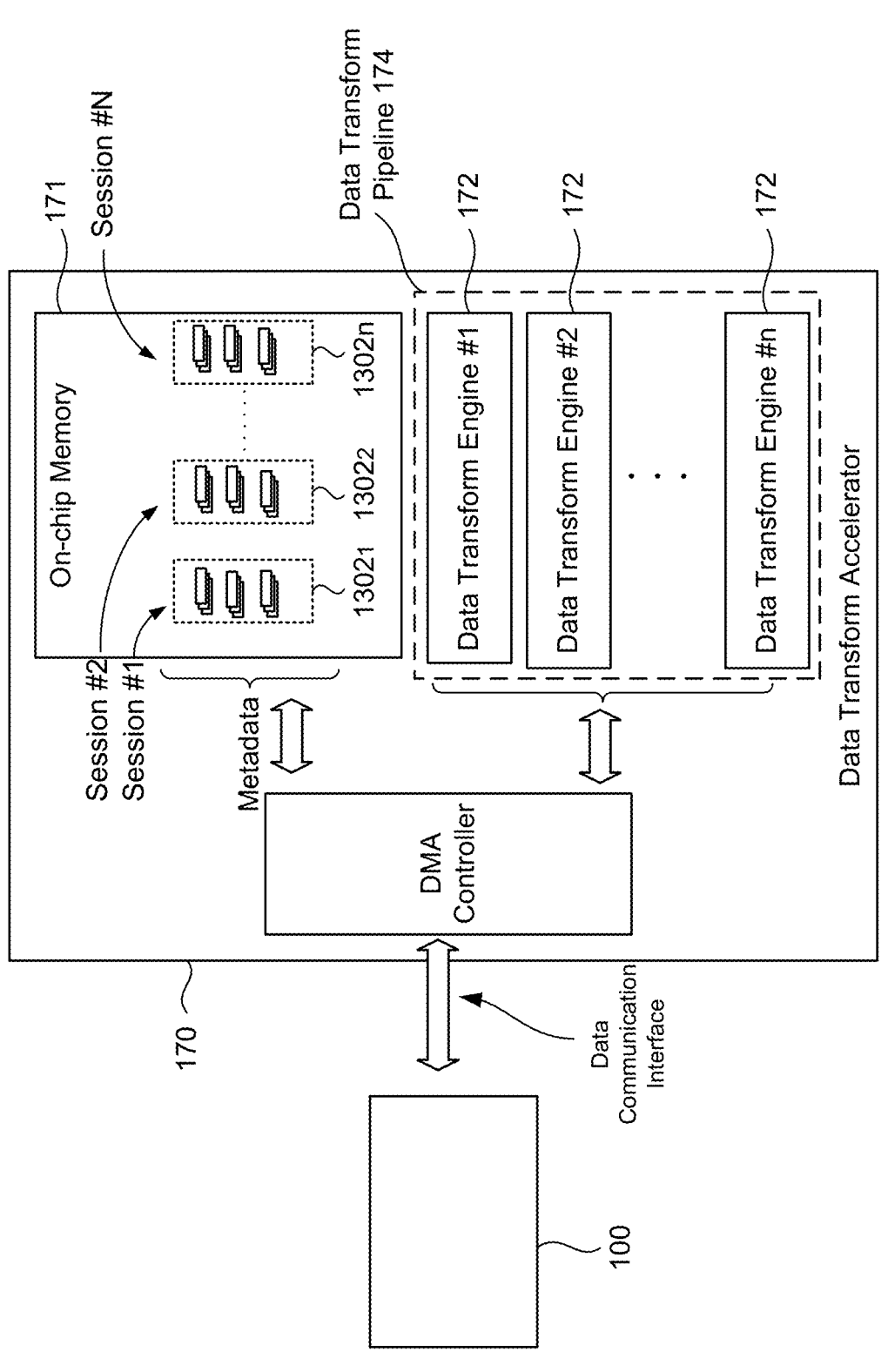
FIG. 19 illustrates a schematic view of an example data transform accelerator including a plurality of sessions in accordance with some implementation of this disclosure.

FIG. 19 illustrates a schematic view of an example data transform accelerator 170 including a plurality of sessions 1302 in accordance with some implementation of this disclosure.

In some implementations, the data transform accelerator 170 is a coprocessor device that is used to accelerate data transform operations for data analytics, big data, storage, networking, and other applications. The data transform operations (for example but not limited to) could be data compression, decompression, encryption, decryption, authentication tag (MAC) generation, authentication, data deduplication, and non-volatile memory express (NVMe) protection operations. In some implementations, the throughput of the data transform accelerator 170 increases by storing or caching the metadata (e.g., information that is used to configure the data transform pipeline 174 to transform the input data, location information of input data, destination information of the output data) in the memory 171 (e.g., on-chip memory) of the data transform accelerator 170.

As discussed, in some implementations, the data transform accelerator 170 is connected to the host computing unit 100 using the data communication interface (e.g., PCIe, USB). In some implementations the data transform accelerator 170 is controlled from the host computing unit 100 by accessing control registers or other suitable mechanisms through these interfaces. In case of a PCIe interface, for example, the registers are accessed through the PCIe Base Address Register (BAR) space.

As shown, the data transform accelerator 170 includes one or more data transform engines 172 as compute resources. Algorithm accelerations may be provided by these data transform engines 172. Algorithm accelerations could be data transform operations such as compression, decompression, encryption, decryption, authentication tag (MAC) generation and verification, data deduplication, and NVMe protection information (PI) generation and verification, and real-time verification. In some implementations, the data transform engines 172 can operate on the data in a highly parallel fashion. In some implementations, the host computing unit 100 submits commands to the data transform accelerator 170 along with source data to transform. As discussed, in some implementations, the host computing unit 100 provides control information or metadata that describes the specific algorithmic transformation to be applied on the input data (source data). Based on the metadata the data transform engines 172 perform operations on the data. In some implementations, the data transform accelerator 170 returns the transformed data to the host computing unit 100 via the data communication interface between the host computing unit 100 and the data transform accelerator 170.

In some implementations, the data transform engines 172 may be included in a data transform pipeline 174, as described herein. Further, as illustrated, the data transform accelerator 170 includes a single data transform pipeline (e.g., the data transform pipeline 174). It will be appreciated that any number of data transform pipelines (that may include any number of data transform engines 172) may be included in the data transform accelerator 170.

As shown, the memory 171 of the data transform accelerator 170 includes a plurality of sessions 1302. For example, the first session 1302₁ includes metadata related to data compression and the second session 13022 includes metadata related to data decompression.

As shown, in some implementations, the data transform accelerator 170 includes a direct memory access (DMA) controller to communicate data (e.g., metadata, input data, output data) between the host computing unit 100 and the data transform accelerator 170 and between the memory 171 and the data transform engines 172.

Figure 20:
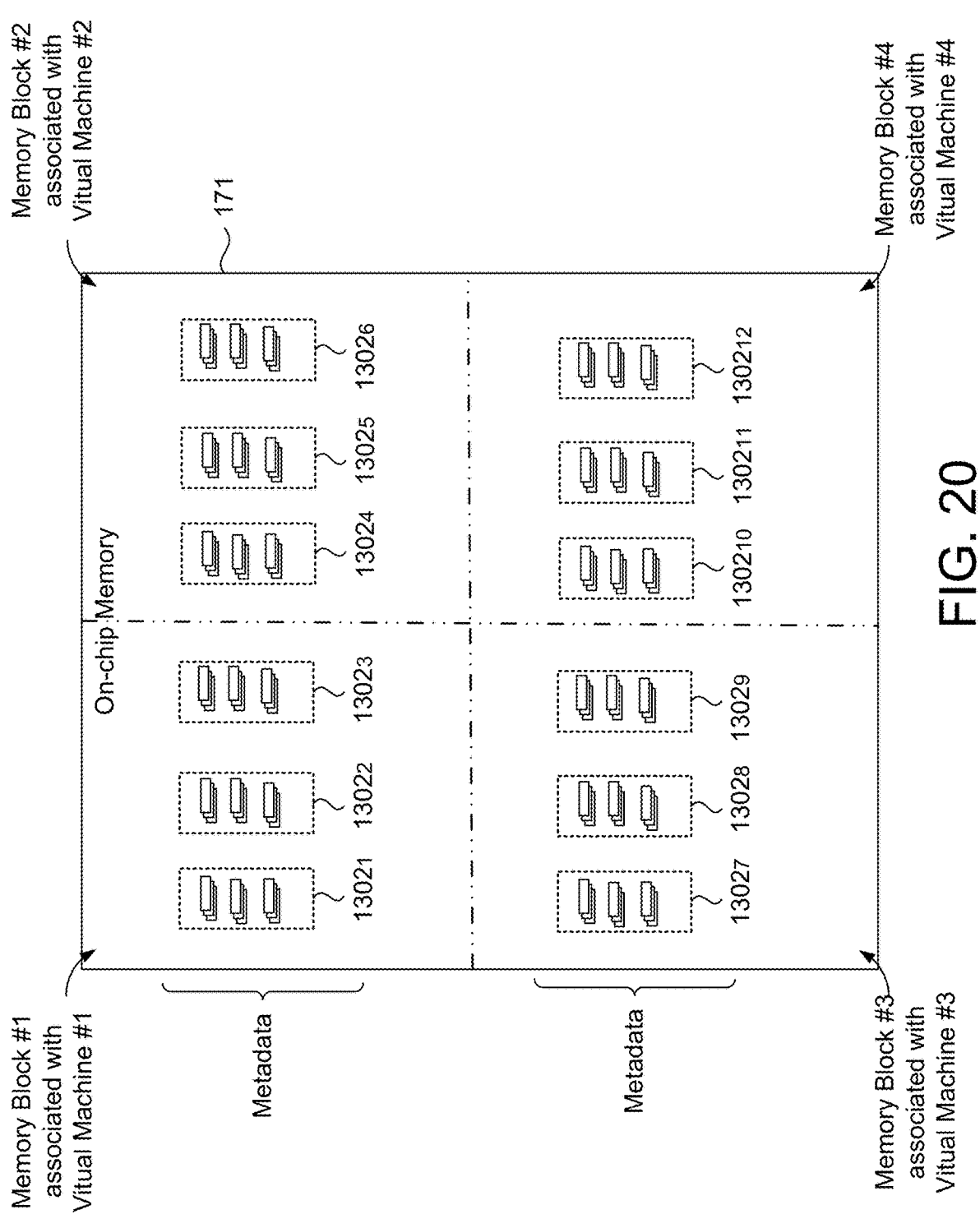
FIG. 20 illustrates a schematic view of an example memory of the data transform accelerator configured to support IO virtualization in accordance with some implementation of this disclosure.

FIG. 20 illustrates a schematic view of an example memory 171 (e.g., on-chip memory) of the data transform accelerator 170 configured to support IO virtualization in accordance with some implementations of this disclosure.

In some implementations, the data transform accelerator 170 is used with IO virtualization with software drivers running on virtual machines. In some implementations, to support multiple virtual machines, the memory 171 (e.g., on-chip memory) of the data transform accelerator 170 is partitioned into portions of memory, or blocks (e.g., block #1, block #2, block #3, block #4, block #n). In some implementations, each block of memory 171 can be attached to one virtual function. In some implementations, a virtual machine may use one or more than one of virtual function (s). In some implementations, each virtual machine can use the memory blocks (e.g., on-chip memory blocks) associated with the virtual functions it is attached to. In some implementations, each virtual machine runs one instance of software driver that creates one or more than one session for submission of commands to the device. In some implementations, for sessions created from software driver of each virtual machine, the corresponding block of on-chip memory attached to the virtual function is used for caching the intended data structures associated with the sessions from that virtual machine. In some implementations, different blocks of on-chip memory are used independently in parallel from software drivers of the virtual machines.

As shown, in some implementations, the memory 171 of the data transform accelerator 170 is partitioned into four memory blocks to support four virtual machines. However, this disclosure does not limit the number of virtual machines the data transform accelerator 170 can support. For example, the memory 171 of the data transform accelerator 170 is partitioned into N memory blocks to support N virtual machines.

In some implementations, based on size of memory 171 (e.g., on-chip memory) more data structures can be allocated. In some implementations, if more memory is available, data buffers could be optionally placed on memory 171. This may allow for avoiding system memory entirely for high priority data and use peer-to-peer transfers to/from NVMe controller/fabric as examples. In some implementations, if more memory is available, next set of data buffers can be stored as well. This may be used for peer-to-peer transactions using compute express link (CXL), PCIe, or other interface protocols.

In some implementations, the data transform accelerator 170 has hardware circuitry that can differentiate between the address space of the host computing unit 100 and address space of the memory 171 (e.g., on-chip memory) of the data transform accelerator 170. In some implementations, based on the address, the data transform accelerator 170 can determine if the data are to be read from the memory 171 (e.g., on-chip memory) or from other external memory such as the memory 101 of the host computing unit 100 or other devices as mentioned above.

Figure 21:
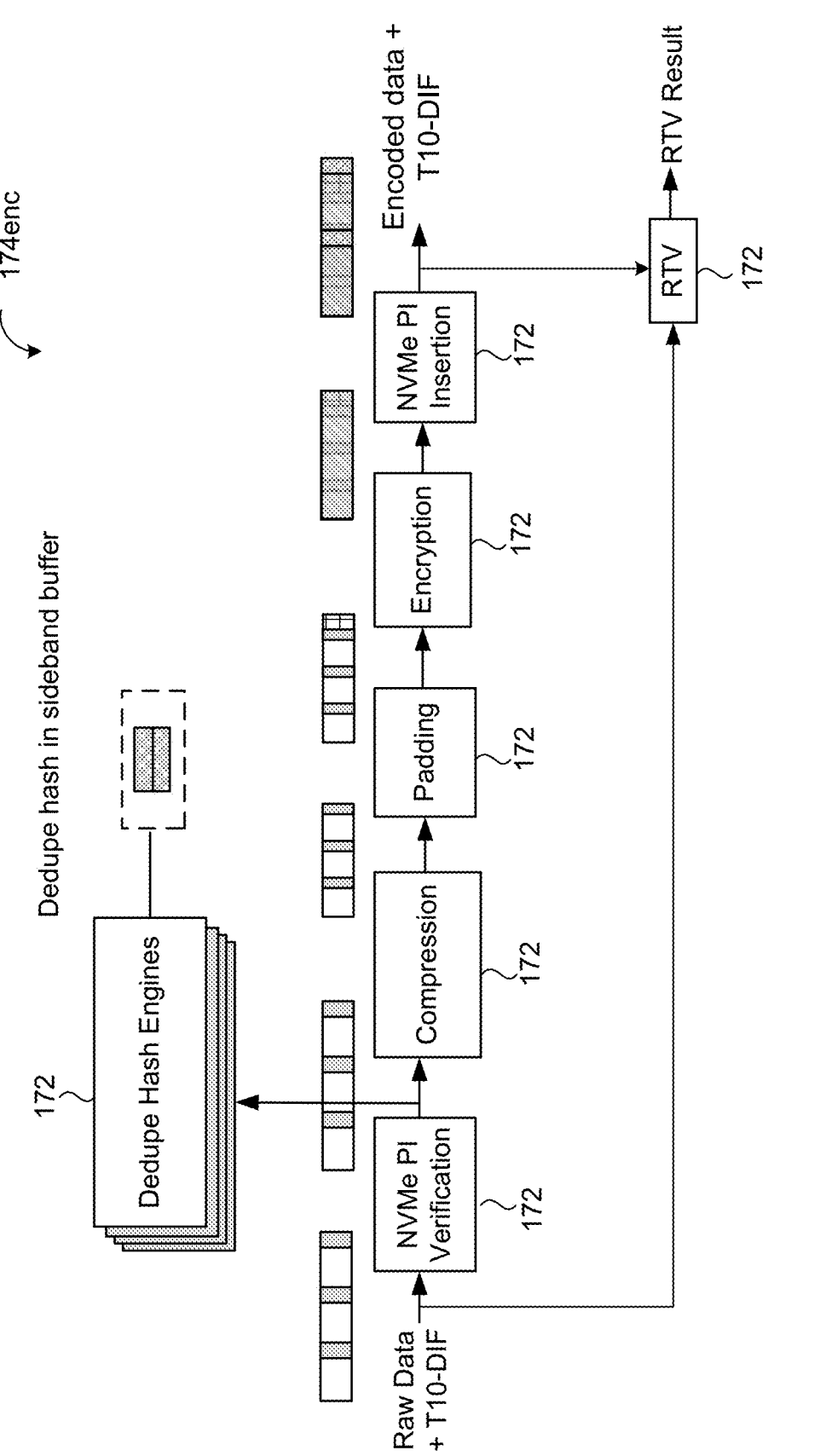
FIG. 21 illustrates a schematic view of an example encoding data transform pipeline including a plurality of data transform engines in accordance with some implementation of this disclosure.

FIG. 21 illustrates a schematic view of an example encoding data transform pipeline 174$_{enc}$ including a plurality of data transform engines 172 in accordance with some implementation of this disclosure.

As shown, in some implementations, a data transform accelerator (as described herein) configures the encoding data transform pipeline 174$_e$ne with a NVMe PI verification data transform engine, data compression data transform engine, padding data transform engine, encryption data transform engine, NVMe PI insertion data transform engine, and real time verification (RTV) data transform engine based on metadata. Real time verification is used to confirm the integrity of the encoded data before returning encoded data to the user and may be checked by decoding the encoded data on a redundant hardware block on an accelerator (e.g., the data transform accelerator 170) and comparing a checksum on original input data (RAW data including T10-DIF in this example) with that on output data (encoded data+T10-DIF in this example). As a result, using the encoding data transform pipeline 174$_{enc}$, the data transform accelerator 170 transforms the input data to the output data and produces real time verification data result.

Figure 22:
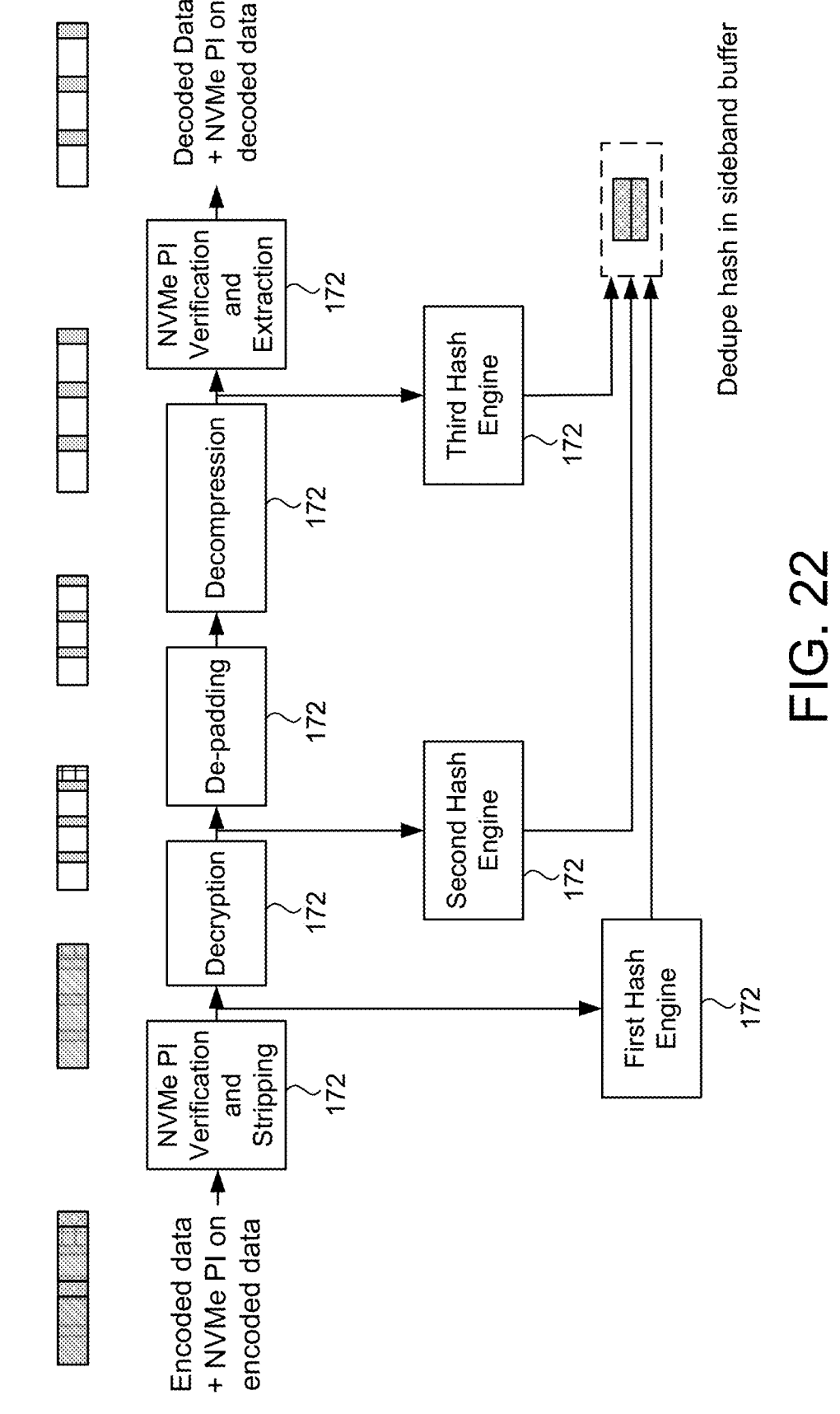
FIG. 22 illustrates a schematic view of an example decoding data transform pipeline including a plurality of data transform engines in accordance with some implementation of this disclosure.

FIG. 22 illustrates a schematic view of an example decoding data transform pipeline 174$_{dec}$ including a plurality of data transform engines 172 in accordance with some implementation of this disclosure.

As shown, in some implementations, a data transform accelerator (as described herein) configures the decoding data transform pipeline 174$_{dec}$ with an NVMe PI verification and stripping data transform engine, a decryption data transform engine, a de-padding data transform engine, a data decompression data transform engine, an NVMe PI verification and extraction data transform engine. As illustrated, one or more has engines (e.g., a first hash engine, the second hash engine, and/or a third hash engine) may be included in the data transform pipeline 174$_{dec}$ and the one or more hash engines may be located at different positions in the data transform pipeline 174$_{dec}$. As a result, using the decoding data transform pipeline 174$_{dec}$, the data transform accelerator transforms encoded input data to decoded output data.

Another aspect of the disclosure provides reuse of the metadata for data transform operations across commands grouped in session(s). The host includes data processing hardware and memory hardware in communication with the data processing hardware. The memory hardware is storing instructions that when executed on the data processing hardware cause the data processing hardware to perform operations. The operations include generating a container data structure in the memory hardware. The method includes generating input data in the memory hardware or in the memory of the data transform accelerator. The operations include generating metadata in the memory hardware. The metadata in its entirety or partially reused across multiple commands grouped in a session.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although implementations of the present disclosure have been described in detail, various changes, substitutions, and alterations could be made hereto without departing from the spirit and scope of the present disclosure.

What is claimed is:

1. A method, comprising:
determining, by a data transform accelerator, an address associated with a data transform command in a container data structure which is in a host computing unit, the host computing unit in communication with the data transform accelerator;
in response to the determination that the address is in the container data structure, accessing, by the data transform accelerator, the data transform command based on the address;
obtaining, by the data transform accelerator, metadata based on information in the data transform command, wherein a first portion of the metadata is obtained using a first descriptor and a second portion of the metadata is obtained using a second descriptor; and configuring, by the data transform accelerator, a data transform pipeline based on the metadata, wherein the data transform pipeline comprises a first data transform engine associated with the first portion of the metadata and a second data transform engine associated with the second portion of the metadata, and the data transform accelerator arranges the first data transform engine relative to the second data transform engine based on the first portion of the metadata and the second portion of the metadata.

2. The method of claim 1, wherein obtaining the metadata based on the information in the data transform command includes:
obtaining command metadata from a first input buffer in the host computing unit or in the memory of the data transform accelerator, wherein the command metadata specifies data transform operations to be performed by the data transform pipeline.

3. The method of claim 1, wherein:
the first portion of the metadata is in a first buffer;
the second portion of the metadata is in a second buffer;
the first buffer is in the host computing unit; and
the second buffer is in the data transform accelerator.

4. The method of claim 1, wherein obtaining the metadata based on the information in the data transform command includes:
obtaining command pre-data from a second input buffer in the host computing unit.

5. The method of claim 4, wherein the command pre-data include at least one of: initialization vector (IV), message authentication code (MAC), Galois counter mode (GCM) authentication tag, or additional authentication data (AAD).

6. The method of claim 1, wherein obtaining the metadata based on the information in the data transform command includes:
obtaining additional command metadata from a third input buffer in the host computing unit.

7. The method of claim 6, wherein the additional command metadata include at least one of: source token, or action token.

8. The method of claim 1, the method further comprising:
obtaining, by the data transform accelerator, input data based on the information in the data transform command.

9. The method of claim 8, the method further comprising:
performing, by the data transform accelerator, one or more data transform operations on the input data using the data transform pipeline.

10. The method of claim 9, the method further comprising:
transmitting, by the data transform accelerator, output data produced by the data transform pipeline to the host computing unit or to the memory of the data transform accelerator.

11. A host comprising:
data processing hardware; and
memory hardware in communication with the data processing hardware, the memory hardware storing instructions that when executed on the data processing hardware cause the data processing hardware to perform operations comprising:
generating a container data structure in the memory hardware;
generating input data in the memory hardware;
generating metadata in the memory hardware;
reserving output buffer in the memory hardware;

generating a first data transform command associated with the input data and the metadata in the memory hardware; and updating the container data structure with an address of the first data transform command, wherein the address of the first data transform command is accessible by a data transform accelerator that is in data communication with the host, wherein accessing the address of the first data transform command by the data transform accelerator causes the data transform accelerator to obtain the input data, to perform one or more data transform operations on the input data based on the metadata, and to transmit output data to the output buffer, and wherein the output data is the input data after being transformed by the one or more data transform operations.

12. The host of claim 11, wherein the host is in the data communication with the data transform accelerator based on peripheral component interconnect express (PCIe) standard.

13. The host of claim 11, wherein the host is in the data communication with the data transform accelerator based on universal serial bus (USB) standard.

14. The host of claim 11, wherein generating the first data transform command includes:

generating a first source descriptor pointing to the input data;

generating a second source descriptor pointing to the metadata; and generating a first destination descriptor pointing to the output buffer.

15. The host of claim 11, wherein the metadata specifies data transform operations to be performed by the data transform accelerator.

16. The host of claim 11, wherein the metadata includes at least one parameter for the data transform accelerator: initialization vector (IV), message authentication code (MAC), Galois counter mode (GCM) authentication tag, or additional authentication data (AAD).

17. The host of claim 11, wherein the metadata includes at least one of: source token, or action token.

18. The host of claim 11, wherein the data transform accelerator obtains the input data from the host via the data communication or from the memory of the data transform accelerator.

19. The host of claim 11, wherein the data transform accelerator obtains the metadata from the host via the data communication.

20. The host of claim 11, wherein a second data transform command associates with the metadata, the second data transform command different from the first data transform command.

* * * * *